US009148994B1

(12) United States Patent
Eastin et al.

(10) Patent No.: US 9,148,994 B1
(45) Date of Patent: *Oct. 6, 2015

(54) SYSTEMS FOR THE CONTROL AND USE OF FLUIDS AND PARTICLES

(71) Applicant: Kamterter II, LLC, Waverly, NE (US)

(72) Inventors: John Alvin Eastin, Waverly, NE (US); David Vu, Lincoln, NE (US)

(73) Assignee: Kamterter Products, LLC, Waverly, NE (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/674,725

(22) Filed: Nov. 12, 2012

Related U.S. Application Data

(63) Continuation of application No. 12/420,708, filed on Apr. 8, 2009, now Pat. No. 8,308,075, and a continuation-in-part of application No. 11/405,603, filed on Apr. 17, 2006, now Pat. No. 7,536,962, and a continuation-in-part of application No. 11/109,398, filed on Apr. 19, 2005, now Pat. No. 7,311,050.

(51) Int. Cl.
*A01C 1/06* (2006.01)
*A01C 7/08* (2006.01)
(Continued)

(52) U.S. Cl.
CPC . *A01C 23/00* (2013.01); *A01C 1/06* (2013.01); *A01C 7/004* (2013.01); *A01C 7/084* (2013.01); *A01C 7/085* (2013.01); *A01C 7/16* (2013.01)

(58) Field of Classification Search
CPC .............. A01C 1/00; A01C 1/06; A01C 7/00; A01C 7/004; A01C 7/04; A01C 7/042; A01C 7/08; A01C 7/081; A01C 7/082; A01C 7/084; A01C 7/085; A01C 7/10; A01C 7/123; A01C 7/125; A01C 7/16; A01C 7/163; A01C 7/166; A01C 23/00
USPC ........... 198/657; 239/146; 222/412, 413, 410, 222/251; 111/200, 900, 118, 127, 130, 170, 111/173
See application file for complete search history.

(56) References Cited

U.S. PATENT DOCUMENTS

| 577,121 A | 2/1897 | Stock et al. |
| 903,527 A | 11/1908 | Wilbur |

(Continued)

FOREIGN PATENT DOCUMENTS

| AU | 2003248181 | 9/2003 |
| CA | 1266498 | 3/1990 |

(Continued)

OTHER PUBLICATIONS

A Study of the Stability of Plane Fluid Sheets, Hagerty, W.W. and Shea, J.F.; Journal of Applied Mechanics; vol. 22-23, 1955-56.

(Continued)

*Primary Examiner* — Christopher J Novosad
(74) *Attorney, Agent, or Firm* — Suiter Swantz pc llo

(57) ABSTRACT

An apparatus for planting is disclosed. The apparatus includes a nozzle and a delivery tube in communication with the nozzle. The delivery tube includes an auger within the delivery tube. The auger is configured for moving a seed gel mixture through the nozzle. The seed gel mixture includes at least seeds and gel. The apparatus also includes a hopper configured for holding the seed gel mixture, the hopper in communication with the delivery tube.

20 Claims, 33 Drawing Sheets

(51) Int. Cl.
*A01C 7/16* (2006.01)
*A01C 23/00* (2006.01)
*A01C 7/00* (2006.01)

(56) References Cited

U.S. PATENT DOCUMENTS

| | | | |
|---|---|---|---|
| 1,045,732 | A | 11/1912 | Nash |
| 1,900,482 | A | 3/1933 | Boyd |
| 2,361,980 | A | 11/1944 | Tirrell |
| 2,695,236 | A | 11/1954 | Barton |
| 2,737,314 | A | 3/1956 | Anderson |
| 2,749,964 | A | 6/1956 | Manning |
| 3,507,624 | A | 4/1970 | Schneider, Jr. et al. |
| 3,648,631 | A | 3/1972 | Fiedler et al. |
| 3,741,310 | A | 6/1973 | Hansen |
| 3,846,529 | A | 11/1974 | Poteet, III |
| 3,849,241 | A | 11/1974 | Butin et al. |
| 3,855,953 | A | 12/1974 | Fathauer et al. |
| 3,861,474 | A | 1/1975 | De Palma |
| 3,968,933 | A | 7/1976 | Waldrum |
| 3,994,438 | A | 11/1976 | Farmery |
| 4,027,573 | A * | 6/1977 | Laverty .................. 411/413 |
| 4,145,203 | A | 3/1979 | Levecque et al. |
| 4,193,879 | A | 3/1980 | Leach |
| 4,224,882 | A | 9/1980 | Cruse |
| 4,297,810 | A | 11/1981 | Hansford |
| 4,320,595 | A | 3/1982 | McClure et al. |
| 4,384,537 | A | 5/1983 | duBrucq |
| 4,392,916 | A | 7/1983 | Nishiyama et al. |
| 4,504,014 | A | 3/1985 | Leuning |
| 4,574,150 | A | 3/1986 | Austin |
| 4,596,558 | A | 6/1986 | Smith et al. |
| 4,632,284 | A | 12/1986 | Erazo et al. |
| 4,769,506 | A | 9/1988 | Kosters |
| 4,779,776 | A | 10/1988 | Erazo et al. |
| 4,820,281 | A | 4/1989 | Lawier, Jr. |
| 4,893,681 | A | 1/1990 | Flandre |
| 4,895,106 | A | 1/1990 | Barnes |
| 5,092,267 | A | 3/1992 | Hajek |
| 5,244,123 | A | 9/1993 | Benedict |
| 5,417,153 | A | 5/1995 | King et al. |
| 5,508,072 | A * | 4/1996 | Andersen et al. ............ 428/34.5 |
| 5,520,331 | A | 5/1996 | Wolfe |
| 5,575,341 | A | 11/1996 | Baker et al. |
| 5,601,865 | A | 2/1997 | Fulger et al. |
| 5,680,993 | A | 10/1997 | McCracken et al. |
| 5,776,214 | A | 7/1998 | Wood |
| 5,794,550 | A | 8/1998 | Chadwick |
| 5,824,339 | A | 10/1998 | Shimizu et al. |
| 5,824,797 | A | 10/1998 | Hazen |
| 5,880,210 | A | 3/1999 | Schulz et al. |
| 5,897,821 | A | 4/1999 | Kawasaki |
| 5,932,342 | A | 8/1999 | Zeira et al. |
| 5,955,094 | A | 9/1999 | Beall et al. |
| 6,214,771 | B1 | 4/2001 | Dexter |
| 6,241,164 | B1 | 6/2001 | Wolfe |
| 6,248,378 | B1 | 6/2001 | Ganan-Calvo |
| 6,268,309 | B1 | 7/2001 | Nagy et al. |
| 6,382,526 | B1 | 5/2002 | Reneker et al. |
| 6,444,233 | B1 | 9/2002 | Amtzen et al. |
| 6,518,226 | B2 | 2/2003 | Volker et al. |
| 6,589,579 | B2 | 7/2003 | Ganan-Calvo |
| 6,596,296 | B1 | 7/2003 | Nelson et al. |
| 6,598,802 | B2 | 7/2003 | Wolfe |
| 6,637,366 | B1 | 10/2003 | Bedding et al. |
| 6,638,918 | B2 | 10/2003 | Davison et al. |
| 6,695,992 | B2 | 2/2004 | Reneker |
| 6,814,759 | B2 | 11/2004 | Larsen et al. |
| 7,311,050 | B2 * | 12/2007 | Eastin et al. .................. 111/118 |
| 7,490,563 | B2 * | 2/2009 | Eastin et al. .................. 111/118 |
| 7,509,771 | B2 * | 3/2009 | Eastin et al. .................. 47/57.6 |
| 7,536,962 | B2 * | 5/2009 | Eastin et al. .................. 111/118 |
| 7,546,812 | B2 * | 6/2009 | Eastin et al. .................. 111/118 |
| 7,959,089 | B2 * | 6/2011 | Eastin et al. .................. 239/11 |
| 8,091,272 | B2 * | 1/2012 | Eastin et al. ............... 47/1.01 R |
| 8,163,322 | B2 * | 4/2012 | Eastin et al. .................. 426/474 |
| 8,197,735 | B2 * | 6/2012 | Eastin et al. ............. 264/211.14 |
| 8,235,258 | B2 * | 8/2012 | Eastin et al. .................. 222/412 |
| 8,308,075 | B2 * | 11/2012 | Eastin et al. ..................... 239/1 |
| 8,501,919 | B2 * | 8/2013 | Eastin et al. .................... 536/20 |
| 2002/0192768 | A1 | 12/2002 | Chen et al. |
| 2003/0024806 | A1 | 2/2003 | Foret |
| 2003/0026837 | A1 | 2/2003 | Mathisen |
| 2003/0134120 | A1 | 7/2003 | Kim et al. |
| 2003/0171710 | A1 | 9/2003 | Bassuk et al. |
| 2003/0197125 | A1 | 10/2003 | De Saro et al. |
| 2004/0102562 | A1 | 5/2004 | Butuc |
| 2004/0147670 | A1 | 7/2004 | Hupfield |
| 2005/0005509 | A1 | 1/2005 | Tindall et al. |
| 2005/0028441 | A1 | 2/2005 | Abitz et al. |
| 2006/0272562 | A1 | 12/2006 | Eastin et al. |
| 2008/0025903 | A1 | 1/2008 | Cortright |
| 2009/0241817 | A1 | 10/2009 | Eastin et al. |

FOREIGN PATENT DOCUMENTS

| | | |
|---|---|---|
| CA | 2223444 | 7/2000 |
| CA | 2401201 | 9/2002 |
| CN | 101203128 A | 4/2006 |
| JP | 2002241405 | 11/2001 |
| JP | 2003328292 | 4/2002 |
| WO | WO9505501 | 2/1995 |
| WO | WO0047177 | 8/2000 |
| WO | WO0132751 | 10/2001 |
| WO | WO0232210 | 4/2002 |
| WO | WO02055782 | 7/2002 |
| WO | WO2005024101 | 3/2005 |
| WO | WO2006039283 | 4/2006 |

OTHER PUBLICATIONS

Hydrophobic/Hydrophilic Electrospun Membranes of Biomedical Applications. Jiang, Fang, Hsiao, Chu Chen.

Electrospinning of chitosan solutions in acetic acid with poly(ethylene oxide, Duan, Dong, Yuan, Yao; J. Biomater, Sci Polymer Edn, vol. 15, No. 6, pp. 797-811 (2004).

A Facile Method to Make Continuous, Aligned Chitosan Fibers in the Micron and Submicron Range via Electrospinning for Use in Cartilage Tissue Engineering, VU, Eastin, Larsen.

Chitosan-Coating of Cellulosic Materials Using and Aqueous Chitosan-CO, Solution, Sakai, Hayano, Yoshioka, Fujieda, Saito, Yoshioka; Polymer Journal, vol. 34, No. 3, p. 144-148 (2002).

Synthesis and Evaluation of Scaffolds Prepared from Chitosan Fibers for Potential Use in Cartilage Tissue Engineering, Subramanian, Lin, Vu, Larsen, Technical Papers of ISA, Biomedical Sciences Instrumentation Vo. 40, Fort Collins, CO Apr. 23-25, 2004.

Chitin and chitosan fibres: A review, Ravi Kumar, Bul Mater. Sci., vol. 22, No. 5, Aug. 1999, pp. 905-915.

Preparation and characterization of biodegradable chitosan/hydroxyapatite nanocomposite rods via in situ hybridization: a potential material as internal fixation of bone fractures, Hu, Li, Wang, Shen; Biomaterials 25 (2004) pp. 779-785.

Immobilization of chitosan onto poly-L-lactic acid film surface by plasma graft polymerization to control the morphology of fibroblast and liver cells, Ding, Chen, Gao, Chang, Zhang, Kang, Biomaterials 25 (2004) 1059-1067.

Hydroxyapatite-chitin materials as potential tissue engineered bone substitutes, Ge, Baguenard, Lim, Wee, Khor; Biomaterials 25 (2004) 1049-1058.

Preparation of acrylic grafted chitin for wound dressing application, Tanodekaew, Prasitslip, Swasdison, Thavornyutikarn, Pathsree, Pateepasen; Biomterials 25 (2004) 1453-1460.

New Process (Jet Cutting Method) for the Production of Spherical Beads from Highly Viscous Polymer Solutions; Prube, Fox, Kirchhoff, Bruske, Bredford, Vorlop; Chem. Eng. Techol. 21 (1998) pp. 29-33.

Production of Spherical Beads by JetCutting, Prube, Dalluhn, Bredford, Vorlop; Chem. Eng. Technol. 23 (2000), pp. 1105-1110.

Functional Fibers for Immobilization of Biomolecules, Hsieh, Abbott, Ellison, Schrueder-Gibson; NTC Project: M02-CD05 (formerly M02-E05), National Textile Center Annual Report: Nov. 2002.

(56) References Cited

OTHER PUBLICATIONS

Improvement of the Jet Cutting Method for the Preparation of Spherical Particles from Viscous Polymer Solutions, Prube, Bruske, Bredford, Vorlop; Chem. Eng. Technol. 21 (1998), pp. 153-157.
Aircraft Cargo Fire Suppression Using Low Pressure Dual Fluid Water Mist and Hypoxic Air, John Brooks; International Aero Technologies LLC, 11817 Westar Lane, Burlington, WA 98233; pp. 1-17.
A Review of Liquid Atomization by Electric Means, Grace, Marunissen; J aerosol Sci., vol. 25, No. 6, pp. 1005-1019, 1994.
Characteristics of Pneumatic Atomization, Gretzinger, Marshall; A.I. Ch.E. Journal, Jun. 1961, pp. 312-318.
The design and performance of internal mixing multijet twin fluid atomizers, Mullinger Chigier; Journal of the Institute of Fuel, 251 Dec. 1974; pp. 251-261.
Blast Atomiser Developments in the Central Electricity Generating Board, Sargeant, Proceedings of 2nd International Conference on Liquid Atomization and Spray Systems, ICLASS-82, 4-4, Madison, WI, 1982, pp. 131-136.
The Mechanism of Disintegration of Liquid Sheets, York, Stubbs, Tek, Transactions of the ASME, Oct. 1953, pp. 1279-1286.
The Influence of Liquid Film Thickness on Airblast Atomization, Rizk, Lefebvre, Transactions of the ASME, vol. 102, Jul. 1980, pp. 706-710.
On the temporal instability of a two-dimensional viscous liquid sheet, X. Li and R.S. Tankin; J. Fluid Mech. (1991). vol. 226, 99 425-443.
Preparation of chitosan-containing nanofibres by electrospinning of chitosan/poly(ethylene oxide) blend solutions; Spasova, Manolova, Paneva, Rashkov; e-Polymers 2004, No. 056, pp. 1-12.
Terminology and Definitions for Agricultural Chemical Application, ASAE S327.2 FEB03; pp. 182-185.
Spray Mix Adjuvants for Spray Drift Mitigation, ASAE Paper N.: AA03-003; presented at 2003 ASAE/NAAA Technical Session, Reno, Nevada, Dec. 2003.

Air Delivery Technology by Spray-Air Technologies Ltd., power point on Shear Guard PLUS Nozzle.

Magnetic Trapping of Multicomponent Nanowires, Tanase, Hultgren, Searson, Meyer, Reich, Jun. 25, 2001, pp. 1-3.

High-Pressure Sheet Atomization of Non-Newtonian Fluids, Hartranft and Settles, Presented at ILASS-Americas 12th annual Conference on Liquid Atomization and Spray systems, May 16-19, 1999, Indianapolis, IN.

Annual Spray Drift Review, Office Pesticide Programs, Environmental Fate and Effects Division, printed from internet.

Science and Engineering of Droplets Fundamentals and Applications Book, Humlin Llu.

Biological Applications of multifunctional magnetic nanowires, Symposium on Biological Applications, Sarah Majetich, of Magnetic Nanostructures, Chairman, pp. 1-7.

Electrospinning of Chitosan Dissolved in Concentrated Acetic Acid Solution, Xinying Geng, Oh-Hyeong Kwon, Jinho Jang; Biomaterials; vol. 26, Mar. 19, 2005 pp. 5427-5432.

Preparation of Water-Soluble Chitosan, Shaojie Lu, Xefeng Song, Deyong Cao, Yiping Chen, Kangde Yao; Journal of Applied Polymer Science; vol. 91, (2004).

* cited by examiner

FIG. 1

- SET PHYSICAL AND ENERGY CHARACTERISTICS OF FEEDSTOCK MATERIAL, KINETIC ENERGY FLUID AND FIXTURE OUTLET —12
- MOVE FEEDSTOCK MATERIAL TO FIXTURE OUTLET AT A FLOW RATE OVER AN AREA AND WITH A THICKNESS RELATED TO THE KINETIC ENERGY FLUID CHARACTERISTICS FOR THE DESIRED SHAPE —14
- FORCE KINETIC ENERGY FLUID AGAINST FEEDSTOCK MATERIAL AT PRESELECTED ANGLE TO OR PARALLEL TO FEEDSTOCK MATERIAL WITH FLOW RATE AND PRESSURE RELATED TO CHARACTERISTICS OF FEEDSTOCK —16
- DISTRIBUTING THE SHAPED DROPS, FIBERS, MIST, VAPOR AND/OR PARTICLES —18

FIG. 2

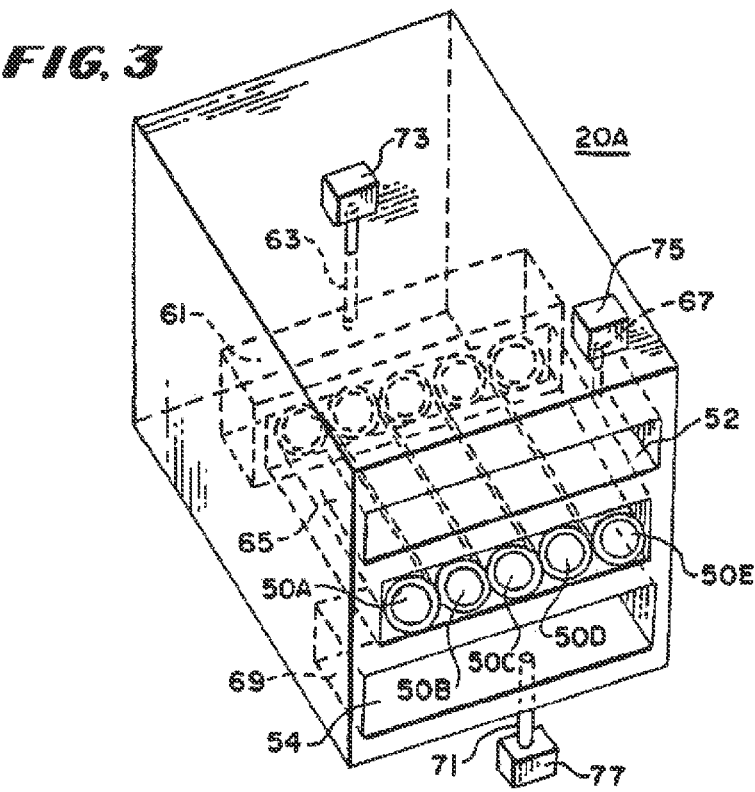
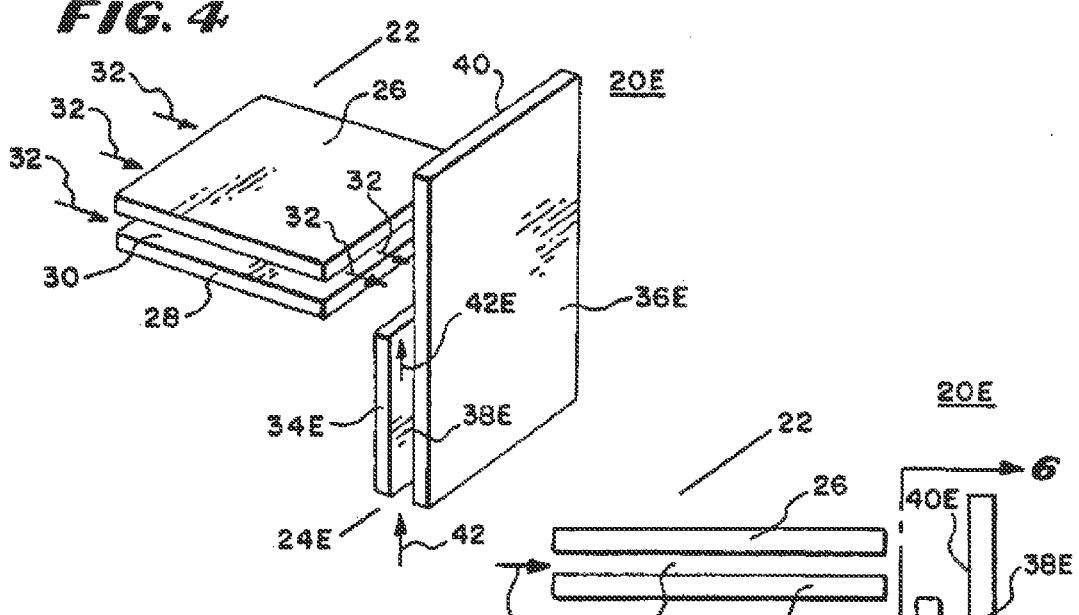

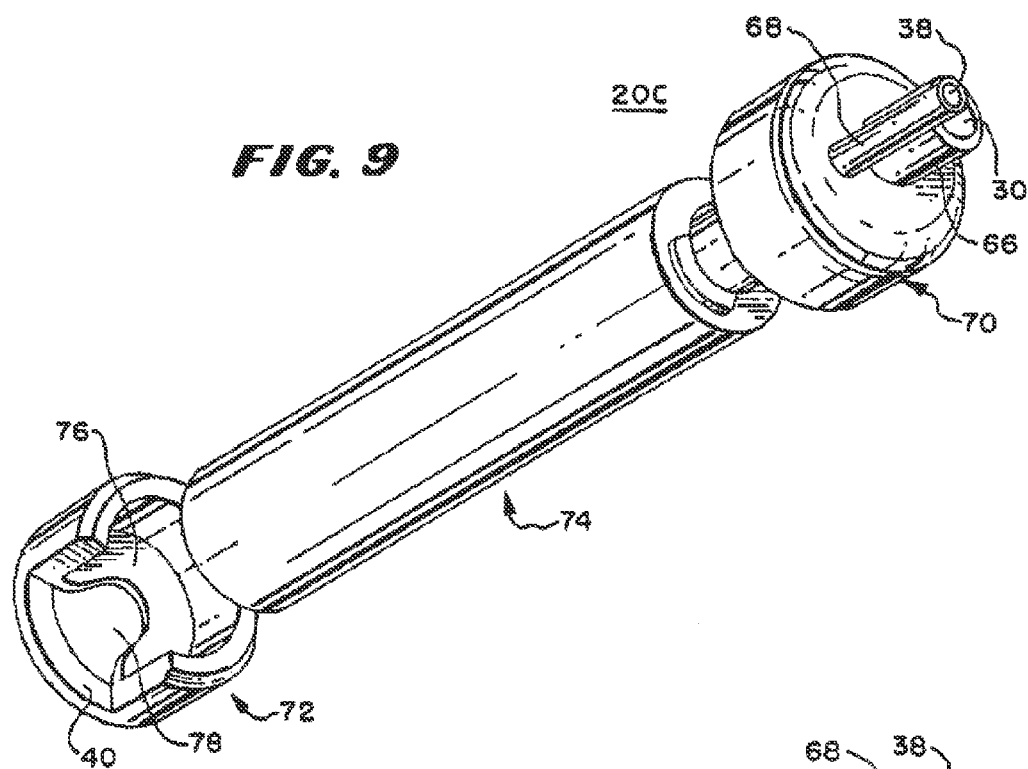
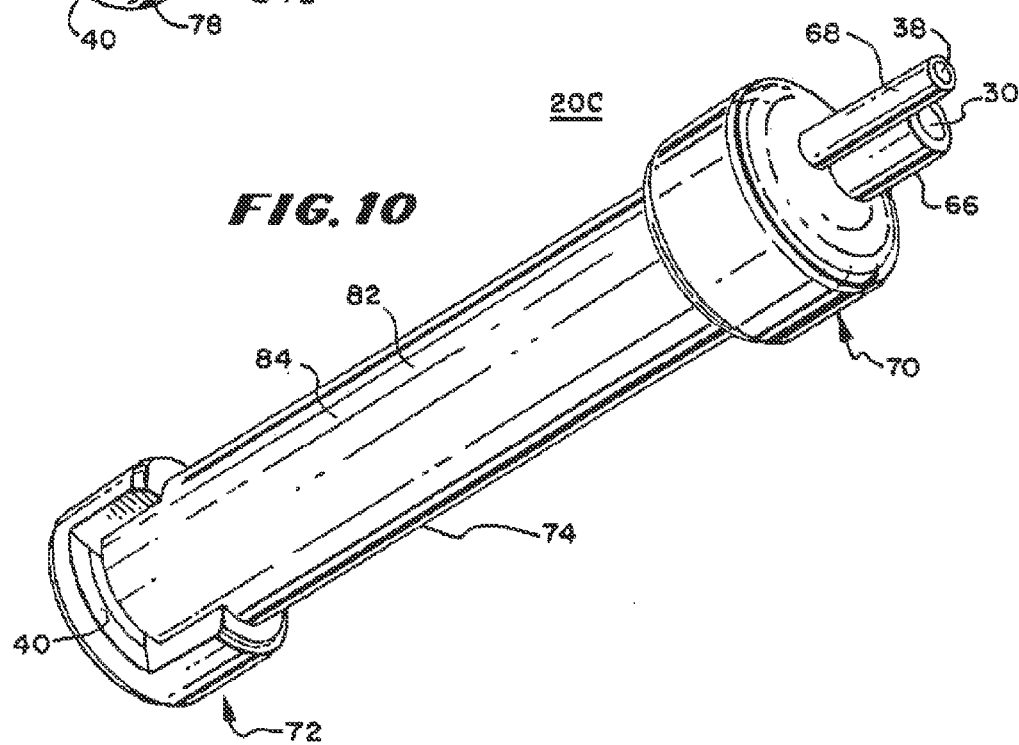

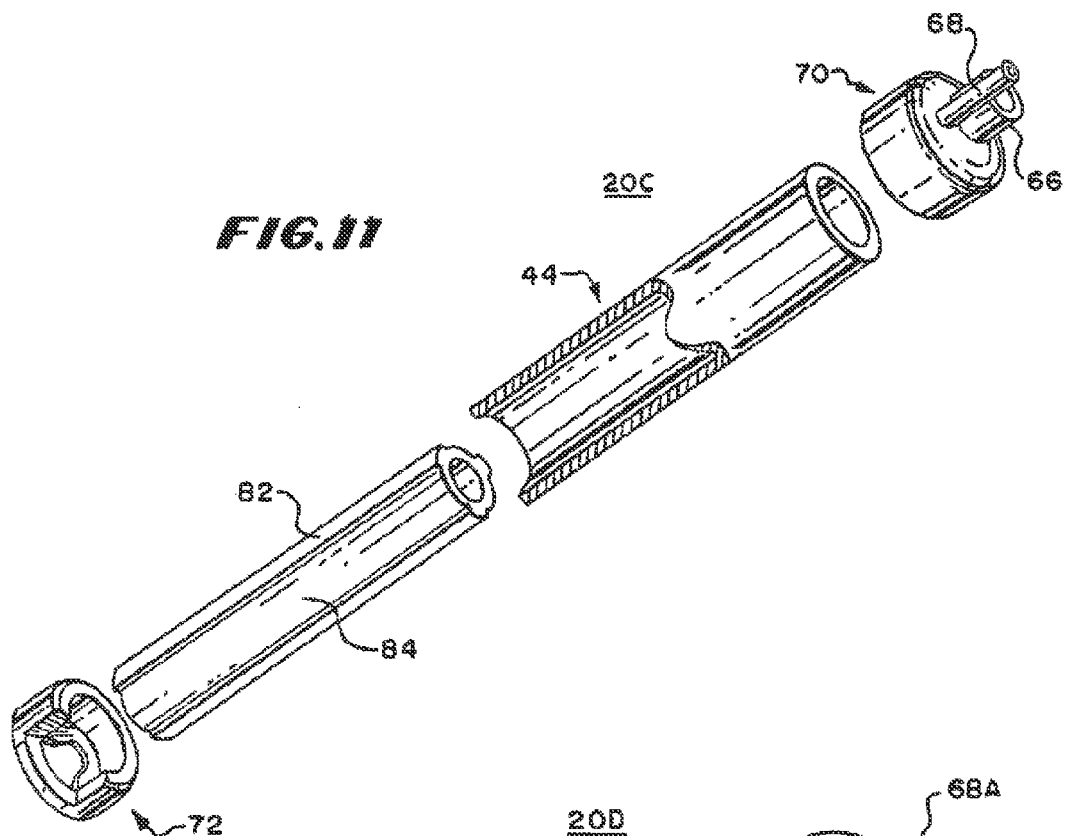

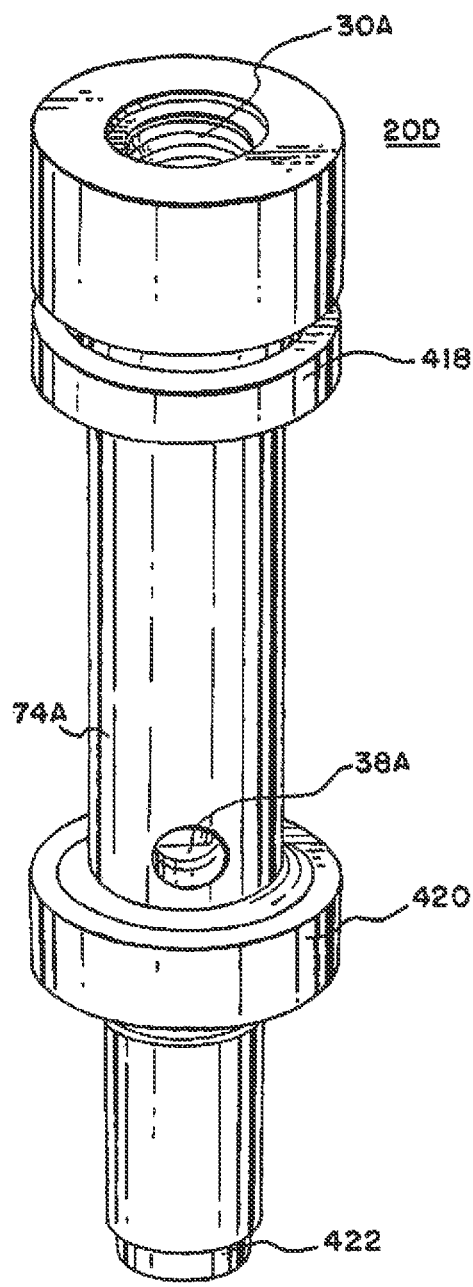
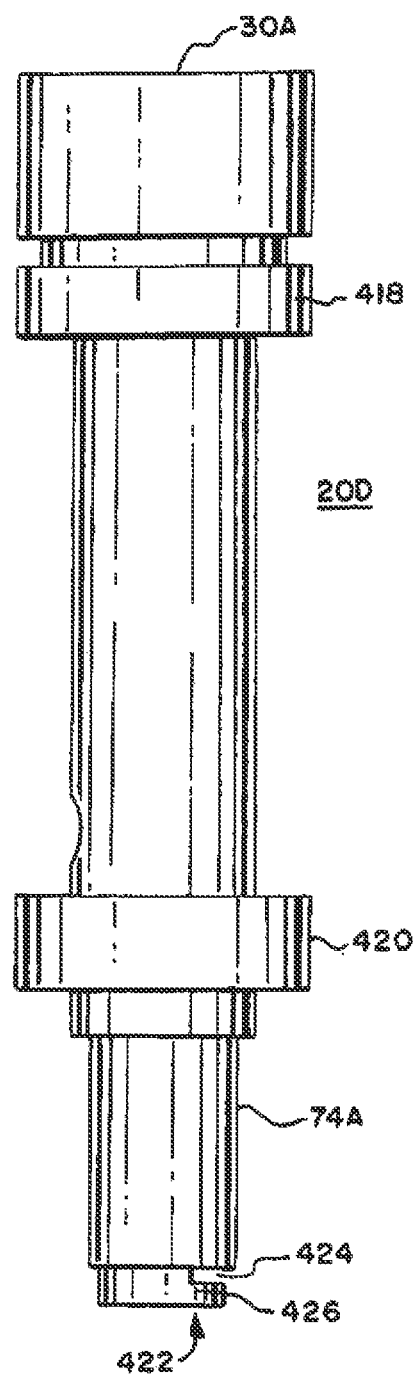
FIG. 13
FIG. 14

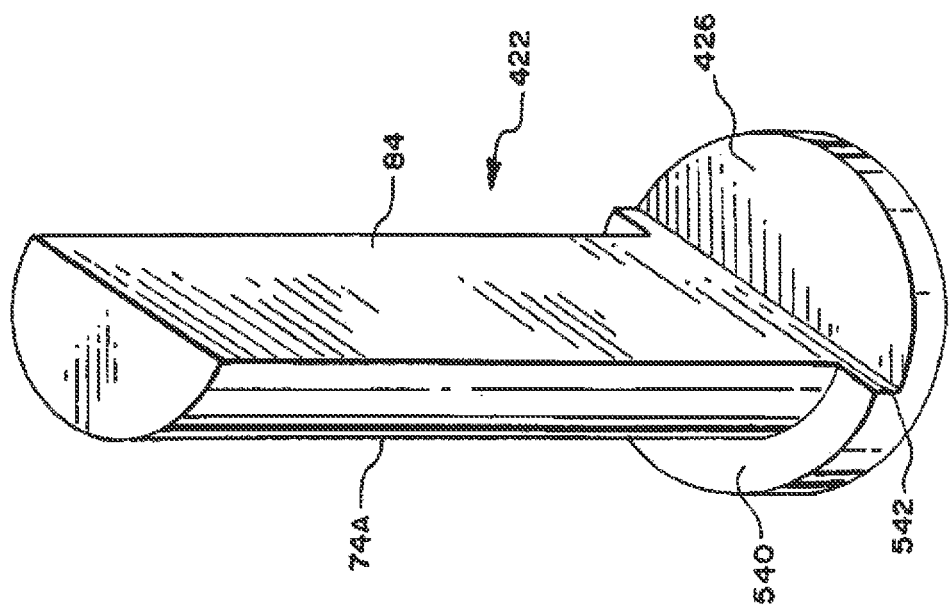
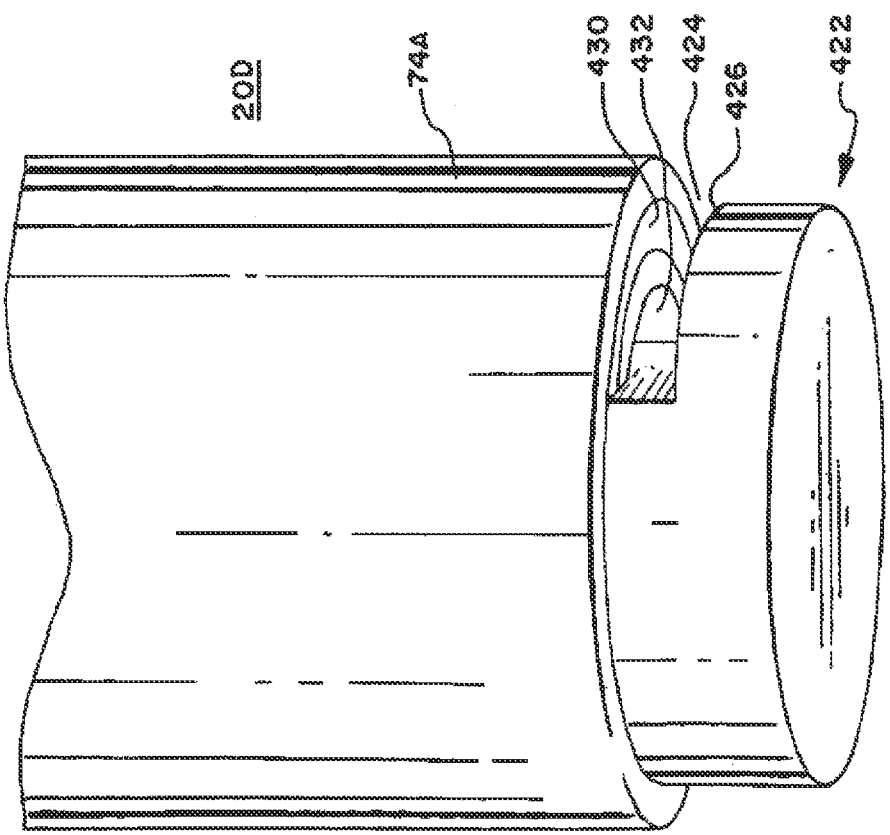

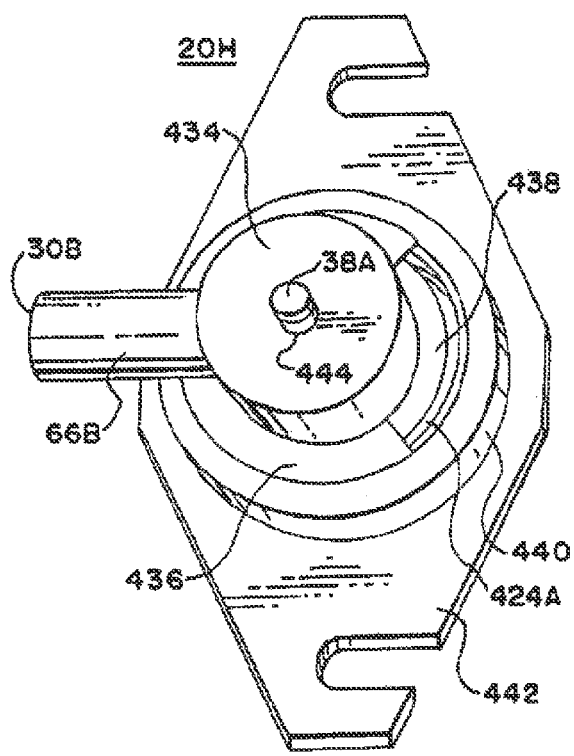
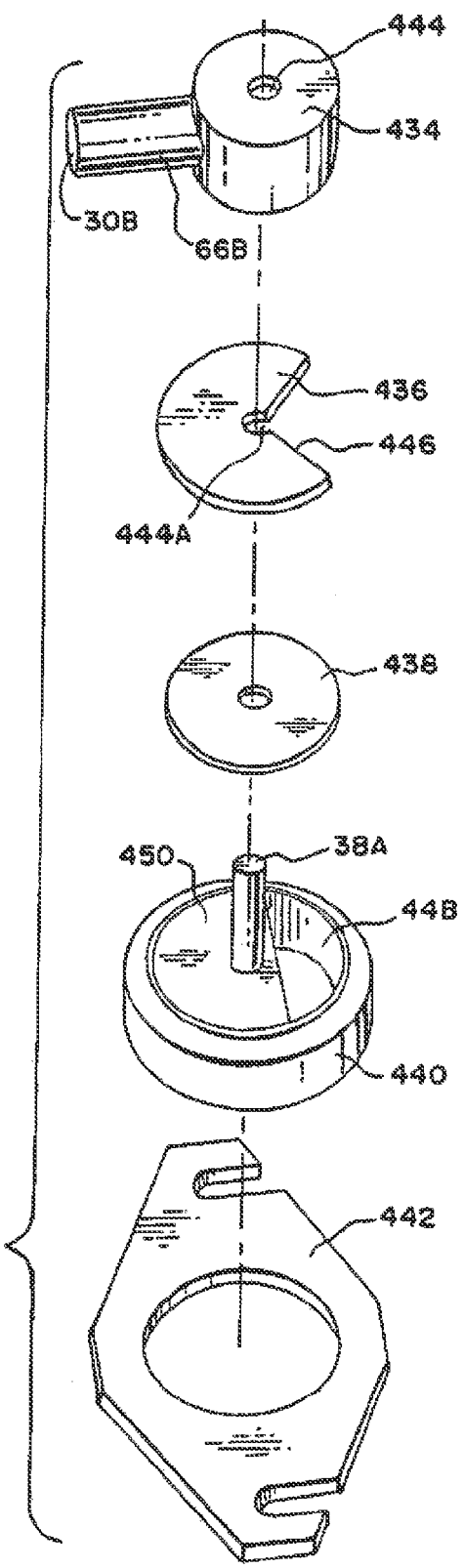

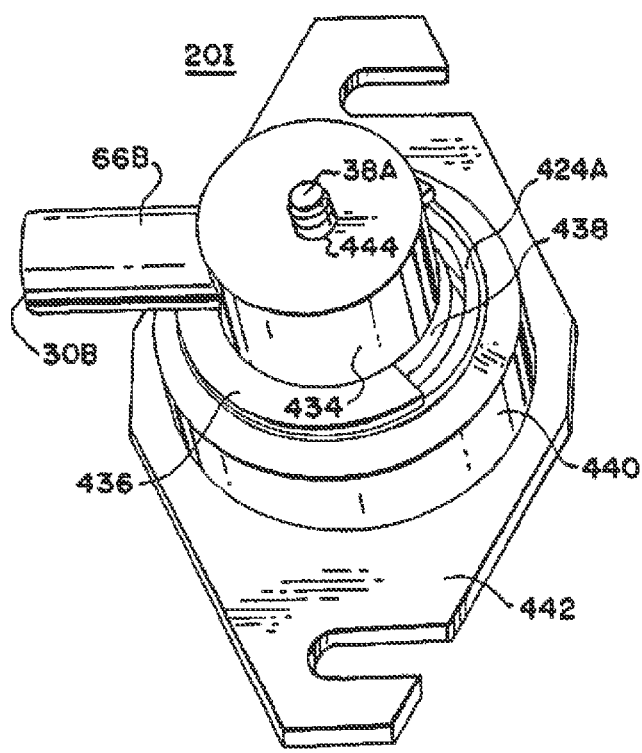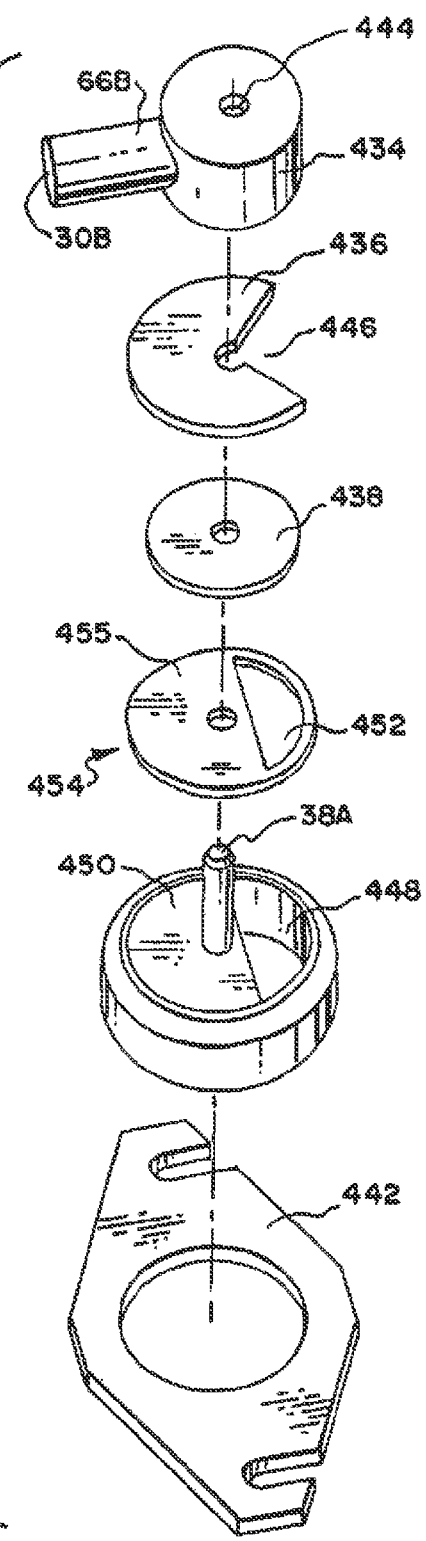

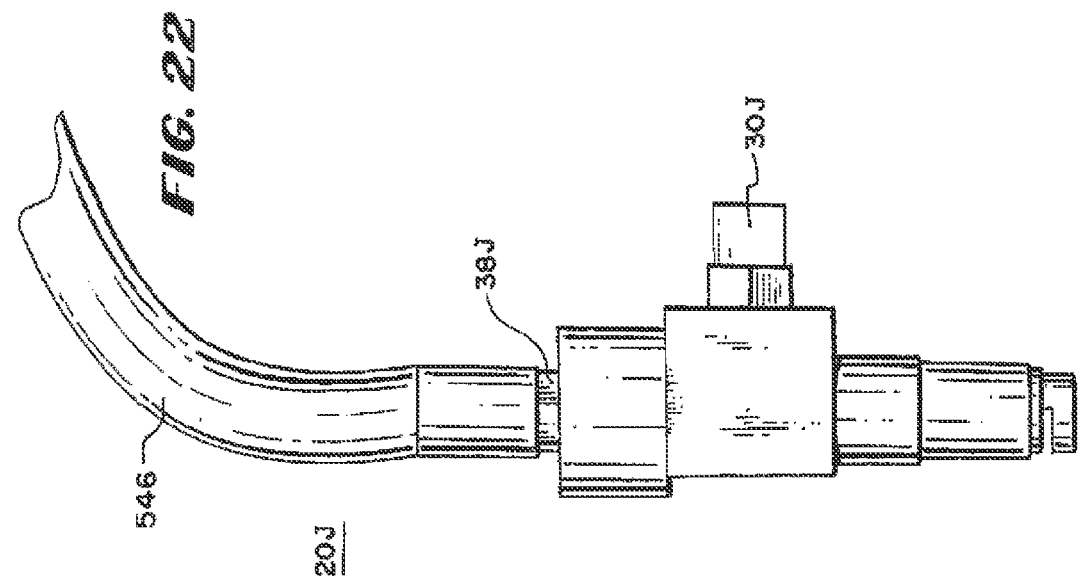
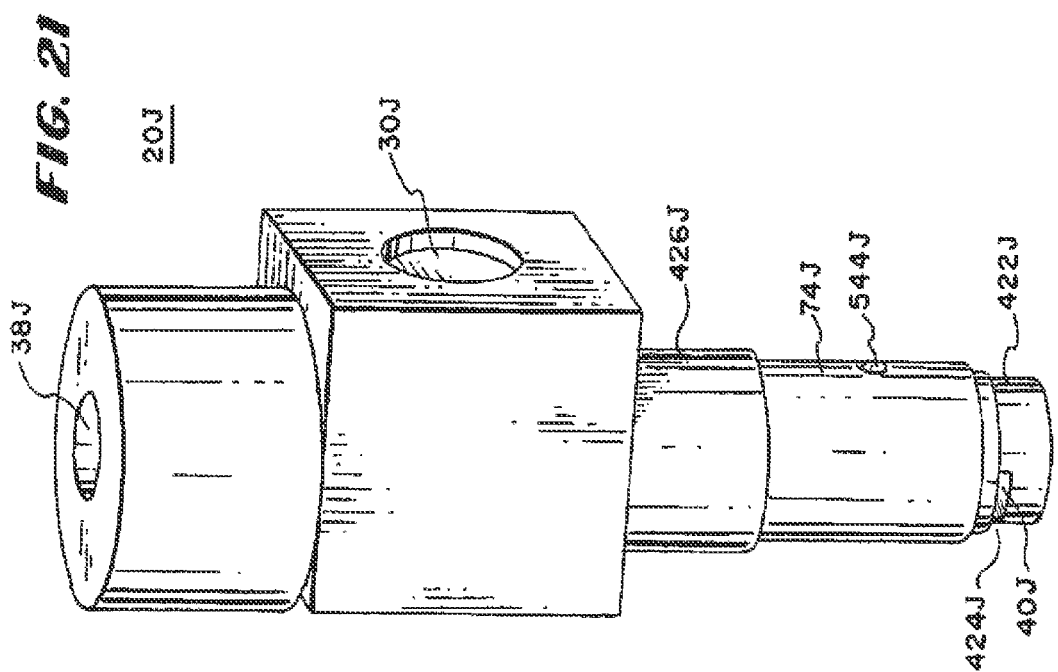

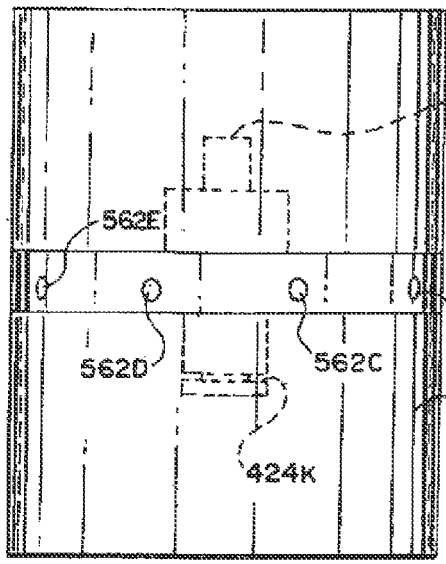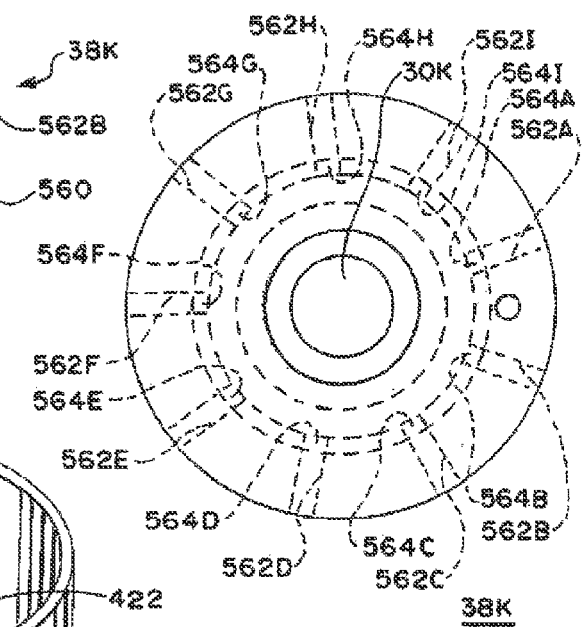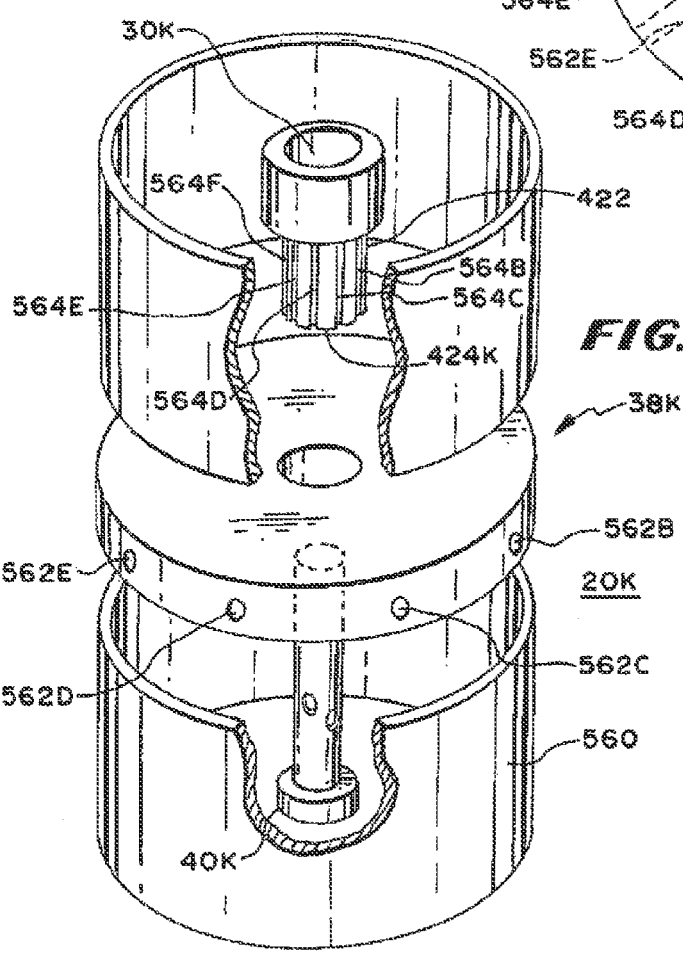

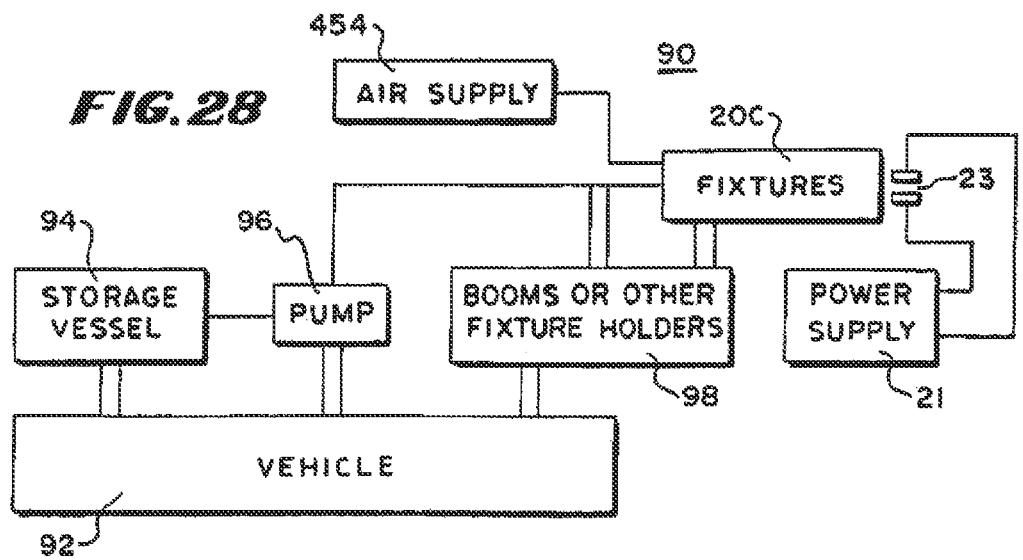

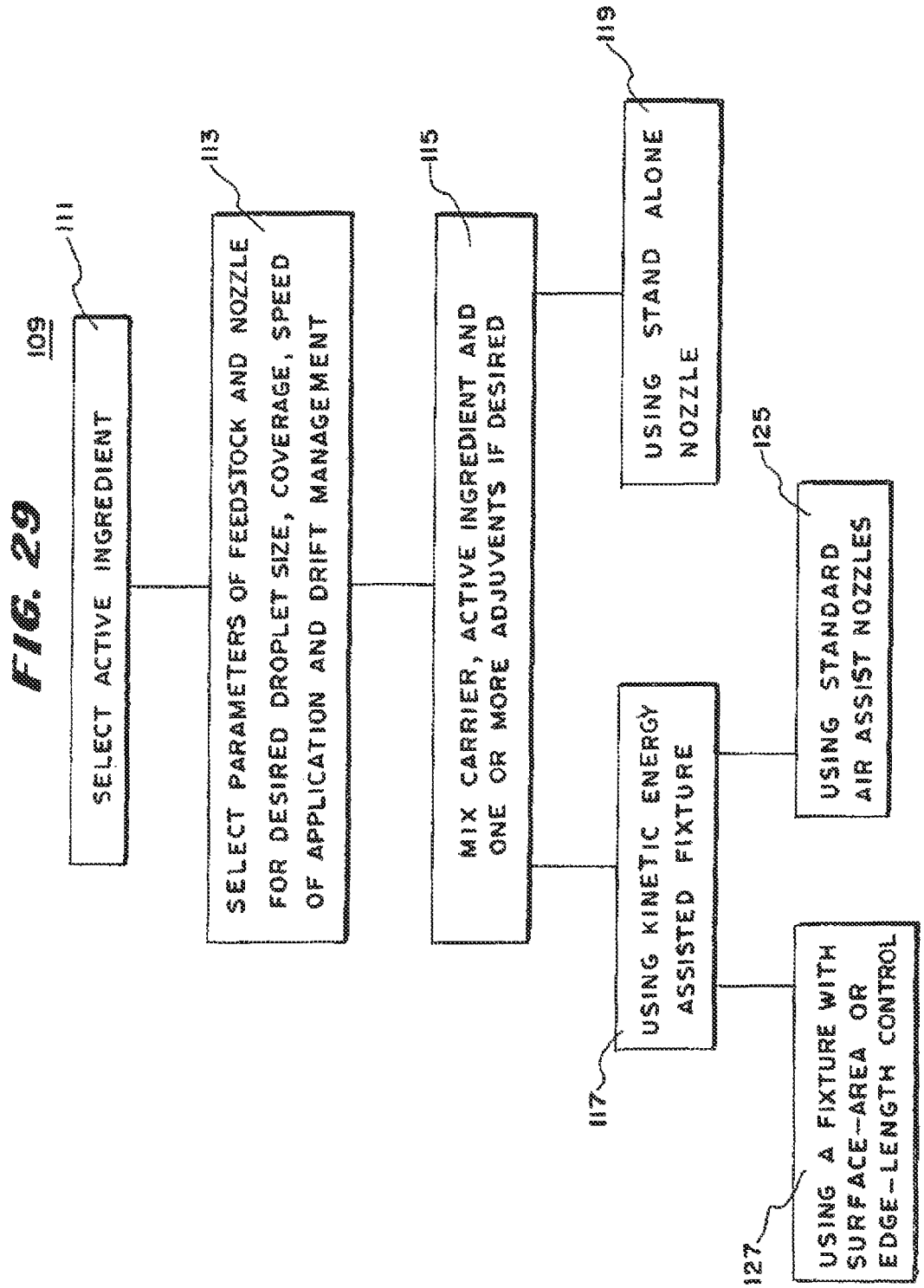

FIG. 32 120

- FORMING A FLUIDIC CONTINUOUS MEDIUM CAPABLE OF SUSPENDING SEEDS AND/OR OTHER PARTICLES AND MOVING THE SEEDS AND/OR OTHER PARTICLES WITH THE CONTINUOUS MEDIUM — 122
- MIXING SEEDS AND/OR OTHER PARTICLES IN THE CONTINUOUS MEDIUM TO FORM FLUIDIC SEMISOLID WITH RANDOMLY DISPERSED SEEDS AND/OR OTHER PARTICLES WITHIN IT — 124
- DISTRIBUTING THE FLUIDIC SEMISOLID WITH RANDOMLY DISPERSED SEEDS AND/OR OTHER PARTICLES WITHIN IT ON AN AGRICULTURAL FIELD — 126

FIG. 33 130

- PREPARING A SEED SUPPORTING MEDIUM AND INCORPORATING BENEFICIAL INPUTS WITH THE SEEDS — 132
- MIXING SEEDS IN THE SEED SUPPORTING MEDIUM TO FORM FLUIDIC SEMISOLID WITH RANDOMLY DISPERSED SEEDS WITHIN IT — 134
- DISTRIBUTING THE FLUIDIC SEMISOLID WITH RANDOMLY DISPERSED SEEDS WITHIN IT ON AN AGRICULTURAL FIELD — 136

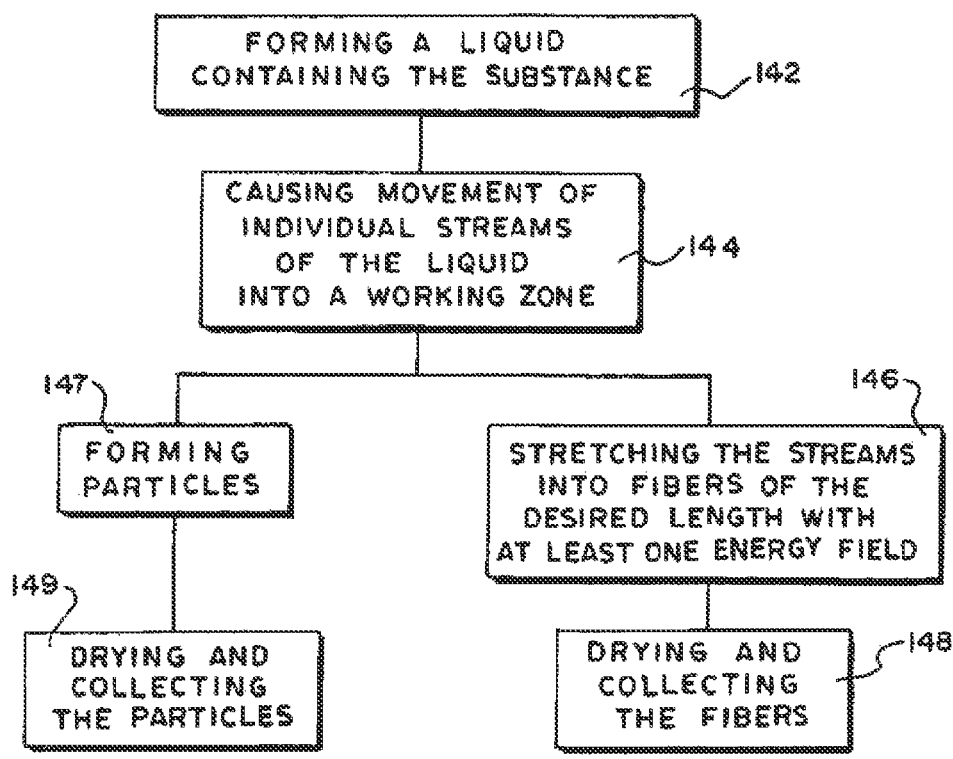
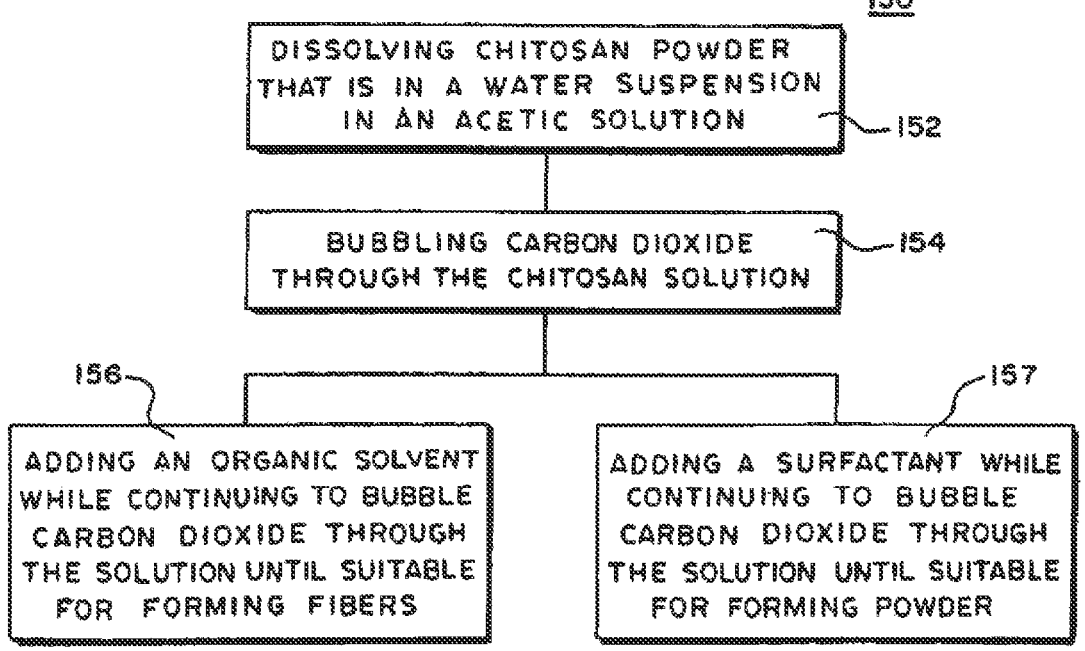

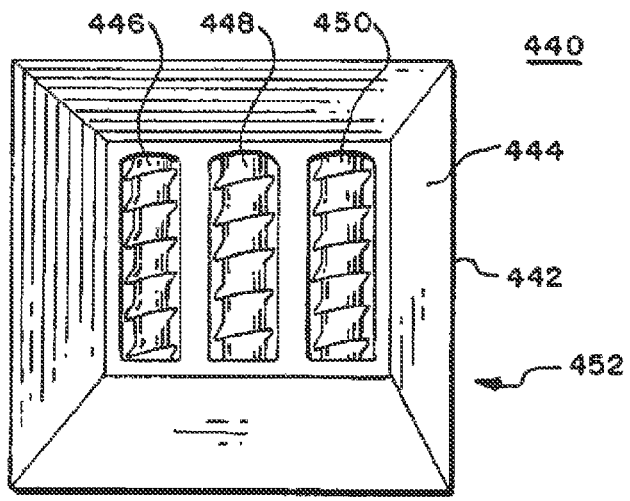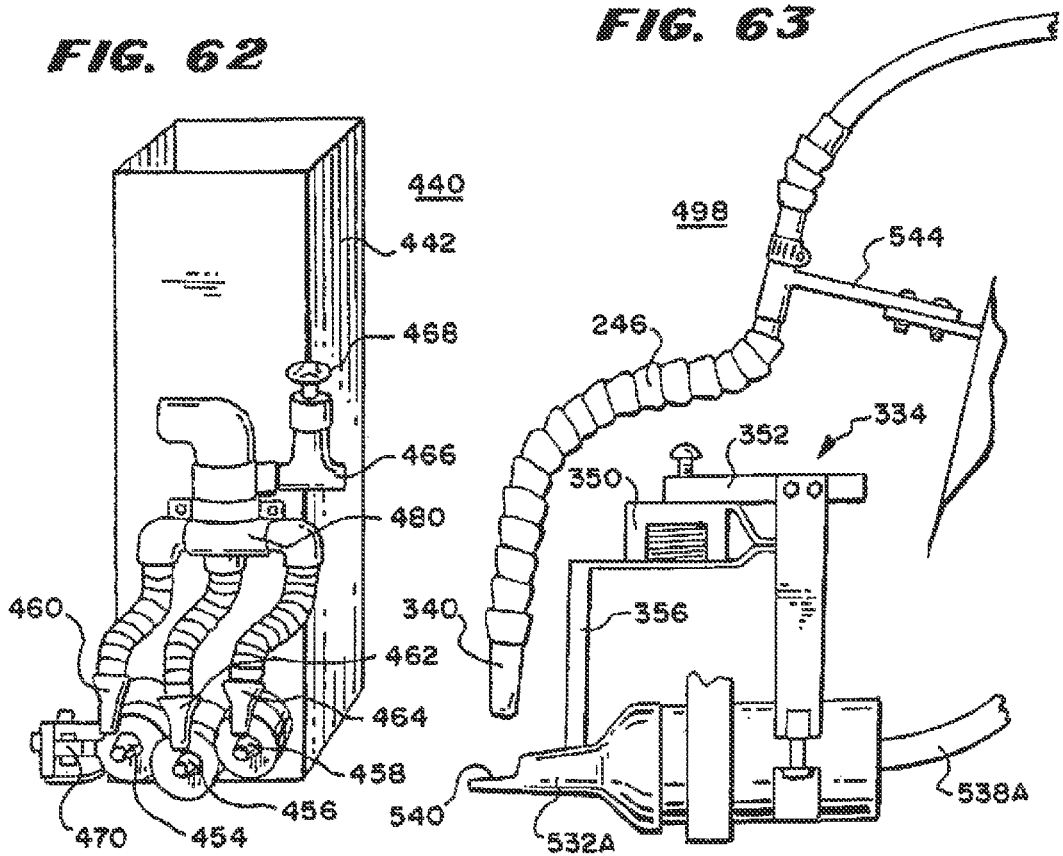

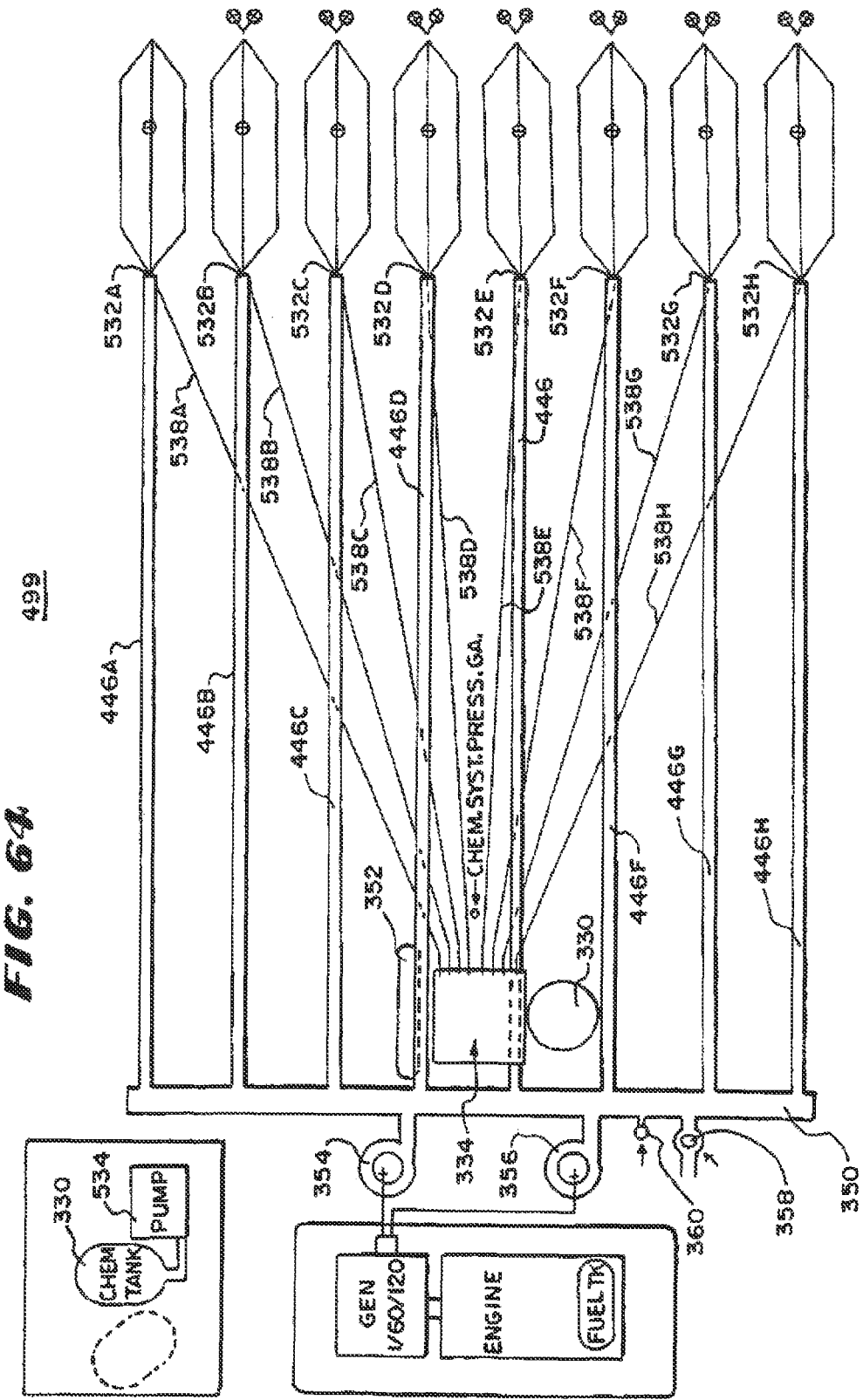

SYSTEMS FOR THE CONTROL AND USE OF FLUIDS AND PARTICLES

RELATED CASES

This application is a continuation of U.S. patent application Ser. No. 12/420,708, filed Apr. 8, 2009, which is a continuation-in-part application of U.S. patent application Ser. No. 11/405,603, filed Apr. 17, 2006, in the names of John Alvin Eastin, et al., for SYSTEMS FOR THE CONTROL AND USE OF FLUIDS AND PARTICLES, which is a continuation in part of U.S. patent application Ser. No. 11/109,398 filed Apr. 19, 2005, in the names of John Alvin Eastin, et al., for SYSTEMS FOR THE CONTROL AND USE OF FLUIDS AND PARTICLES.

BACKGROUND OF THE INVENTION

This invention relates to the forming, shaping, control and use of fluids and particles such as for example in agriculture and agricultural related fields. One example is the formulation of agricultural inputs, shaping them into droplets or particles, and the distribution of the droplets or particles over a field. Another example is for the encapsulation of seeds with or without chemicals and biological agents or the encapsulation of chemicals with or without biological agents and distribution of the encapsulated seeds or chemicals or biological materials. Still another is for the suspension of seeds for fluid drilling of seeds with or without chemicals or biological materials.

It is known to shape and spray fluids and suspensions with spraying systems. In some applications, the fluids and suspensions are formed into droplets or aerosols and sprayed by the spraying systems. In other applications, the fluids form particles or capsules about seeds or chemicals.

One use of such spraying systems is to apply agricultural inputs to agricultural fields. Commonly, the spraying systems include vehicles that carry the agricultural inputs and spray equipment that apply the agricultural inputs from the vehicle through fixtures supported by booms on the vehicle. The spray equipment may include pumps for liquid and air for distributing the agricultural inputs.

In one type of prior art spraying system for this use, the vehicles used to spray the agricultural fields carrying large volumes of diluted active ingredients because it is difficult to spray low volumes of carrier that could deliver more concentrated forms of the active ingredient. Moreover, the vehicles may be outfitted with a high pressure source of air and/or other fluid and thus may require one or more relatively large pumps to spray the liquid containing the active ingredient because high pressure air and/or liquid pressure is needed to form the desired spray and a large volume of liquid containing the active ingredient. In some such systems, the fixtures or nozzles are relatively high above the target for the spray to permit the pattern of fluid to provide an adequate area of coverage with the spray. Usually the pattern shape is determined by the nozzle and has a limited angle. One reason for diluting the active ingredient is because existing spray equipment used in agriculture cannot spray viscous material with the desired size drops and drop distribution and accurate low volume equipment is not economically available. Typically water is used to dilute the active ingredient because it is: (1) inexpensive; (2) benign to plants and beneficial to microorganisms; and (3) widely available.

The prior art spray systems have several disadvantages such as for example: (1) they require vehicles carrying the agricultural inputs to carry heavier than desirable weights of agricultural inputs with the associated water carrier; (2) they require the replenishment of the supply of agricultural inputs carried by the spray vehicles periodically, thus increasing the time and expense of spraying; (3) they cannot be used for the application of some beneficial microorganisms because the microorganisms are killed by the high pressure drop upon release through the spray nozzles used in the prior art techniques for application of agricultural inputs; (4) the low viscosity agricultural inputs drift when sprayed as small drop sizes; (5) some of the carriers used for dilution, such as water, have high surface tension and form beads on contact rather than spreading for example over a leaf; (6) the low viscosity sprayed drops tend to break up because of low shear resistance, thus forming smaller drops that are subject to increased drift; (7) some of the carriers used for dilution, such as water, have unpredictable mineral content and pH variations; (8) the angle of the pattern of sprayed fluid from the nozzles is limited thus requiring the nozzle to be positioned at a high elevation above the spray target to obtain adequate coverage but the high elevation increases drift; (9) the use of some combinations of active ingredients in conventional carriers in some circumstances causes precipitation of active ingredients (10) the prior art systems cannot effectively spray some particles such as particles that have absorbed active ingredients in them that are to be released at a later time and/or environmental condition or over a timed interval because for example they cannot spray viscous formulations that facilitate suspension of such materials; (11) the angle over which the spray is released for hydraulic nozzles is less flexible in prior art nozzles resulting in target coverage limitations; (12) the conventional high pressure hydraulic atomization nozzles used, result in excessive nozzle wear and consequential variations in the distribution rate and frequent changes in nozzles; (13) sprayer vehicle speed is limited by the pressure because higher pressures are required for high rates of application and that results in small droplets that drift and there are pressure limitations on the system components; and (14) some of the materials used for carriers are low density and/or evaporate quickly thus increasing the tendency to drift. Moreover, in some instances, the drops lose some carrier by evaporation and the drops end up with concentrations of materials that cause necrosis of plants that are not intended to be adversely affected by the spray.

The prior art attempts to reduce drift that have been faced by a dilemma-small drop sizes increase drift problems but provide good coverage of the target and large drop sizes reduce drift but provide poor coverage of the target. The higher concentration sprays have an increased tendency to cause necrosis of plants. For example, some compositions of glyphosate sprays concentrate on plants immune to the effects of glyphosate (Round-up Ready crops are engineered to resist the toxic effects of glyphosate. Round-Up Ready is a trademark of Monsanto Company.) The prior art attempts to resolve this dilemma by compromising between drop size and drift and selecting special nozzles. The special nozzles rely upon air injection into the liquid to facilitate atomization and assist in reducing liquid pressure or the use of liquid pulse modulation systems. These prior art approaches have disadvantages of still providing coverage less effective than desired or longer drift distances than desired and are limited in the application rate adjustments that can be practically achieved as application vehicles change speed in order to maintain constant per unit of field area application rates.

Spray apparatuses are known for spraying viscous materials. The known types of spraying apparatuses have not generally been adapted for use in spraying agricultural inputs or for conditioning soil or treating microorganisms. Moreover, the known spraying apparatuses for spraying viscous materials are not readily adjustable for adjusting drop size, density or pattern of the drops in the field in accordance with circumstances such as wind speed, distance of spray fixture from the spray target, or speed of a ground vehicle or airplane.

Higher density materials have been available to use as carriers for active ingredients but have not been used because of economic reasons or undesirable characteristics or the belief that such materials would be difficult to spray because of their viscosity or density or because of the custom of using water as the primary carrier material. Many of the active ingredients are difficult to spray with prior art stand-alone nozzles or air assist nozzles because they principally require pressure against an orifice to meter and atomize the materials and that cannot be reasonably accomplished with viscous liquids. The long established and reasonable practice has been to dilute the high viscosity active ingredients with low viscosity mobile carriers such as water.

However, it has been found that this general prior art approach is not the best approach and has the disadvantage of resulting in a low concentration, higher weight and higher volume load carried by the spray vehicle than is desirable.

It has been proposed in Hopp, et al., *Laboratory Studies on Glycerin as a Supplement in Water Soluble Herbicidal Sprays*, American Journal of Botany, v. 33, n. 7, (July 1946) pp. 598-600, to add glycerin to herbicidal sprays to aid in uptake of the herbicide by plants. However, the addition of glycerin to sprays has not been adopted, possibly because of the expense and the difficulty of spraying higher viscosity materials.

It is known from U.S. Pat. Nos. 5,520,331; 6,598,802 B2; and 6,241,164 B1 to form bubbles and to burst the bubbles to form a chemical mist for fire suppression. It is suggested that the disclosed apparatus could be used for other applications requiring a chemical mist including the application of chemicals to plant life.

The apparatuses and process disclosed in these patents have a disadvantage in that they are not adapted for use with viscous materials nor adapted to adjust drop size and distribution in a manner suitable for the application of many agricultural inputs.

It is known from U.S. Pat. No. 5,680,993 and Canadian patent CA 2,223,444 to form drops of agricultural inputs at low pressures by pumping a stream of agricultural input from the center of a stream of air in the same direction as the flow of air. Other jets of air are directed at the stream of agricultural inputs from the side. This prior art device has the disadvantage of requiring the agricultural input to be pumped through a narrow conduit under pressure into the stream of air and thus is limited in handling viscous agricultural products, semisolids and mixtures of semisolids and particles.

It is known to mix fluids and particles and to chemically or physically interact them. Some coating processes, for example, physically interact materials to encapsulate one within the other and some chemical processes such as combustion within an internal combustion engine mix fuel and other gases such as air and at times water and then chemically combine the fuel with oxygen from the air and physically interact the fuel, air and products of combustion with the water if water is present to create mechanical motion. There are many such procedures that shape, mix and interact different fluid materials for useful purposes.

The prior art processes for mixing fluids and particles and chemically or physically interacting them have some common disadvantages. For example, the size of particles or drops or phase of the materials being mixed may not be as appropriate as possible, the selection of materials or proportion of different materials to be interacted may lack some materials or include too many materials or not have a sufficient quantity of some materials or the timing of the interacting of materials may not be suitable or the material compatibility may be for example time or concentration sensitive.

Fluid drilling systems that supply a mixture of gel and seeds onto an agricultural field are known. One prior art fluid drilling apparatus uses impeller pumps or peristaltic pumps or the like to extrude a mixture of gel and seeds. The seeds are germinated prior to planting. Such processes are shown in United Kingdom patent 1,045,732 and in U.S. Pat. No. 4,224,882. These apparatuses have a tendency to distribute seeds with irregular and poorly controlled spacing between the seeds and under some circumstances damage seeds. Moreover, they are prone to plugging from the accumulation of seeds in tubes used in the apparatus.

It is known that an internal delivery tube diameter to seed diameter ratio of at least 3 to 1 is desirable for delivering gel seed mixtures to a planter row. Moreover, when moving fluid gel seed mixtures in a tube, the seeds are propelled much faster at the center line of the tube than at the side walls as a function of the laminar flow conditions which, exist for gels having a viscosity that suspends seeds. Because the tube-seed ratio must be so large, adequate flow for fluid drilling of large seeds requires inordinate amounts of fluid and very large pumps to get the seeds delivered. The requirements for pump size and fluid amounts increase exponentially as seed diameter increases linearly for the systems currently in use.

It has also been shown with peristaltic pump systems at seed densities in gel where the volume of gel to volume of seed ratio is less than about four, frequent blocking of the pump inlet port by seeds is experienced. The same limitations apply to piston or air displacement systems. Gels continue to extrude while the seeds pile up at the port as the amount of seed in the mixture increases.

These disadvantages limit the flexibility of the current fluid drilling hardware for delivering large seeds, for using smaller quantities of gel to reduce gel cost per acre and for reducing the volume of gel that must be carried by the planting equipment. Further, this ratio limitation impacts the use of optimal concentrations of treatment chemicals or microorganisms in gels while still being able to use low total amounts of treatment per acre through using for example, gel to seed ratios of 1 to 1. Thus the physics of dispensing seeds suspended in non-Newtonian fluids imposes strict limitations on the utility of the current commercial fluid drilling hardware. Attempts to reduce this problem have relied in some circumstances on seed detectors, and counters or timers that attempt to control the rate of dispensing of seeds in accordance with the rate of travel of a tractor. Such an approach is disclosed in U.S. Pat. No. 3,855,953. This approach has not entirely solved the problem in a satisfactory manner.

It is also known to use screw type mechanisms that receive and capture seeds carried along by a fluid such as air or water and emit the seeds one by one. Such an apparatus is disclosed in U.S. Pat. No. 2,737,314 to Anderson. This apparatus has a disadvantage of damaging seeds and being relatively complicated and unreliable. Augers are known for conveying matter from place to place but such augers have not been successfully adapted up to now to fluid drilling apparatuses. Some such augers have utilized a stream of air at an angle to the flow of material to break off controlled lengths of the material and such an apparatus is disclosed in U.S. Pat. No. 3,846,529. However, this patent does not disclose any method of fluid drilling. The augers used in the prior art are not designed in a manner adequate to separate seeds, to avoid plugging of the conduits carrying the seeds and gel to the nozzle from which they are to be expelled into the ground nor to maintain spacing between seeds while moving them along the auger.

It is also known to use openers and planting shoes to prepare a furrow in which to deposit seeds. The prior art planting shoes have a disadvantage when used for fluid drilling in that there is insufficient space to permit accurate deposit of gel and seeds at a location protected by the shoe. In some prior art planters, additives such as growth stimulants, fungicides, herbicides and/or beneficial microorganisms are deposited separately from the seeds or coated onto the seeds or deposited in carrier materials. The prior art apparatus for applying additives generally deposit granules. These apparatuses have a disadvantage in that they waste expensive additives by applying them nonuniformly and at locations where they are not needed. Attempts to inoculate seeds with beneficial microorganisms other than *Rhizobia* have not been as successful as desired.

SUMMARY OF THE INVENTION

Accordingly, it is an object of the invention to provide a novel apparatus for handling viscous materials.

It is a further object of the invention to provide a novel apparatus for spraying viscous materials.

It is a still further object of the invention to provide a novel method for applying large numbers of discrete portions of a material to surfaces such as applying material to leaves or to a field with increased efficiency.

It is a still further object of the invention to provide a novel method and apparatus for encapsulating materials.

It is a still further object of the invention to provide a novel method and apparatus for the application of agricultural inputs.

It is a still further object of the invention to provide a novel method and apparatus for forming fibers.

It is a still further object of the invention to provide a novel method and apparatus for solubilizing chitosan.

It is a still further object of the invention to provide a novel method and apparatus for forming a biodegradable fabric with sufficient cell adhesion to be implanted in animals.

It is a still further object of the invention to provide a novel method of making salt free chitosan mats, gauze, particles and/or fibers.

It is a still further object of the invention to provide a novel method and apparatus for applying agricultural inputs at low liquid pressures.

It is a still further object of the invention to distribute spray of agricultural inputs with low pressure air.

It is a still further object of the invention to provide a novel method and apparatus for applying low volume high concentration agricultural inputs.

It is a still further object of the invention to provide a novel method of controlling the drift of sprays.

It is a still further object of the invention to provide precise control of flow rate with low pressures.

It is a still further object of the invention to provide a novel method of encapsulating products.

It is a still further object of the invention to provide novel apparatuses and methods for planting.

It is a still further object of the invention to provide a novel mechanism for fluid drilling seeds while keeping them properly spaced and undamaged.

It is a still further object of the invention to provide a novel system for applying chemicals to fields for beneficial agricultural results.

It is a still further object of the invention to provide a novel planter.

It is a still further object of the invention to provide a novel method and apparatus for planting seeds inoculated with beneficial organisms.

It is a still further object of the invention to provide a novel method and apparatus for planting seeds together with beneficial chemicals and microorganisms without damaging the microorganisms with high pressure.

It is a still further object of the invention to provide a novel carrier for seeds, chemicals and beneficial microorganisms.

It is a still further object of the invention to provide novel carriers for pesticides that are of higher density, low evaporation properties and lower volatility than commonly used.

It is a still further object of the invention to provide a novel carrier-nozzle combination for pesticide sprays.

It is a still further object of the invention to provide a novel system for spraying pesticides with glycerin as a carrier component for the pesticide delivery.

It is a still further object of the invention to provide a spray system that combines low drift with effective coverage.

It is a still further object of the invention to provide a spray system that sprays high viscosity, high density, low evaporation and low volatility agricultural inputs in small droplets under low pressure in a desirable pattern.

It is a still further object of the invention to provide a spray system in which droplet size may be controlled without changing liquid pressure.

It is a still further object of the invention to provide a spray system in which drift and coverage are managed by selection of the density and viscosity of the carrier and by selection and adjustment of the spray fixture and sprayed kinetic energy fluid properties.

It is a still further object of the invention to provide an improved method and apparatus for spraying glyphosate.

It is a still further object of the invention to provide a novel spray fixture that may be retrofitted to existing spray equipment to provide superior spray coverage.

It is a still further object of the invention to provide a novel method for forming fibers such as chitosan fibers.

It is a still further object of the invention to provide a novel plant spray formulation.

It is a still further object of the invention to provide a novel method of forming a chitosan solution.

It is a still further object of the invention to provide a novel method of converting adaptive materials to a gaseous phase.

It is a still further object of the invention to provide a novel method for combining immiscible materials.

It is a still further object of the invention to provide a novel method for forming combinations of immiscible materials.

It is a still further object of the invention to provide novel growth regulators.

It is a still further object of the invention to provide a novel method for making nanostructures.

It is a still further object of the invention to provide a novel method for making nanoparticles.

It is a still further object of the invention to provide a novel method for making elongated members with diameters in the nanometer range.

It is a still further object of the invention to provide a novel method for making longer nanofibers.

It is a still further object of the invention to provide a novel nanofiber.

It is a still further object of the invention to provide a novel method of making nanostructures from a wide range of different materials.

It is a still further object of the invention to provide a novel method of making nanostructures that can be used on materials without regard to the electrical characteristics of the materials.

It is a still further object of the invention to provide novel apparatuses and methods for interacting materials.

It is a still further object of the invention to provide novel apparatuses and methods for forming and using a mixture of materials.

It is a still further object of the invention to provide novel apparatuses and methods for applying multiple materials that are physically and/or chemically interacted.

It is a still further object of the invention to provide novel methods and apparatuses for spraying multiple immiscible materials together.

It is a still further object of the invention to provide novel methods and apparatuses for reducing evaporation of droplets during spraying and delivery of the droplets.

It is a still further object of the invention to provide novel methods and apparatuses for chemically and/or physically interacting and using immiscible materials to enhance chemical reactions.

It is a still further object of the invention to utilize the timing and choice of materials to control the volume and proportions of materials that are to chemically or physically interact.

It is a still further object of the invention to provide a novel method and apparatus for controlling the enthalpy of a mixture during the reaction of components of the mixture.

It is a further object of the invention to control the size of particles, mists and drops and the proportions of materials in the form of particles, mists and drops and proportion of particles mists, vapors drops and gases that are mixed for purposes of chemical reactions.

It is a still further object of the invention to provide novel apparatuses and methods that use the Joule Thomson effect to enhance chemical reactions.

It is a still further object of the invention to provide a novel apparatus and method that uses the latent heat of water absorbed during vaporization to improve the efficiency of chemical reactions.

It is a still further object of the invention to provide a novel method for applying large numbers of discrete portions of a material such as an agricultural or medical input to surfaces such as the surfaces of leaves or fields or wounds with increased efficiency.

It is a still further object of the invention to provide a novel method and apparatus for encapsulating materials.

It is a still further object of the invention to provide a novel method and apparatus for the application of agricultural inputs.

It is a still further object of the invention to provide a novel carrier for medical inputs.

It is a still further object of the invention to provide a novel method and apparatus for forming elongated members such as fibers.

It is a still further object of the invention to provide a novel method and apparatus for solubilizing chitosan.

It is a still further object of the invention to provide a novel method and apparatus for forming a biodegradable fabric with sufficient cell adhesion to be implanted in animals.

It is a still further object of the invention to provide a novel method of making salt free chitosan mats, gauze, particles and/or fibers.

In accordance with the above and further objects of the invention, feedstock material is moved to the outlet of a fixture and has its characteristics altered. For many applications, the feedstock includes a carrier and an active ingredient and in some cases adjuvants may be included to improve the performance of the active ingredient. In this specification, fixtures are classified into two broad categories, which are: (1) kinetic energy assisted fixtures; and (2) stand-alone outlet fixtures. Kinetic energy assisted fixtures are fixtures in which the shape of the feedstock leaving the fixture is influenced by a kinetic energy fluid such as air that flows over a film of feedstock to form droplets of viscous or non-viscous feedstock. Stand-alone nozzles are fixtures in which the flow of feedstock from the outlet is not shaped by a kinetic energy fluid but principally by the pressure applied to the feedstock, the geometry and shape of the outlet and the viscosity of the feedstock.

There are two types of kinetic energy assisted fixtures, which are: (1) edge length and surface area controlled fixtures; and (2) standard air assist nozzles. Edge length and surface area controlled fixtures are kinetic energy assisted fixtures in which the droplet size and distribution are controlled inter alia by the length of edge or surface area that receives a layer of feedstock and has the kinetic energy fluid flowing over it. Standard nozzles are any of the known types of known nozzles that receive a flow of air to aid in the removal of feedstock from the nozzle outlet without regard to the distribution of viscous fluid over an edge or surface as one of the control variables.

The nature of the fixture influences the size of the droplets and the distribution pattern of the droplets. The effectiveness of an agricultural input is affected by the size of the droplets, the distribution pattern, the nature of the active ingredient in the feedstock, the concentration and amount of the active ingredient in the feedstock that hits the target and can be utilized by the target. Conventionally, the type of nozzle or nozzle tip is selected in accordance with the purpose for applying the active ingredient, environmental conditions and nature of spray equipment i.e. wind speed, aerial spray, boom spray etc. Some active ingredients are too viscous to be sprayed by the nozzle selected for conventional spray system reasons, in which case the active ingredient was diluted and the rate of spray adjusted for an economical application in the conventional spraying systems.

Surprisingly, the approach of diluting the active ingredient with the least viscous material that does not reduce or does not increase the benefits intended for the spray is not the best approach although it appears to be the logical approach. Instead, in accordance with the method disclosed herein, it is usually more economical to use a viscous carrier to dilute and carry many of the active ingredients in use. The viscous carrier can receive and hold a higher concentration of active ingredient and a fixture can be selected that will spray the resulting mixture at low pressure, high concentration and small droplets in a pattern that permits spray near the canopy. The high concentration creates a more dense droplet and by proper selection of the viscous carrier and spray fixture the feedstock using a properly selected viscous carrier can reduce evaporation and volatility and increase material deposition and increase uptake by plants or pests when that is the desired result. Although this approach is counterintuitive, the results of tests have been surprisingly good.

For example, in the case of glycerin as a carrier, glycerin compositions can reduce the viscosity of glyphosate to a viscosity that can be sprayed by standard stand-alone nozzles and air assist nozzles in the same manner as water. Materials such as glyphosate can be carried by the glycerin and can be deposited more effectively because of the more favorable surface tension and vapor pressure of the compositions. Specific glycerin combinations can be developed and can be sprayed. Carriers containing glycol such as raw glycerin that is a by-product of other chemical syntheses has been particularly effective in tests.

Because glycerin has a hydrophobic tail not a hydrophilic molecule, it forms a hydrophobic interface with air in a droplet and reduces vapor pressure on the surface of the droplet. Thus it reduces evaporation of other ingredients of the droplet in flight.

In selecting a spray fixture, the viscosity of the feedstock must be taken into consideration. The viscosity of the feedstock may be altered as part of this process to bring it into the range of a more desirable spray fixture. For example, air-assist nozzles can generally handle a higher viscosity than standard flat fan nozzles. Thus, the user has a choice of using less diluent with an air assist fan nozzle or more diluent and a standard flat fan nozzle. There are many such choices including choices between the many types of nozzles such as stand-alone nozzles, air assist nozzles and fixtures of this invention with compatible conduit-feedstock critical values—size conduit, shape conduit, and viscosity of feedstock that permits flow of feedstock at pressure lower than critical pressure. In this specification, the words, "critical pressure" means pressure low enough so that there is no need for a source of high pressure or conduits and connections that can withstand high pressure and low enough to provide desired spray pattern and environment for any life forms desired to be maintained such as beneficial bacteria but high enough to provide the desired volumetric flow rate and small enough droplet size with selected stand-alone fixture of this invention.

At least one other material, which is a fluid, referred to herein as kinetic energy fluid because it imparts energy to the feedstock, impacts the feedstock material. The kinetic energy fluid shapes the feedstock material into a form that depends on any of several variables. The variables are physical and energy characteristics of the feedstock material, of the kinetic energy fluid and of the fixture outlet. These variables cause the formation of drops, mist, vapor or solid particles depending on their values. The feedstock material may include an agricultural input such as a pesticide, fertilizer, liquid, gel, microorganisms, seeds, hay conditioning agents, seed additives, solids with special properties such as chitosan or combinations of these and may be sprayed or used for fluid drilling or formed into and collected as fibers for agricultural, industrial, medical or other uses. In this specification the feedstock material may include an active ingredient and one or more additive or diluting material intended to enhance the action of the active ingredient or alter the physical or chemical characteristics of the feedstock material. For example, a viscous material such as glycerol may be added to alter the physical characteristics of the feedstock material and enhance its operation or its ability to be distributed.

The kinetic energy fluid is usually a gas such as air. In the preferred embodiment, drops with a relatively prescribed size distribution are formed by forcing the kinetic energy fluid at low pressure against a wall of feedstock having a prescribed height and thickness with the kinetic energy fluid maintaining the prescribed velocity with respect to the velocity of the feedstock. For example, to increase the volumetric rate and keep the size of the drops constant, the pumping velocity of the feedstock is increased together with an increase in the length of the outlet or an increase of the velocity of the kinetic energy fluid. The volumetric rate of forming drops is varied by varying at least one of the length of the wall and the velocity of the fluid being transferred to the outlet opening. The angle of movement of the drops is varied by varying the shape such as curvature of the wall and direction of movement of the feedstock The relevant characteristics of the feedstock material, the kinetic energy fluid and fixture outlet include: (1) the physical characteristics of the feedstock material and the kinetic energy fluid; (2) the energy characteristics of the feedstock material, the kinetic energy fluid and the fixture outlet or outlets; (3) the geometry of the fixture outlet or outlets and the relationship between the outlet for the feedstock material and the kinetic energy fluid; (4) the dimensions of the fluid material outlet and the kinetic energy outlet or outlets; (5) the molecular attraction between the feedstock material, the feedstock material fixture outlet, the kinetic energy fluid and the kinetic energy fixture outlet. In this specification, a feedstock material in which the relevant characteristics are formulated to cooperate with a selected kinetic energy fluid to provide the desired size, density, ability to adhere to a specific surface and viscosity of drops, mist, vapor or solid particles for certain active ingredients or additives in the feedstock material are referred to in this specifications as "specially formulated spray materials".

The physical characteristics of the feedstock materials and the kinetic energy fluids are their density, viscosity, surface tension density, conductivity and vapor pressure. The energy characteristics of the feedstock materials and the kinetic energy fluids are their temperature and their energy density. By energy density herein, it is meant the rate at which the feedstock material is pumped to the fixture outlet, the velocity and pressure at which the kinetic energy fluid or other energy source contacts the feedstock material and external energy that may be applied such as piezoelectric, ultrasonic, electrohydrodynamic forces or electric field forces. It includes the enthalpy of the feedstock material and kinetic energy fluids and energy that can be imparted by other sources such as for example, the application of charge to the output feedstock material or vibration of the feedstock material.

The geometry of the fixture outlet or outlets includes their shape, such as being an elongated slit that extrudes a sheet of feedstock material or kinetic energy fluid or a circular or specially shaped slit that extrudes a column or any other particular geometric shape. The dimensions will be reflected by the shape but also sizes such as the width of the path being swept by the kinetic energy fluid, the length of the path, the roughness of the path, fluid viscosity, surface tension, the thickness of the feedstock and the angle at which the kinetic energy fluid impacts the feedstock material.

In one significant aspect of this invention, droplet size and size distributions of sprayed agricultural inputs to agricultural fields are controlled. For example, viscous agricultural products that would, in prior art practice, be diluted so they are no longer viscous and then sprayed, instead can be sprayed in their viscous form with a drop size that will maximize the usefulness of the droplets. For example, certain pesticides that in the prior art techniques are diluted and sprayed at high cost because of the heavy weight and volume of water that must be carried by spray vehicles and the need for frequent replenishing of the supply on the spray vehicles, can be sprayed in a more concentrated form using the equipment and processes of this invention at much lower cost. Moreover, the droplets formed by the prior art equipment are frequently carried by the wind and become an environmental problem. However, with the method and apparatus of this invention, the problem of drift and the volume of carrier needed are reduced. Not only is the density higher with the system of this invention but it has been discovered that carriers with a higher density and better agronomic characteristics than water can be used. For example, glycerol can be used as a carrier. Glycerol increases the density and viscosity and reduces evaporation, improves droplet deposition and reduces drift still further. Moreover, it improves the adhesion to plants upon application over water as a carrier as well as being benign to beneficial microorganisms. Because the fixture provides a wide angle of departure and the fluid output is less subject to evaporation, the spray fixtures may be close to the ground, resulting in less drift and more efficient application of the active ingredient.

Another significant aspect of the invention is the formation of elongated members such as fibers and powders, particularly nanofibers and mats of such or thin membranes formed of nanofibers and powders having diameters in the nanometer range. A fixture having small dimension openings such as needles or slots to supply feedstock to a working area where it is impacted by a stretching force can generate thin fibers of many materials that otherwise would be difficult to form in narrow fibers. First the viscosity characteristics of the feedstock fluids that can be used in the fixture can have properties that cannot be delivered in conventional systems so advantageous formulations for making such materials can be used with the fixtures of this invention. The stretching force is supplied by one of several techniques such as: (1) by two kinetic energy fluids, having different velocities and impacting different portions of the feedstock material; (2) by acceleration of the feedstock materials; and (3) by electric forces. In some ranges of kinetic energy fluid, powders of the same materials can be formed.

One material that is formed into elongated members such as fibers, or mats of thin membranes or powders is chitosan. Chitosan is a biodegradable material which, if formed into mats and fibers containing both hydrophilic and hydrophobic materials of certain preferred compositions, is desirable for implanting during medical procedures. Electrospinning is a technique commonly used to obtain nanofibers but this technique is difficult to use and to scale up with certain materials including conventional chitosan solution and certain other materials due to physical properties such as surface tension and conductivity and viscosity. However, it has been found that chitosan can be solubilized with an acid solution and then the solution deacidified without neutralization with a salt resulting in a superior soluble composition for use in electrospinning or result in economical formation of salt free powders. Moreover, electro spinning using the formulation techniques of this invention can result in long nanofibers that are superior to what have been obtainable in the past and can be used to form mats that are desirable for medical purposes.

One use of powders is in encapsulation of liquids for later release or encapsulation of other items such as seeds to increase the size of the particle-coating combination or the particle size or to improve the identification or detection of the items such as with color or with fluorescence or for protection of the items or for timed release or release only under certain environmental conditions. The nanofibers can be economically formed into mats and used as wound dressing, taking advantage of the flexibility of nanofiber mats and sponges, the hemostasis ability of the mats of chitosan that permit the stopping of blood, the ability of the nanofibers of chitosan to adhere to the skin and the ability of the chitosan to form a barrier against microbes.

Agricultural inputs that are immiscible or incompatible with each other may be conveniently combined with the fixture of this invention. Any number of them may be combined by applying them through separate channels to the fixture and converting them to a gaseous stage with an air assist. In the gaseous stage they may be mixed in the desirable proportions even though they would be immiscible or incompatible in the liquid stage.

The spray fixture of this invention may be retrofitted to existing spray vehicles or others spraying equipment conveniently and economically. For such retrofitting, the kinetic energy input of the fixture is connected to the fluid line of an existing spray boom. Feedstock conduits are connected to the feedstock inlet of the fixture. In this manner fixtures may be properly spaced along the existing boom to spray agricultural inputs.

The ability to mix immiscible and high viscosity fluids as well as feed them independently while atomizing such materials as a droplet mixture, enables the mixing and application of inputs that ordinarily could not be applied together. Thus, several agricultural inputs such as pesticides, growth regulators, microorganisms and a fertilizer may be applied in the same trip through a field. For example, glyphosate or other pesticides may be mixed with a non-compatible Calcium containing foliar fertilizer and applied together from the same spray equipment in concentrated form in a single pass through the field even though one or more of the materials may be viscous and not miscible or compatible with others. It also permits the application of agricultural inputs such as glyphosate or other such pesticides with more dense liquids that reduce drift and/or have lower vapor pressure to reduce evaporation and volatility.

To conveniently apply the viscous fluids using the new fixture and already existing spray equipment such as vehicles with booms and the like, fixtures are adapted to be connected to the tubular members in booms that are normally used to carry fluids to be sprayed. However, instead of liquids, these booms can easily be adapted to receive air flow for providing kinetic assisted spraying. Because the fluids are more economically used with low volume, they may be applied through separate conduits connected to the fixtures. Thus existing vehicle and boom equipment may be easily retrofitted for the spray fixtures of this invention.

To plant the seeds, they are mixed with a gel, which gel may include additives or additives may be added after the seeds and the gel are mixed. Additives may also be supplied from a separate source of gel to the seed trench. The gel is in a ratio of no more than three parts by volume of gel to one part by volume of seed although the exact ratio differs from seed to seed. It is sufficiently viscous to support the seeds and should have a viscosity of at least 180 centipoises. When a pure gel is used, the viscosity of the gel should be high enough to hold seeds for at least ten minutes in suspension without dropping more than six inches but not so viscous that seeds cannot be easily mixed throughout the gel and be relatively evenly spaced from each other nor so viscose that it cannot be easily moved to distribute it and the seeds. The ability to randomly mix and support seeds is enhanced by including solid particles.

In this process, a storage vessel communicates with a fixture through a semisolid transfer mechanism such as an auger. The storage vessel contains semisolids, viscous liquids, gels or powders, hereinafter referred to as "seed suspension materials" in which seeds are suspended or maintained spaced from each other for a period of time sufficient for fluid drilling. There is enough high density material including particles within the seed suspension materials to exert force on solid particles such as seeds and move them with the seed suspension materials rather than causing the seed suspension materials to flow around the seeds when force is applied. This combination permits seeds that are randomly distributed in the seed suspension materials to be moved by an auger and eventually dispersed randomly through the fixture. Glycerin is not only a superior carrier for spray applications of pesticides and fertilizers and the like but is a superior ingredient of seed suspension materials for use in prepared fluid drilling materials. A true colloidal suspension may be obtained by using nanoparticles in the prepared fluid drilling materials to aid in the suspension of seeds. The nanoparticles may include other agricultural inputs adhered, absorbed or adsorbed to them. Chitosan nanoparticles may be used for these purposes.

The fixture may be adapted to spray the seed suspension materials and small seeds or to apply a gel and larger seeds to a furrow or surface prepared for broadcast seed application. The seed and seed suspension materials may also be removed at the end of the auger by a seed knife which may be an air burst or a solid member that scrapes the material into a trough. In this process, the seed suspension material may be a material of sufficient density or a colloidal suspension having a density and viscosity that is sufficient so that the seeds will be extremely slow in settling. The seeds should be supported without settling more than ten percent and preferably less than five percent in the period of time between mixing the seeds in the medium and planting. Normally, this time will be less than a 24 hour period since commonly the farmer will mix the seeds and medium in the same 24 hour time period as he plants.

In this specification, "prepared fluid drilling materials" means suspension material for seed or other agricultural input which suspension material that is a semisolid, viscous liquid, gel or powder or a combination of these hereinafter referred to as "seed suspension materials" in which seeds or other agricultural inputs are suspended or maintained spaced from each other for a period of time sufficient for fluid drilling which rather than causing the seed suspension materials to flow around the seeds or other agricultural input when force is applied. The prepared fluid drilling materials according to this definition permits seeds that are randomly distributed in the seed suspension materials to be moved by an auger and eventually dispersed randomly through the fixture. Materials, whether containing particles or not, that have the characteristics described in this paragraph are referred to as "prepared fluid drilling materials". Glycerol is a superior prepared fluid drilling material.

To obtain adequate mixing, the seeds should have force directly applied to them. This can be accomplished by mixing into the medium a sufficient amount of solid and semi-solid particles so that there is contact through the solid particles and the moving surfaces applying force for mixing. In one embodiment, this mixture is moved by an auger to a furrow for planting and sections of it as appropriate for the number of seeds are removed from the end of the auger into the furrow. This can be done with a substantially conventional planter. The auger is synchronized normally with the speed of the planter which may be received from the wheel speed or any other proportional area signal. The auger has pitch angles on the screw graduated from low angles at the inlet to facilitate feeding the mixture of seed and gel or other prepared fluid drilling material to higher angles in the delivery tube section to give a friction pumping surface to move the mixture of seed and gel or other prepared fluid drilling material. With this configuration, the screw: (1) provides a shear surface motive force for delivering the seed and fluid mixture; (2) provides a moving delivery tube wall to dislodge any seed pile ups; and (3) singulates seeds into the delivery exit port.

In one embodiment, the mixture of gel or other prepared fluid drilling material and seed is placed in a hopper which communicates at its bottom with the auger: The auger: (1) has grooves between threads sufficiently wide to encompass at least two seeds within the matrix; (2) has trailing edges on the threads of the auger curved to provide a shear plate force to move the seeds with the auger without causing seeds to be removed from the viscoelastic suspending fluid mixture; and (3) is between three inches and 18 inches long. The auger rotates at a speed sufficient to cause the shear surfaces of the auger mechanism to deliver seed particles to the seed dispensing port at the rate desired for planting. The viscoelastic characteristics and suspension ability of the seed suspending medium are designed to move the seeds and suspension fluid through the system within very small changes in their ratio.

At the end of the auger, there is a tubular portion into which the seed-gel or other prepared fluid drilling material combination is inserted, with the tubular portion being vibrated when necessary by an external vibrator with sufficient maximum force intensity or maximum acceleration and distance amplitude to maintain the seeds in suspension as they are forced to the tip. A cutting mechanism, such as air flow, removes the seeds from the tip, causing them to be dropped into a furrow prepared by the planter. The air must be directed toward the ground and must not deviate within 45 degrees from a perpendicular to the ground in a plane perpendicular to the direction of the furrow and 75 degrees in a plane aligned with the direction of the furrow. The range of angles in the direction of the furrow and perpendicular to the direction of the furrow depends on the distance from the ground of the tip.

The total acreage being utilized may be measured by a conventional global positioning system for purposes of monitoring the amount of seed being dispersed and, under some circumstances, for accounting purposes such as billing or the like. In this specification, a fluidic continuous medium capable of suspending seeds and moving the seeds with the continuous medium while the seeds remain randomly distributed will be called a "seed-supporting medium".

In one embodiment, the seed suspension material is hospitable to and incorporates microorganisms and chemicals beneficial to the seeds that are solubilized or suspended. The beneficial inputs may be chemicals or beneficial microorganisms which can be inoculated onto the seed surface and sustained by the appropriate seed and microbe supporting medium. Many of the most suitable materials for inoculating seeds with beneficial chemicals and microorganisms are semisolids and viscous humectant materials that can be supplied with the appropriate seeds with a fixture in accordance with this invention.

The planter may be conventional and include conventional openers but because more space is needed to accommodate the delivery system for the gel or other prepared fluid drilling materials of this invention than many conventional systems with seed delivery tubes, a planting shoe is used having a shield portion for the type, size and rate of seed being delivered so as to receive a gel or other prepared fluid drilling material delivery tube and seed separator in close enough proximity to the seed trench to avoid blocking of nozzles by soil from the trench preparation, or moving of the seed and gel or other prepared fluid drilling material from its proper position by wind or planting system movement.

In one embodiment, a separate second gel or other prepared fluid drilling material delivery system is used adjacent to the seed and gel or other prepared fluid drilling material system to deliver gel or other prepared fluid drilling material with additives into the seed trench. Moreover, such a gel or other prepared fluid drilling material delivery system may be used to apply chemicals to fields separately from planting. The spacing of seeds from each other in a row may be controlled by intermittently stopping the air flow of the seeds in one embodiment. This may be done by temporarily interrupting the air flow such as the blower or by blocking the air nozzle.

From the above summary of the invention, it can be understood that the spray method and apparatus of this invention has several advantages such as: (1) vehicles and aircraft used for applying agricultural inputs to fields do not need to carry as heavy a load of agricultural inputs, for example, they can carry the same active ingredients as prior art agricultural inputs with a reduction in water of as much as 90 percent; (2) they reduce or eliminate the requirement for periodic addition of water carriers for agricultural inputs, thus reducing the time and expense of spraying; (3) they permit the application of some beneficial microbes with seeds because the agricultural inputs containing microbes can be applied at pressures low enough to avoid killing the microbes and in viscous humectant fluids that facilitate beneficial microbe infection; (4) the high viscosity, relatively large drop size and narrow size distribution of the agricultural inputs reduce drift when sprayed; (5) it is possible to avoid diluting agricultural inputs with carriers such as water that have high surface tension and form beads on contact rather than spreading such as over a leaf; (6) the viscosity and shear resistance of drops of agricultural inputs can be varied to change the spray characteristics such as drop size drop distribution and amount of drift; (7) it is not necessary to add carriers used for dilution, such as water, that have unpredictable mineral content and pH variations; (8) the tendency for active ingredients to precipitate out with time because of the addition of carriers is reduced; (9) in particular embodiments, the particle droplet size carrying active ingredients and formulation carrier chemistry can be regulated and thus provide better penetration into a host; (10) because low pressures are used, the hoses last longer and it is possible to spray at higher volumetric rates without exceeding the pressure capacity of the system; and (11) flow rate can be precisely controlled because low pressures are used.

It can be further understood from the above description that the planter in accordance with this invention has several advantages, such as: (1) it can provide effective fluid drilling with adequate separation of seeds; (2) it can provide planting of seeds with superior beneficial microbe inoculation characteristics; (3) it can combine effective planting with beneficial chemical and microbial additives; (4) it provides good separation of seeds being planted without repeated mixing of the fluid and the seeds; (5) there is less damage to seeds because of controlled priming in the presence of air and controlled water uptake; (6) it does not require carrying inordinate amounts of gel or other prepared fluid drilling material; (7) it is economical in the use of gel or other prepared fluid drilling material per acre; (8) there is less damage to seeds in the planting operation; (9) the seeds may be controlled for spacing in a superior manner to prior art drilling; (10) there is good control over uniformity in time of emergence of the plants from the seeds; and (11) it economically facilitates addition of seed protection additive.

BRIEF DESCRIPTION OF THE DRAWINGS

FIG. 1 is a flow diagram of a method for forming drops, fibers, mists and/or vapor in accordance with an embodiment of the invention;

FIG. 2 is a simplified schematic perspective drawing illustrating a spray system in accordance with an embodiment of the invention;

FIG. 3 is simplified perspective drawing of one embodiment of a fiber or particle generating fixture used in accordance with an embodiment of the invention;

FIG. 4 is a simplified perspective schematic view illustrating still another embodiment of the invention;

FIG. 5 is a schematic side view of the embodiment of spray apparatus of FIG. 4;

FIG. 9 is a perspective of one embodiment of spray apparatus in accordance with invention;

FIG. 10 is a perspective view of another embodiment of spray apparatus in accordance with an embodiment of the invention;

FIG. 11 is a partly exploded view of the embodiment of FIG. 10;

FIG. 12 is a partly broken away perspective view of still another embodiment of spray apparatus in accordance with an embodiment of the invention;

FIG. 13 is a perspective view of another embodiment of spray apparatus in accordance with an embodiment of the invention;

FIG. 14 is a side elevational view of the spray apparatus of FIG. 13;

FIG. 15 is a fragmentary enlarged view of the end of the spray apparatus of FIG. 13;

FIG. 16 is an enlarged perspective view of an insert used in the spray apparatus of FIG. 13;

FIG. 17 is a perspective view of another embodiment of spray apparatus in accordance with the invention;

FIG. 18 is an exploded perspective view of the embodiment of spray apparatus of FIG. 17;

FIG. 19 is a perspective view of another embodiment of spray apparatus in accordance with the invention;

FIG. 20 is an exploded perspective view of the embodiment of FIG. 19.

FIG. 21 is a perspective view of another embodiment of fixture;

FIG. 22 is an elevational view of the fixture of FIG. 21;

FIG. 25 is a simplified schematic view, partially perspective and partially sectioned of another embodiment of fixture;

FIG. 26 is an exploded view of the fixture of FIG. 25;

FIG. 27 is a sectional view of the member of a portion of the embodiment of FIG. 25;

FIG. 28 is a schematic block diagram of a spray apparatus in accordance with an embodiment of the invention;

FIG. 29 is a flow diagram illustrating the use of the spray system of this invention;

FIG. 32 is a flow diagram of a process for planting in accordance with an embodiment of the invention;

FIG. 33 is a flow diagram of another embodiment of a system for planting in accordance with the invention;

FIG. 34 is a flow diagram of a process for forming fibers in accordance with an embodiment of the invention;

FIG. 35 is a flow diagram of a process for forming a liquid or semi-solid suitable for use in the embodiment of FIG. 36;

FIG. 61 is a view looking from the top of another embodiment of seed or particle feeder;

FIG. 62 is another perspective view of the seed or particle seed or particle feeder of FIG. 60;

FIG. 63 is a perspective view of apparatus for supplying additives to fields;

FIG. 64 is a schematic plan view of a system for supplying chemical additives to fields.

DETAILED DESCRIPTION

Figure 6:
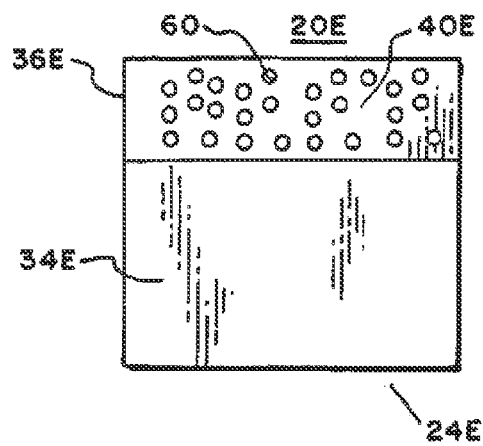
FIG. 6 is a sectional view taken through lines 6-6 of FIG. 5 illustrating a possible variation of the embodiment of FIGS. 2 and 4.
Figure 7:
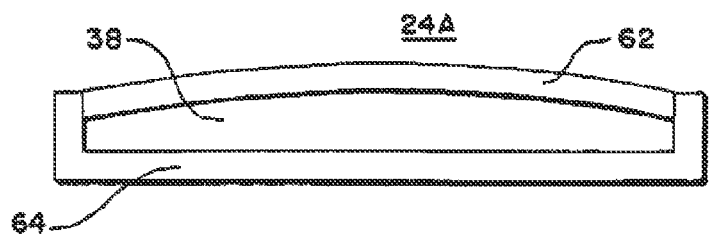
FIG. 7 is a fragmentary schematic front elevational view of an embodiment of the invention.
Figure 8:
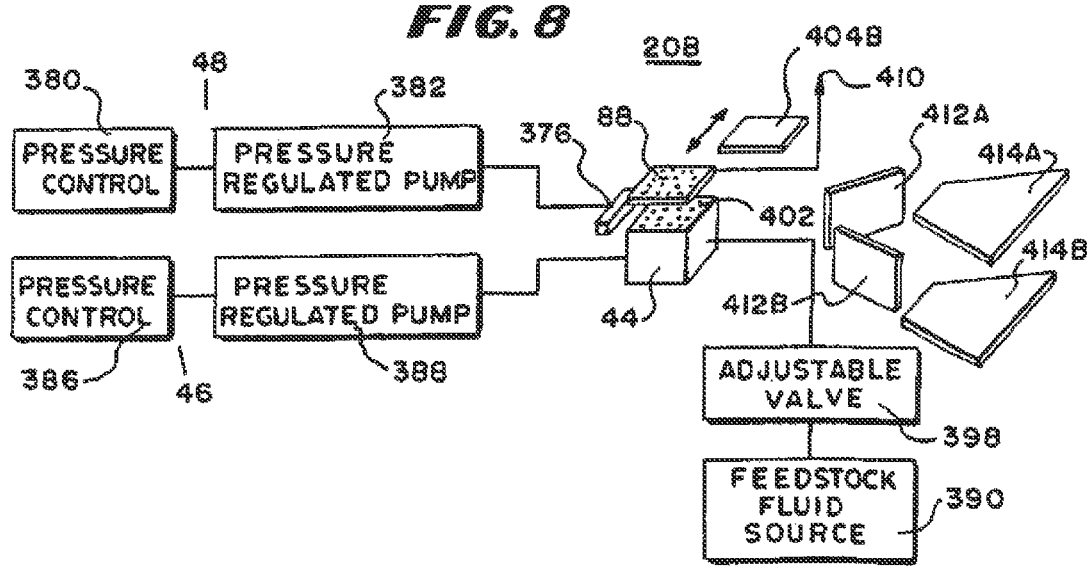
FIG. 8 is a simplified schematic view of still another embodiment of the invention.

In FIG. 1, there is shown a block diagram of a process 10 for shaping and distributing fluid and/or particles and fibers or other solid particles made from fluids in accordance with an embodiment of this invention having the step 12 of setting the physical and energy characteristics of feedstock material, kinetic energy fluid and fixture outlet, the step 14 of moving feedstock material to a fixture outlet, the step 16 of forcing the kinetic energy fluid against the feedstock material at a preselected angle to or parallel to the feedstock material and the step 18 of collecting or distributing the shaped mist, vapor, drops, fibers or particles. In this specification, the word "distributing" shall mean any form of moving, collecting, spraying or otherwise disposing of the groups, patterns or individual distributed drops, fibers, particles, vapor or mist. In this specification, "spray fixture" or "nozzle" shall mean an apparatus adapted to be connected to a source of feedstock material and to a force for powering the feedstock material through the apparatus, the apparatus including an outlet and structure for controlling the output of feedstock material from the outlet of the spray fixture.

The step 12 of setting the physical and energy characteristics of feedstock material, kinetic energy fluid and fixture outlet includes the steps of: (1) establishing the physical characteristics of feedstock material and a kinetic energy fluid; (2) establishing the energy characteristics of the feedstock material, kinetic energy fluid and the passageways through which they will flow; (3) establishing the geometry of the passageway for the feedstock material and the passageway or passageways for the kinetic energy fluid or fluids and the relationship between the passageways such as the angles with respect to each other; (4) the dimensions of the passageways; and (5) the physical and molecular attraction between the passageways and the feedstock material and kinetic energy fluid. The feedstock material will generally be a liquid or semisolid but can contain solids in suspension. In this specification, feedstock materials, kinetic energy fluids or other energy application sources and passageways that have been prepared to produce a desired shape and distribution, are referred to as compatibly-selected feedstock materials, kinetic energy fluids or energy sources and passageways.

In general, this process controls the configuration of a substance by bringing a compatibly-selected feedstock material and at least a first moving compatibly-selected kinetic energy fluid in contact with each other. In doing this, at least one of the pressures of the compatibly-selected kinetic energy fluid, the velocity of the compatibly-selected kinetic energy fluid, the velocity of the compatibly-selected feedstock material, the thickness of the compatibly-selected feedstock material, the width of the compatibly-selected kinetic energy fluid, the width of the compatibly-selected feedstock material, the temperature of the compatibly-selected feedstock material, the viscosity, conductivity, surface tension and density of the compatibly-selected feedstock material and/or the characteristics of externally applied energy or disruptive forces, if any, is varied. The compatibly-selected kinetic energy fluid is usually a gas, such as air.

In the preferred embodiment, drops with a relatively constant size distribution are formed by forcing a uniform kinetic energy fluid at low pressure against a wall of feedstock having a uniform height and thickness with the kinetic energy fluid maintaining a defined velocity with respect to the velocity of the feedstock. The volumetric rate of forming drops is varied by varying the length of the wall and the rate of flow of the feedstock but maintaining its uniformity. The angle of movement of the drops is varied by varying the curvature or angular position of the wall and the direction of movement of the kinetic energy fluid. The wall is thin enough to avoid drops being formed from feedstock material at different depths under widely different conditions.

The process is useful with all kinds of fluids but is particularly useful with viscous liquids or semisolids or particles such as seeds within a liquid or semisolid or just particles without a liquid or semisolid because of the difficulty of handling these materials with prior art devices. In this specification, the words "formable material" means: (1) liquids that flow readily without time delay, assume the shape of the container holding them but are not gases that expand to fill their container; (2) powders, collections of small particles, very viscous materials or semisolids that may hold their shape against the force of gravity but can be shaped without grinding or cutting the material such as only with the use of pressure; and (3) viscous materials that flow slowly and assume the shape of their container under the force of gravity or low pressure. This definition applies even if the formable material includes a mixture such as particles included in a viscous material and is specific to the temperature of the material since the viscosity will change with temperature and may cause a material to move from one category to another. Semisolids and very viscous materials are sometimes referred to in this specification as non-Newtonian fluids.

The kinetic energy fluid is a fluid that impacts upon the feedstock material and aids in shaping it into the desired form. The desired form may be drops or long strands that will harden into fibers. In one embodiment, the feedstock material includes chitosan which is shaped into nanofibers or nanoparticles. The kinetic energy fluid will frequently be air but other fluids can be used. Of course, there may be more than one feedstock material and more than one kinetic energy fluid. The fixture is the device through which the feedstock material and kinetic energy fluids flow and has a fixture outlet which will distribute the final product. Thus, the fixture outlet will control the angle with which the kinetic energy fluid impacts on the feedstock material and the area of that impact. The geometry of the outlet of the fixture can determine the thickness of the feedstock material and the shape and the pattern of the feedstock distribution. For example, it can include needles that extrude columns of a fluid with the kinetic energy fluid flowing substantially parallel to them and at different speeds on different sides of the column of feedstock material to stretch it into ligaments that can form nanofiber or nanoparticle depending on formulation and operating parameters. On the other hand, the feedstock material may be extruded as a sheet and a sheet of kinetic energy fluid may impact it on one side and form it into droplets. In this specification, nanofibers and nanoparticles shall include micron-sized, submicron-sized or nano-sized fibers or particles.

Some of the relevant physical characteristics of the feedstock material and the kinetic energy fluid are their densities, viscosities, the surface tension and vapor pressure. The energy characteristics of the two fluids include their temperature and energy density. By energy density, in this specification, the words "energy density" shall mean the enthalpy per unit volume. Thus, it will be affected by the rate at which the feedstock material is pumped to the impact location with the kinetic energy fluid, the velocity of the kinetic energy fluid and its mass and external energy such as electro dynamic fields or electric fields or mechanical vibrations.

Geometry also takes into consideration the width of the path being swept by the kinetic energy, the length of the path being swept by the kinetic energy, the roughness of the path being swept by the kinetic energy, the thickness of the feedstock, the angle at which the kinetic energy fluid hits the feedstock, the dimensions of the kinetic energy fluid and the feedstock material. Molecular attraction means the attraction at the molecular level between the fluid and the material of the passageways through which it flows.

This process may affect the length of a fiber that is formed and its thickness. It may result in forming droplets, mist, vapor and particles and the shape, pattern, density of the pattern, temperature and size distribution for droplets, mist or vapor and particles.

The step 14 of moving the feedstock material to the fixture outlet also will affect the size of the droplets or cluster of particles or the thinness of a fiber when taken in conjunction with the kinetic energy fluid effects. However, in a preferred embodiment, the feedstock material is moved relatively slowly under very low pressure or no pumping at all since in some embodiments, it can rely on capillary action together with the pulling effect of the kinetic energy fluid.

The step 16 of forcing the kinetic energy fluid against the feedstock material at a preselected angle or parallel to the feedstock material can have a drastic effect on the particle size, size distribution of particles or on the length of fiber that is prepared. Variations in the angle in many instances have a dominating effect on the nature of the flow from the outlet.

The step 18 of collecting or distributing the shaped drops or fibers includes many varieties. In one case, drops of an agricultural input are simply sprayed from a series of fixtures on a boom such as, onto crops, for example. The term, "agricultural input" in this specification means any of the inputs that are applied to agricultural fields such as microorganisms, fertilizers, growth regulators, pesticides, drilling gels or the like. In other cases, the fibers can be collected as a continuous strand on a drum or by a moving surface. The collection is often aided by magnetic attraction.

In FIG. 2, there is shown a schematic view illustrating, in principle, an embodiment 20 of a device for controlling the formation of particles and fluids including a first flow path 22 for a first fluid and second flow path 24 for a second fluid which are at an angle to each other to form a fixture outlet. In one application of the embodiment of FIG. 2, the two flow paths 22 and 24 accommodate a feedstock material and a kinetic energy fluid which impact each other at the outlet to form droplets of the feedstock material, which may be a fertilizer or pesticide or an encapsulating material or any other material. For this purpose, the flow paths 22 and 24 are wide to permit the viscous material to spread on a surface and the kinetic energy fluid to contact it and break it into relatively uniform droplets with a relatively narrow sized distribution of droplets. While this system has particular utility for forming viscous materials into drops, it may also be used on mobile materials such as water.

For this purpose, the second flow path 24 has two plates 36 and 38 with facing surfaces between which the feedstock material flows as shown by the arrows 42 to the edge of a surface 40. The two plates 36 and 38 are spaced to maintain a relatively thin layer of viscous feedstock material. The thickness of this layer can be varied by varying the distance between the two plates 36 and 38 and the length of the exposed edge of the surface 40 can be varied by moving a plate 404 between the plates 36 and 38. The thickness of the layer, the width and length of the exposed edge of the surface 40 that is contacted by the kinetic energy fluid and the angle of the contact as well as the pressure of the compatibly-selected kinetic energy fluid, and velocity of the kinetic energy fluid are all material to the size of the droplets and the size distribution.

The flow path 22 similarly includes first and second plates 26 and 28 defining a flow path 30 between them for the kinetic energy fluid. The fluid proceeds towards the edge of the surface 40 as indicated by the arrows 32. While the angle is substantially orthogonal in FIG. 2, it may be a much more acute angle for impact to obtain drops within a narrow size range and of such a size that with a viscous material, spray drift is substantially reduced.

In the embodiment 20 of FIG. 2, the kinetic energy fluid contacts the feedstock fluid at the edge of their flow paths 22 and 24 although in other embodiments the kinetic energy fluid contacts the feedstock fluid on a surface a distance from the edge of the support. Moreover, in the preferred embodiment, the kinetic energy fluid contacts the feedstock fluid along a curved line and the flow of the kinetic energy fluid is along a diverging path so that the drops spread outwardly at an angle from the line of contact.

In FIG. 3, there is shown another embodiment of a system for controlling the formation of liquids, which system 20A forms thin streams of liquid compatibly-selected feedstock material that harden into fibers or particles rather than drops or mists or vapor as in the case of other embodiments. For this purpose, the system 20A includes as its principal parts a housing 56, a plurality of needles, the needles 50A-50E being shown for illustration and at least two kinetic energy fluid passageways 52 and 54. The needles 50A-50E are mounted within the housing and connected to a manifold 61 having an inlet tube 63 which supplies feedstock material to the needles 50A-50E at a rate regulated by a regulator 73 connected to the inlet tube 63. The feedstock material is supplied at no pressure or very low pressure under the control of a pump or regulator 73 which may be a valve connected to the inlet tube 63 to a container of a substance such as chitosan or any other material from which it is desirable to make fibers. Each of the two kinetic energy fluid passageways 52 and 54 is on an opposite side of the feedstock material and flow at different rates to stretch the streams into very thin ligaments to form fibers and particles including nanofibers and nanoparticles.

To supply a first kinetic energy fluid through the first kinetic energy fluid passageway 52, a regulator 75, which may be a valve supplies a first kinetic energy fluid such as air at a first flow rate to a compartment 65 through a tube 67. This compartment is sized to overlie the path of the feedstock material to supply kinetic energy fluid in a path substantially parallel and in intimate contact with, or only spaced, a short distance from the feedstock material. To supply the second kinetic energy fluid through the second kinetic energy fluid passageway 54, a regulator 77 similar to the regulator 75 but set to cause a different flow rate at a similarly low pressure, supplies kinetic energy fluid to a second compartment 69 on the opposite side of the feedstock flow path from the first kinetic energy fluid compartment 52 and similarly in intimate contact with or spaced a short distance from the feedstock material. The two kinetic energy fluids are close enough to exert force on the feedstock material in a manner that stretches the feedstock material to form narrow fiber and particles having a diameter related to the difference in velocity of the two fluids.

In the preferred embodiment, (not shown in FIG. 3) a plate is moved parallel to the front of the fixture 20A to deflect the flow of the kinetic energy fluid at an angle to the feedstock material (see FIG. 29) and create turbulence. The feedstock material includes solvents that are evaporated to leave a solid filament. While a plurality of needles are shown at 50A-50E from which thin streams of feedstock material flow, for some applications such as the formation of drops, fibers or particles, thin slots may be used to form the drops, fibers or particles by thinning a viscous material with the flow of air around the thin sheets. The thickness of the sheets affects the size of the drops, fibers or particles formed in this case as in the embodiments described below where the viscous feedstock material is spread over a surface.

In operation, a hardenable feedstock fluid is forced relatively slowly out of the needle openings 50A-50E while on one side of the openings a first kinetic energy fluid from the first kinetic energy passageway 52 impinges on the feedstock in a path that is nearly parallel to the relatively slow flow of feedstock material through the needle openings 50A-50E, and at the same time a second kinetic fluid stream flows through the passageway 54 at a different velocity to create a stretching pressure on the opposite side of the feedstock material. This differential velocity when taken together with the viscosity, surface tension and solvent characteristics of the feedstock material determines the amount of stretching before the feedstock material hardens into fibers or particles having the desired dimensions. By controlling these parameters, nanofibers and nanoparticles may be formed from very viscous materials such as solutions of chitosan with agricultural inputs at high rates.

While two openings for kinetic fluid, one above all of the needles and one below all of the needles, are used in the embodiment 20A of FIG. 3, more than two can be used including coaxial opening for encapsulation. For example, there could be one pair of kinetic fluid paths for each needle, such as below and above or on each side to provide the stretching force. The kinetic energy fluids are usually air but can be any other fluid compatible with the process. For example, nitrogen could be used. Moreover, the stretching can be done in stages with more than one pair or the pressure differential can be provided between a stationary surface and a fluid. Moreover, while only a velocity difference between two gases is used to create stretching in the embodiment 20A, other energy forms can be used in addition to the use of two gases or instead of the two gases such as electrodynamic force or a differential between a gas and a liquid or a gas and a solid surface under certain circumstances. Preferably, the circumstances of the application of force does not cause premature breaking of the streams of feedstock material. It has been found that materials that have been difficult to draw into nanofibers have the appropriate viscosity to be successfully drawn into nanofibers by two air streams. In this specification, fibers or particles formed within one or more fluids flowing on at least two sides of the feedstock material with flow rates faster than the feedstock material are referred to as "kinetic-energy fluid shaped" fibers or particles and the process of forming them is called "kinetic-energy fluid formation" in this specification.

In FIG. 4, there is shown a schematic perspective view illustrating, in principle, an embodiment 20E of a device for controlling the formation of particles and fluids similar to the embodiment 20 of FIG. 2, in which identical parts have the same numbers as in FIG. 2, and parts with a change in construction have the same reference numeral but the numeral is followed by the letter "E". The device 20E for controlling the formation of particles and fluids includes a first flow path 22 for a fluid and second flow path 24E for a second fluid which flow paths are in contact with each other to form a fixture outlet. In FIG. 4, they are shown at an angle to each other but may be substantially parallel but positioned to put the two fluids in contact with each other to transfer energy from one to the other. In one application of the embodiment of FIG. 4, the two flow paths 22 and 24E accommodate a feedstock material and a kinetic energy fluid which impact each other at the outlet to form droplets of a feedstock material which may be a fertilizer or pesticide. For this purpose, the flow paths are wide to permit the feedstock material to spread and the kinetic energy fluid to contact it and break it into relatively uniform droplets with a relatively narrow sized distribution of drops. In the embodiment of FIG. 4, the feedstock material spreads on a surface having both width and length that affect the drops whereas in the embodiment of FIG. 2, they contact each other at an edge and in other embodiments may contact each other free from any fixed solid surface and in air.

For this purpose in the embodiment of FIG. 4, the second flow path 24 has two plates with facing surfaces between which the feedstock material flows as shown by the arrows 42 through the path 38E and against the surface 40. The two plates 34E and 36E are spaced to maintain a relatively thin layer of feedstock material. The thickness of the layer, the width and length of the exposed surface 40 that is contacted by the kinetic energy fluid and the angle of the contact as well as the pressure of the compatibly-selected kinetic energy fluid, and velocity of the kinetic energy fluid are all material to the size of the droplets and the size distribution.

The flow path 22 similarly includes first and second plates 26 and 28 defining a flow path 30 between them for the kinetic energy fluid. The fluid proceeds towards the edge of the surface 40 as indicated by the arrows 32. While the angle is substantially orthogonal in FIG. 4, generally it will be a much more acute angle for impact to obtain drops within a narrow side range and of such a size that with a feedstock material, spray drift is substantially reduced.

While in FIG. 4, the kinetic energy fluid contacts the feedstock fluid on the surface a short distance from the edge, in the preferred embodiment, the contact is made right at the edge. Moreover, in the preferred embodiment, the kinetic energy fluid contacts the feedstock fluid at a converging angle along an arc so that the drops are spread at an angle from the line of contact.

In FIG. 5, there is shown a side view of the system 20E shown in perspective in FIG. 4, having a first flow path 22 and a second flow path 24E. The first flow path 22 is formed of plates 26 and 28 through which the kinetic energy solution flows through the passageway 30 between the plates 26 and 28. The second flow path 24E receives the feedstock material flowing in the direction 42. It is bounded by plates 34E and 36E. As best shown in this view, the kinetic energy fluid flows through the path 30 against the surface 40E which extends beyond the plate 34E on the plate 36E to provide a length of feedstock material which is impacted.

In FIG. 6, there is shown a sectional view through the lines 6-6 of FIG. 5, having the flow path 24E with the plate 34E shown in front and the plate 36E behind it to expose a surface 40E. The surface 40E differs from the surface 40 of FIG. 2 by the presence of rough spots 60 which may be projections or indentations or grooves or any other configuration depending upon the effect desired, one projection for example being shown at 60.

In FIG. 7, there is shown an end view of an embodiment of a second flow path 24A through which the feedstock material 38 may flow before impacting with a kinetic energy fluid from the first flow path 22 (FIG. 5) having a first plate 64 and a second plate 62. As shown in this view, one or both of the first and second plates 62 and 64 forming the second flow path are curved unlike the flow path for the feedstock material of FIG. 4. The curvature may be imparted for any desired effect such as to compensate for other effects that might intend to make the drops from the end of the sheets smaller or larger. Since the thickness of the feedstock is a factor in the size of the drops, the curved flow path can be used to compensate for these other effects or create new effects of its own.

In FIG. 8, there is shown a simplified block and schematic diagram of another embodiment of fixture 20B having a film or sheet forming container 44, a film and sheet forming fluid source 46, a drop and particle moving fluid source 48, a feedstock fluid source 390, an adjustable valve 398 and a drop former 88. The feedstock fluid source 390 and the film and sheet forming fluid source 46 communicate with the film or sheet forming container 44 to supply feedstock fluid and a gas thereto. The top surface of the film or sheet forming container 44 includes a plurality of perforations 402 and an adjustable perforation cover plate 404B may be moved to cover a portion of the perforations 402 and thus adjust the amount of fluid being formed into bubbles and eventually into drops and/or particles. The feedstock material selected for this embodiment and the gas pressure from the film and sheet forming fluid source 46 must be such that the gas pressure will form bubbles by applying pressure to the feedstock material but not burst the bubbles. The surface tension of the feedstock material is sufficiently great to maintain integrity as a film or sheet under the pressure supplied from the film or sheet forming fluid source 46. The combination of pressure and feedstock material varies from application to application.

To burst the bubbles and control the distribution of the drops and particles, the fixture 20B includes an adjustable bubble bursting plate 88 adapted to be positioned above the perforations 402 to burst the bubbles at the proper degree of inflation to provide the thickness that yields the proper drop or particle size. The top of the adjustable bubble bursting plate 88 extends over an adjustable outlet 408 (not shown in FIG. 8) having sides that are adjustable to control the angle of distribution of the drops and particles moved by the drop and particle moving fluid source 48.

With this arrangement, bubbles are extended through the perforations 402 that are not covered by the adjustable plate 404B. The thickness of the feedstock material forming the skin of the bubbles is determined by the pressure, which may vary between zero and the bursting pressure of the bubbles. Thus, by adjusting the pressure to determine the thickness of the bubbles, the distance the bubble bursting plate 88 is from the top surface of the film or sheet forming container 44, the velocity and pressure of the drop and particle moving fluid from the source of drop and particle moving fluid 48, the angle of the opening formed by the adjustable outlet 108 (not shown in FIG. 8), and the size of the drops or particles and their distribution may be controlled.

In FIGS. 9, 10 and 11, there are shown three perspective views of a fixture 20C with its parts in three different positions with respect to each other to illustrate the construction of the fixture. The fixture 20C as best shown in FIG. 9, includes an inlet end cap 70, an outer cylinder 74, and an outlet end cap 72. The inlet end cap 70 includes a kinetic energy fluid inlet port 66 and a feedstock material inlet port 68 for receiving kinetic energy fluid 30 and feedstock material 38 respectively. It is positioned on one end of the outer cylinder 74 with the outlet end cap 72 being positioned on the other end.

The outlet end cap 72 includes a rotatable outer cap having an annular, feedstock-material impact surface 40 and an inner cap resting inside the outer cap and having a cylinder rest portion 76, and a cut-away portion exposing the top surface of the rotatable outer cap which forms a kinetic energy fluid impact surface 78. The annular feedstock-material impact surface 40 is formed on the inner bottom of the outlet cap 72 and the cylinder end rest portion 76 extends approximately 120 degrees around the outer circumference of the end cap 72 to receive the outer cylinder 74, leaving an arc of 40 degrees of the impact surface exposed between the inner cap and outer cap. The center cut-away portion 78 that forms the kinetic energy fluid impact area and an outer circumferential area 40 defines an impact plane toward which a thin wall of feedstock material flows adjacent to the outlet of the fixture 20C so that the air impacts at 78 and flows circumferentially outwardly to impact a thin circumferential rim of feedstock material. The circumferential arc at the outer edge of the impact area 40 for the feedstock material determines the angle of the spray and can be adjusted by rotating the inner cylinders with respect to the outlet in a manner to be described hereinafter. The thin wall of feedstock material is contacted between the end of the outer column and the impact surface which distance determines the thickness of the feedstock material that is to be broken into drops.

In FIG. 10, there is shown another perspective view of the fixture 20C also showing an inner cylinder 82 that is within the outer cylinder 74 with the inner cylinder 82 having a recessed portion 84 spaced from the inner wall of the outer cylinder 74 to provide a path for the feedstock material to flow against the surface 40. The amount of arc that overlaps between the recessed portion 84 and the opening in the inner cap that forms the impact surface 40 for the feedstock material determines the length of the feedstock material that is to be swept from the fixture by the kinetic energy fluid. With this arrangement, the kinetic energy fluid 30 flows through inlet port 66 against the impact surface 78 from which it flows outwardly to contact the feedstock material as it moves from a location between the inner wall of the outer cylinder 74 and the outer wall of the recess 84 in inner cylinder 82 toward the plane of the surface 40 and forces it outwardly. The kinetic energy fluid, which in the preferred embodiment, is air at a relatively low pressure between zero and ten psi and most commonly in the range of one-half to three psi is intended to develop droplets from a liquid feedstock material with a defined size distribution and size for contact with plants and to reduce spray drift.

In FIG. 11, there is shown still another perspective view of the fixture 20C with the outer cylinder withdrawn exposing a larger section of the inner cylinder 84 having a recessed longitudinal extending portion 82 and showing the outer cylindrical surface of the inner cylinder 84 against the inner surface of the outer cylinder 74 so that the longitudinal recessed portion 84 provides a curved narrow path for the flow of feedstock material, thus providing a relatively narrowed curved edge against which the kinetic energy fluid flows to spray Newtonian fluid, a viscous feedstock material, suspended particles or more mobile liquids or combinations of these. Because the inner cylinder is rotatable with an end cap 72, this recessed portion may be aligned with or misaligned with the impact surfaces 78 and 40, thus controlling the circumferential number of degrees of the spray.

Figure 30:
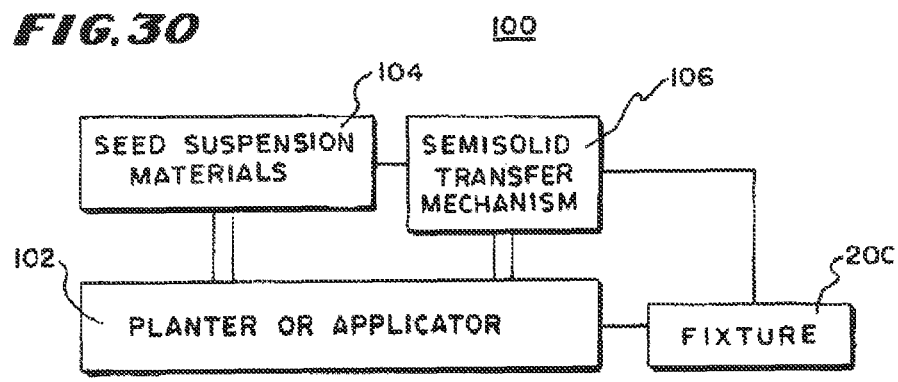
FIG. 30 is a schematic block diagram of a planter or suspended particle delivery system in accordance with an embodiment of the invention.

In FIG. 12, there is shown still another perspective view of a fixture 20D which is similar in every respect to the fixture 20C of FIGS. 9-11, but has a recessed portion 84 which, instead of receiving feedstock material from one feedstock inlet indicated at 68 in FIGS. 28-30, may receive either or both of two feedstock materials through inlets 68A and 68B. Thus, it may mix inlets for dilution purposes or receive a choice of more than one feedstock from multiple inlets that are controlled by a valve or fed by multiple pump channels from a three position valve (one position can be used to purge with water).

In FIG. 13, there is shown a perspective view of an embodiment 20D of fixture having an inlet 30A for the kinetic energy fluid, an inlet 38A for the feedstock material, an outer cylinder 74A, a thickness control insert 422 and mounting rings 418 and 420 for mounting to a boom. The thickness control insert 422 is a replaceable unit which fits within the outer cylinder 74A and controls the thickness of the feedstock opening which is one of the dimensions of the feedstock that is to be impacted by the kinetic energy fluid.

In FIG. 14, there is shown a side elevational view of the fixture 20D with the thickness control insert 422 having an outwardly extending ledge 426 and a feedstock outlet opening 424 between the end of the outer cylinder 74A and the ledge 426 so that one dimension of the feedstock exists between the plane end of the cylinder 74A and the plane ledge 426, another dimension exists along the curvature of the opening 424 and the third dimension is the thickness 430 (shown in FIG. 15) of between the outer surface of the inner cylinder and the inner surface of the outer cylinder of the ledge 426 which corresponds to the thickness of the opening 424 through which the feedstock flows in the direction of the ledge 426. The kinetic energy fluid moves outwardly through the opening 424 with the controlled thickness, length, width and curvature as determined by the replaceable insert 422 to control the size distribution of drops being spread from the fixture 20D.

In FIG. 15, there is shown a fragmentary enlarged view of the end of the fixture 20D showing the end of the cylinder 74A and the end of the thickness control insert 422 illustrating the manner in which feedstock flows downwardly through an opening 430 toward the plane of the ledge 426 and air flows downwardly and outwardly through an opening 432 to impact the feedstock fluid flowing toward the plane of the ledge 426. In this manner, the insert 422 adjusts the opening 424 to control the dimensions of the feedstock being impacted by the kinetic energy fluid.

In FIG. 16, there is shown an enlarged perspective view of the insert 422 showing the ledge 426 recessed downward from a cut-away portion forming a shoulder with a ledge 540 that is slightly raised to impact the end of the outer cylinder 74A (FIGS. 13, 14 and 15) leaving a gap that is the height of a shoulder 542.

In FIG. 17, there is shown another embodiment of fixture 20H having a cap 434 with a feedstock inlet opening 38A and a kinetic energy fluid opening 30B in the cylindrical connecting members 444 and 66B respectively. A base unit 440 is connected to a mounting bracket 442 to support the fixture 20H. A thickness control insert 438 has an outer rim which forms an opening with a feedstock interior 448 through which the feedstock flows and thus controls the thickness of the feedstock impacted by air at a shear surface. The air flows over the thickness control insert 438 and through an opening 446 of an air flow area control plate 436 from a conduit 66B. The adjustment of the angle of the thickness control insert plate 438 controls the area through which the feedstock fluid may impact the feedstock fluid to cause it to flow outwardly. Thus, with an easily replaceable control insert plate 438, the thickness of the feedstock fluid may be controlled, the length of the fluid may be controlled by the adjustment of the feedstock flow area control plate 436 and the area of the shear surface is determined by the distance between the bottom face of the air plate 436 and the top surface of the thickness control plate 438.

In FIG. 18, there is shown an exploded perspective view of the embodiment of spray apparatus of FIG. 17. As shown in FIG. 18, the half plate 450 receives the thickness control disk 438 which fits over the feedstock conduit 66B with the inlet on the other side of a bolt 38A. This thickness control disk 438 spaces the air flow disk 436 from the half plate 450. The difference in the diameter between the thickness control disk 438 and the diameter of the opening of the inside of the base 440 determines the height of the fluid which is impacted by the air flowing through the opening 444 from the inlet 30B. The position of the air flow disk 436 to the extent it overlaps with the half plate 450 or is open to an open part 44B determines the arch length that is impacted by the air and the area of the inner wall 444 determines the area of the shear surface towards which the fluid flows before being moved out of the opening in the form of droplets.

In FIG. 19, there is shown a perspective view of a fixture 20I similar to the fixture 20H and having the air inlet 30B through the conduit 66B, the working feedstock fluid through the opening 38A and the conduit 444, the mounting bracket 442, the base 440, the air plate control 436, the thickness control disk 438, positioned in a manner similar to the embodiment of 20H. FIG. 20 is an exploded perspective view of the embodiment 20I of FIG. 19. As best shown in FIG. 20, the embodiment 20I includes an additional feedstock fluid control disk 454 which fits over the half plate 450 and under the thickness control disk 438. This disk 454 includes a closed half section 455 and an opening 452 so that the portion of the opening 452 is aligned with the opening 448 and determines the area of fluid flow so as to give an additional control.

In FIG. 21, there is shown a perspective view of another embodiment of fixture 20J having a feed stock inlet opening 38J, a kinetic energy fluid inlet 30J and an outlet opening 424J having an opening distance controlled by the location of the insert 422J and the outlet cylinder 74J. A threaded opening receives a screw for holding the distance between the insert 426J and the outlet cylinder 74J which determines the size of the opening 424J and thus will affect droplet size.

With this embodiment, the kinetic energy inlet 30J may receive air from the normal fuel line of an agricultural boom and the feed stock inlet opening 38J may receive low pressure agricultural input. This is possible because this fixture permits low pressure fluid to be utilized with the air assist. Because a fluid may be more concentrated using the fixture, it does not need to be diluted and a lower rate of flow of the fluid to the fixture is possible.

Figure 23:
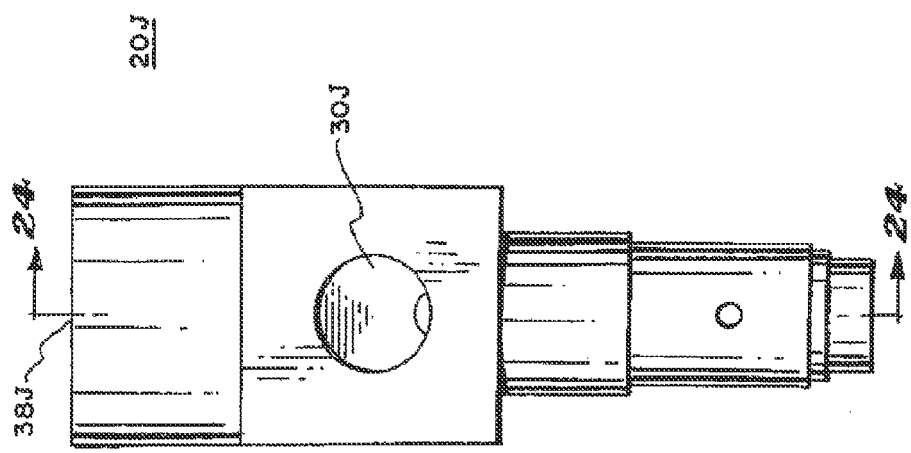
FIG. 23 is an elevational view of the fixture of FIG. 21

In FIG. 22, there is shown an elevational view of the fixture 20J with the feed stock inlet connected to a hose 546 for receiving an agricultural input and applying it to the feed stock inlet opening 38J of the fixture 20J. The air line receives a nipple from the boom to receive pressurized air so as to provide a spray to crops or the like. In FIG. 23, there is shown an elevational view of the fixture 20J showing the kinetic energy fluid inlet 30J and the feed stock inlet opening 38J.

Figure 24:
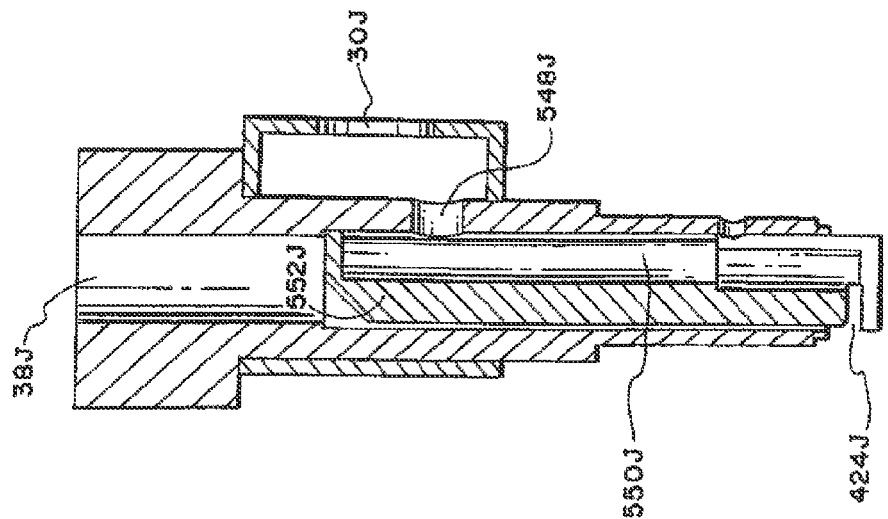
FIG. 24 is a sectional view taken through lines 24-24 of FIG. 23.

In FIG. 24, there is shown a sectional view taken through lines 24-24 of FIG. 23, showing a flow path from the kinetic energy fluid inlet 30J through an opening 548J into the inner cylinder 550J to provide a kinetic energy assist to the opening 424J. Similarly, there is a feed stock path from the feed stock input opening 38J and through the inside cylinders 552J to the opening 424J.

In FIG. 25, there is shown a simplified schematic view, partially perspective and partially sectioned view of another embodiment of fixture 20K adapted to mix a plurality of liquids or particles without regard as to whether the liquids are viscous or mobile. The fixture 20K includes a mixing chamber 560, a kinetic energy inlet 30K, an inlet 38K for a plurality of fluids or particles and an outlet 424K. The fixture 20K receives a plurality of fluids which may be of any viscosity or may be mobile or may consist of particles or emulsions or other combinations in the inlet member 38K while receiving air or other kinetic energy fluid through the kinetic energy inlet 30K. The outlet 424K emits gaseous clouds of droplets or fine particles made up of the different inlets which are mixed together in the mixing chamber 560. From the mixing chamber 560 they may flow to a nozzle for spraying or may flow to a combustion device for burning or any other location where the mixture is affective. The inlet member 38K includes a plurality of openings leading inwardly 562A-562K (FIG. 27) with openings 562B-562E being shown in FIG. 25.

In FIG. 26, there is shown an exploded view of the fixture 20K showing the kinetic energy inlet 30K and the bottom plate 40K of the outlet opening 424K (FIG. 25). As made clearer in FIG. 26, the opening 424K unlike the prior openings 424A-424J of the prior fixtures 20A-20J extends 360 degrees around the longitudinal central axis. However, it can be any number of degrees or any of the fixtures since that merely determines the size of dimension the liquid and this is the amount of liquid inputted by the surface force. Thus the size of the droplets and the range of spreading and can be tailored to an individual application. The inlet opening of the inlet 38K extends to channels or slots circumferentially spaced from each other in the thickness control insert 422. In the embodiment of FIG. 26, instead of a recessed cylinder the thickness control insert 422 is cylindrical with longitudinal channels extending downwardly to the outlet 424K (FIG. 25) so that liquid flowing through the channels from the inlets to connect with a corresponding one of the channels 564A-564K (564B-564F being shown in FIG. 26). The fluid or particles are channeled through the channels down to the outlet and against the bottom plate 40K. As in the prior embodiments, the thickness insert may be adjusted as to its distance between the bottom plate 40K to determine the thickness of fluid and thus affect the size of the droplets being emitted.

In FIG. 27, there is shown a sectional view of the member 38K showing the inlet channels 562A-562I and the corresponding downward slots 564A-564I. As shown in this view, the different fluids flow downwardly to the outlet where they are impacted by the kinetic energy fluid flowing through the kinetic energy inlet 30K and thus form a cloud of droplets to be mixed in the mixing chamber 560 (FIG. 25).

In FIG. 28, there is shown a schematic block diagram of an apparatus 90 for utilizing the spray systems such as the spray system 20C including a spray vehicle 92, which supports and carries at least a storage vessel 94, a pump 96 and booms or other fixture holders 98. In this specification, "spray vehicle" means any means of transporting a feedstock material for application to agricultural land whether it be a land vehicle, boat or an airplane and whether the spray vehicle is intended to spray a fluid such as a pesticide intended to plant seeds. Commonly, the spray vehicle 92 may be a small vehicle such as would otherwise be used as a recreational vehicle or a golf cart or the like or may be larger vehicles such as pick-up trucks or still larger especially made heavy equipment intended for carrying agricultural input chemicals.

The storage vessel 94 which typically will be tanks or the like may contain an agricultural input material. Commonly, this material is concentrated and/or viscous in its original form, and unlike the prior art, is sprayed in viscous form although it may be slightly diluted. With the fixture 20C, viscous materials can be effectively sprayed and sprayed with droplet sizes that are particularly effective for foliar reception, or on the other hand, finer droplets that might be spread closer to the ground. Moreover, the spray vehicle can be a planter and the sprayed materials may be a very viscous material with randomly located seeds or other particles.

For example, a particularly effective herbicide, glyphosate, is generally diluted to a large heavy volume before spraying to reduce its viscosity and provide a carrier volume because the prevalent agricultural sprayers cannot effectively spray low volume or high viscosity herbicides. Glyphosate is sold by Monsanto Company, 800 North Lindbergh Boulevard, St. Louis, Mo. 63167 U.S.A. under the trademark, Roundup.

This invention effectively sprays glyphosate at a rate of one gallon or less of total liquid per acre rather than the ten gallons generally required for conventional sprayers. The spray of higher viscosity and lower vapor pressure feedstock reduces drift, increases efficiency of the herbicide because of its concentration and reduces cost.

The equipment is also capable of spraying powders including dry and suspended powders which may be utilized in some applications and suspensions of particles. In some applications, the fixture 20C includes means for applying a charge to the drops so as to direct them better to the plants. This device may take many of the forms known in the art such as for example passing the drops through an electric field.

The pump 96 is generally a low-volume, precision pump, pumping fluid to each fixture with zero pressure at the fixture. Because the invention does not require liquid pressure against an orifice for metering and atomization, high pressure pumps are not needed and leakage problems are avoided. In the preferred embodiment, it is a gear pump. In the preferred embodiment, the air supply will be blowing approximately five or less psi of a compatibly-selected kinetic energy fluid against a viscous fluid or other fluid within the fixtures 20C. The fixture 20C is commonly mounted to spray booms as known in the art. The spray booms 98 are mounted on the spray vehicle 92 to provide coverage over a large area with a plurality of appropriately spaced fixtures along the boom.

In one embodiment, the spray from the fixture 20C passes between two charged plates 23 supplied by a power supply 21. A single power supply can provide potential to several combinations of plates in parallel. The plates 23 induce a charge onto the drops leaving the fixture 20C and this charge has been found to improve the contact of the drops with leaves under some circumstances. The separated plates may also be used to change the particles, drops or fibers emitted from the fixture or accelerator of FIG. 37.

In FIG. 29, there is shown a block diagram of a process 109 for spraying agricultural inputs having the step 111 of selecting the active ingredient, the step 113 of selecting parameters of feedstock and nozzle for desired droplet size, coverage, speed of application and drift management, the step 115 of mixing the carrier and active ingredient and one or more adjuvants if desired; the step 117 of using a kinetic energy assisted fixture or the step 119 of using a stand-alone nozzle. When a kinetic energy assisted nozzle is selected for a spraying application, the step of selecting a kinetic energy assisted nozzle is followed by the step 127 of using a fixture with surface-area or edge-length control or the step 125 of using standard air assist nozzles.

In this specification, fixtures are classified for some purposes into two broad categories, which are: (1) kinetic energy assisted fixtures; and (2) stand-alone outlet fixtures. Kinetic energy assisted fixtures are fixtures in which the shape of the feedstock leaving the fixture is influenced by a kinetic energy fluid such as air that flows over or against the feedstock to form droplets of viscous feedstock. Stand-alone nozzles are fixtures in which the flow of feedstock from the outlet is not shaped by a kinetic energy fluid but principally by the pressure applied to the feedstock, the geometry and shape of the outlet and the viscosity of the feedstock. There are many types of stand-alone nozzles. Some of these are described in Nebraska IANR NebGuide, G955, published by University of Nebraska, Lincoln Extension Institute of Agriculture and Natural Resources, Lincoln Nebr., United States of America, February 2003.

There are two types of kinetic energy assisted fixtures, which are: (1) edge length and surface area controlled fixtures; and (2) standard air assist nozzles. Edge length and surface area controlled fixtures are kinetic energy assisted fixtures in which the droplet size and distribution are controlled inter alia by the length of edge or surface area that receives a layer of feedstock and has the kinetic energy fluid flowing over it. Standard nozzles are any of the known types of known nozzles that receive a flow of air to aid in the removal of feedstock from the nozzle outlet without control by the distribution of viscous fluid over or against a layer of feedstock on an edge or surface as one of the control variables. Some of these air assisted nozzles are described in Ohio State University Extension Fact Sheet AEX-523-98 published by Ohio State University, 590 Woody Hayes Dr., Columbus, Ohio 43210, United States of America.

In this specification, The terms "effective uptake range" means range of compositions of high density, water soluble carrier, water and active ingredient that remains on plant in a concentration that does not damage the plant during normal evaporation events as drops are sprayed from a low drift height above the canopy at an effective droplet size, pattern and distribution and remain on the plant for an extended time before being washed off and provides the intended beneficial results. The terms "effective droplet size, pattern and distribution" means size as indicated by volume mean diameter, distance between drops on the target surface and evenness of spacing between drops over the target surface that provides an uptake that provides the intended beneficial results without damage to crops. "Intended beneficial results" are results conforming or superior to the results obtained in field tests by varying effective droplet size patterns and distribution using different formulations until optimum results are obtained. These parameters are also used to obtain regulator labels such as for example EPA labels. "Low drift height" means the height of a spray fixture or nozzle above the canopy or ground, whichever is the target, that is as low as practical in view of the wind conditions and spray mode i.e. aircraft or boom mounted on a vehicle. "Economic margin" means the difference between cost of necessary runs, feedstock, and time to apply desired coverage with efficient particle size and spray pattern available from compatibly selected feedstock materials, kinetic energy fluids if necessary and fixture geometry.

In this specification, the terms "practical range of economic margins" means, a range of economic margins that includes only those economic margins which are lower than the cost of changing the number of necessary runs, feedstock and time to apply desired coverage with efficient particle size and spray patterns available from compatibly selected feedstock materials, kinetic energy fluids if necessary and fixture geometry to so that economic margin is as high as the lowest economic margin that is acceptable. The range should only include combinations that are within 25 percent of the combination providing the best economic margin.

In FIG. 30, there is a schematic block diagram of a planting system 100 having a planter 102, a storage vessel 104 for semisolids in which particles are suspended for distribution, a semisolid transfer mechanism 106, such as an auger and a fixture 20C. In this embodiment, relatively small seeds are suspended in the a storage vessel 104 for seed suspension materials. In this specification, "seed suspension materials" means a medium that is capable of keeping particles suspended for an extended period of time rather than permitting them to settle. In this specification, the language "in suspension" when referring to seeds or other solid particles means that the seeds or other particles are being held spaced from each other distributed through a medium without settling for the amount of time needed for planting seeds. This time may be a day or longer so that a farmer may use fluid drilling until a tank is used up without needing to mix the seeds again because they have settled from the original mixing.

The medium may be mainly a gel, or semisolid, or colloid or very viscous material. There is enough high density material including particles within the seed suspension materials to exert force on solid seeds and move them together with the semisolid rather than causing the semisolid to flow around them when shear plate force is applied. This combination permits seeds to be randomly mixed and randomly distributed in the seed suspension materials to be moved by an auger and eventually dispersed through the fixture 20C. The auger has pitch angles on the screw graduated from low angles at the inlet to facilitate feeding the seed gel mixture to higher angles in the delivery tube section to give a friction pumping surface to move the gel seed mix. The screw in effect provides a shear plate motive force for delivering the seed particles and the fluid while at the same time providing a moving delivery tube wall to dislodge any seed pile ups and further, it effectively singulates seeds into the delivery tube. The medium may of course include beneficial additives including biological additives such as beneficial microbes and other useful additives such as calcium peroxide to provide appropriate oxygen to the seeds.

In FIG. 31, there is shown another planter system 110 with the same planter 102 which may for example be a spray vehicle with a means for forming a trough and distribution of seeds in the trough, a storage vessel for seed suspension materials 104 and a semisolid transfer mechanism 106. However, instead of the fixture 20C, the seed suspension materials at the end of the auger is simply removed by a seed knife 112 which may be the flow of kinetic energy fluid or a solid member that frees the feedstock.

In FIG. 32, there is shown a flow diagram of a planting process 120 including the step 122 of forming a fluidic continuous medium capable of suspending seeds and moving the seeds with the continuous medium, the step 124 of mixing the seeds in the continuous medium to form fluidic semi-solid with randomly dispersed seeds within it and the step 126 of distributing the fluidic semi-solid with randomly dispersed seeds within it on an agricultural field. In this process, the fluidic continuous medium may be a material of sufficient density or a colloidal suspension having a density and viscosity that is sufficient so that the seeds will be extremely slow in settling. The seeds should be supported without settling significantly more than ten percent and preferably less than five percent in the period of time between mixing the seeds in the medium and planting. Normally, this time will be less than a 24 hour period since commonly the farmer will mix the seeds and medium in the same 24 hour time period as he plants. To obtain adequate mixing, the seeds should have force directly applied to them. This can be accomplished by mixing into the medium a sufficient amount of semi-solid particles and/or solid particles so that there is contact through the solid particles and the moving surfaces applying force for mixing.

In the preferred embodiment, this mixture is moved by an auger to a furrow for planting and sections of it as appropriate for the number of seeds are removed from the end of the auger into the furrow or broadcast onto the subject field using a spray fixture designed to spread the seeds over a broad pattern. This can be done with a substantially conventional or specially modified planter. The auger will be synchronized normally with the speed of the planter which may be received from the wheel speed or any other proportional area. The total acreage being utilized may be measured by a conventional global positioning system for purposes of monitoring the amount of seed being dispersed and, under some circumstances, for accounting purposes such as billing or the like. In this specification, a fluidic continuous medium capable of suspending seeds and moving the seeds with the continuous medium while the seeds remain randomly distributed will be called a "seed-supporting medium".

In FIG. 33, there is shown a flow diagram of a process 130 for fluid drilling, including the step 132 of preparing a seed supporting medium and incorporating beneficial inputs with seeds, the step 134 of mixing seeds in the seed supporting medium to form fluidic semi-solid with randomly dispersed seeds within it and the step 136 of distributing the fluidic semi-solid with randomly dispersed seeds within it on an agricultural field. The beneficial inputs may be chemicals or beneficial microorganisms which can be sustained on the seed surface or in the hydrated seeds and facilitated by the appropriate seed supporting medium.

In FIG. 34, there is shown a flow diagram of a process 140 for forming fibers comprising the step 142 of forming a liquid containing the substance to be formed into fibers or powders, the step 144 of causing movement of individual streams of the liquid into a working zone, the step 146 of stretching the streams into fibers of the desired length with at least one energy field and the step 148 of drying and collecting the fibers or the alternate steps 147 and 149 of forming particles such as powder and drying and collecting the particles. Some materials are difficult to put into a form which can be further formed into small fibers. For example, silica and chitosan and many metal ceramic compositions are useful if they are put into a nanofiber or nanoparticle form but it is difficult to get them into a liquid form and then use prior art processes to form nanofibers. In this invention, once the desired substances are put into a liquid, they can be moved as indicated by the step 144 into a working zone by the apparatuses of FIG. 3, 36 or 40. While in the working zone, streams of the liquid can be stretched to the desired diameter using an energy field or plurality of energy fields. In the preferred embodiment, the liquid includes solvent which evaporates resulting in solid fiber or particles. For example the apparatus of FIGS. 3, 36 and 40, provide a kinetic energy fluid as one field and another kinetic energy fluid as another field which stretches the streams because they are moving at different velocities, one on one side of the stream and the other on another side. When the streams are at the right desired diameter, they are dried and can be collected by known processes such as electrospinning or a charged collector as shown in step 148. These particles and fibers may be used as carriers for other chemicals such as agricultural inputs.

In FIG. 35, there is shown a process 150 for forming one important material, chitosan, into a liquid state so as to form chitosan fibers or powders which are useful for many purposes. For example, chitosan fibers can be used in many pharmaceutical applications such as drug delivery and controlled release and in medical technology such as wound and burn dressings or surgical treatment, dermatitis and fungal infections, contact lens, bacteriostat and fungistat and bone disease, biotechnology applications such as membranes, biocatalysts, enzyme immobilization, protein separation, cell immobilization, food products, preservatives, fat absorption animal feed additives, metal-chelating processes such as absorption of transition metal ions such as copper, chromium, lead, silver and so on, agricultural products such as timed-release, seed coating, foliar application and paper products. However, there are difficulties in forming a liquid containing chitosan that would be suitable for the making of fibers. One difficulty is that most known solutions are more conductive than desirable and have a higher viscosity than desirable for the prior art methods of forming fibers. An improved method of putting chitosan into a liquid state is shown in FIG. 35.

The process of FIG. 35, for putting chitosan into a liquid state suitable for the forming of fibers, thin films, mats or powders includes the step 152 of dissolving chitosan powder in a water in an acidic solution such as a acetic acid solution, the step of 154 of bubbling carbon dioxide through the chitosan solution, the step 156 of adding an organic solvent while continuing to bubble carbon dioxide through the solution until it is suitable for making a desired solution that can be used to make fibers or powders or the step 157 of adding a surfactant while continuing to bubble carbon dioxide through the solution until the solution is suitable for forming powder. While it is known that acetic acid can be displaced by bubbling carbon dioxide through the acetic acid solution, this has not been applied to chitosan solutions. While carbonic acid ($H_2CO_3$, on $CO_2$ solubilization) has a lower pK than acetic acid, it is mere mass action imposed by continuous feeding of the former that facilitates removal of the organic acid from the aqueous environment. The use of $CO_2$ instead of an inert gas has the synergistic effect of stabilizing a pH below five, which is critical to maintaining chitosan in solution. However, the $CO_2$ bubbling by itself leads to chitosan precipitation by saturation as the water and acid is removed. This problem is avoided by adding solvent. Superior results in avoiding precipitation of chitosan have been obtained by replacing the lost ingredients with ethanol, thus synergistically lowering the surface tension, viscosity and conductivity of the solution, which is required for making fibers. If an alcohol is added without bubbling carbon dioxide through the solution, the solution may form a gel with only the addition of a small amount of alcohol.

The chitosan-water-$CO_2$-ethanol solution is difficult to spin in this form. However, it has been found that addition of as little as 0.25 wt. % or preferably 1.25 ml. % poly(ethylene oxide) (PEO) is sufficient to markedly improve fiber formation using prior art spinning techniques with temperature and voltage control and the addition of surfactant improves the formation of powders. The use of the two kinetic energy fluids on different sides of a compatibly-selected feedstock material also permits the formation of satisfactory fibers without electrospinning and the formation of longer fibers using the above solution and electrospinning Evaporation of a small amount of ethanol during the time-of-flight of the charged liquid filaments from the delivery capillary to the collector electrode is all it takes to induce solidification. Interestingly, while the dominant chitosan weight fraction in the fibers is insoluble in water, washing the fibrous deposits with de-ionized water lowers the PEO content below its starting value. More specifically, in one embodiment, solutions of chitosan requiring very small amounts of plasticizers such as poly(ethylene) oxide, or no plasticizer agents at all, are prepared by dissolution of chitosan in carboxylic or mineral acid aqueous solutions, followed by total or partial displacement of the acid with carbon dioxide bubbling and addition of controlled amounts of ethanol. With the aid of electrohydrodynamic processing of the solution formulation, fibers and particles with diameters in the micron and submicron range are produced. The chitosan solution formulation also affords processing into thin films, given its lower surface tension than other formulations based on water and carboxylic and/or mineral acids.

Figure 36:
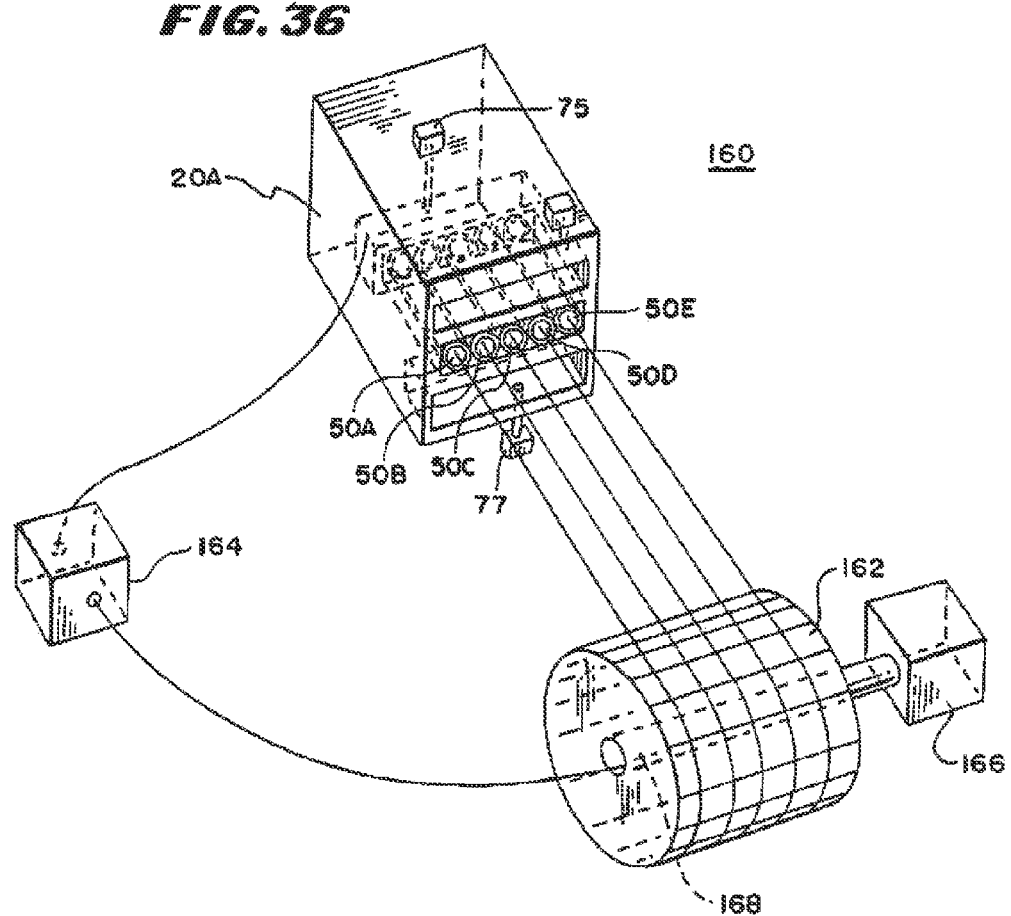
FIG. 36 is a simplified perspective drawing of a system for forming fibers in accordance with an embodiment of the invention.

In FIG. 36, there is shown an apparatus 160 of forming continuous fibers having a fixture 20A, a collector 162, a source of high potential 164, a motor 166 for driving the drum assembly and that serves as a collector 162. The fixture 20A receives two kinetic energy fluids through the regulators 75 and 77 to contact the feedstock material. The feedstock material is being extruded from needle openings 50A-50E onto the collector 162 which is rotated by the motor 166 while a high potential electrical difference is applied between the needles 50A-50E and the collector 162 to further stretch and draw the fibers. In the preferred embodiment, the fibers are drawn into nanofibers. For example, in one embodiment, the feedstock material leaving the needles 50A-50D is fed at a rate between and two and seven microliters per minute through the regulator 75.

The collector 162 and the needles 50A-50E are spaced five to ten inches apart and the gradient is approximately 4 to 600 volts per centimeter. Without the potential applied, non-oriented nanofibers can be produced. With the potential applied, a mat is obtained consisting of micrometer diameter fibers parallel to each other in length between each other by nanofibers forming a tissue like mat of considerable strength with the ability of having good cell adhesion to be useful in many biomedical applications. Variations in viscosity and potential can result in electro spray of fine particles when it is desired to make nanoparticles.

Figure 37:
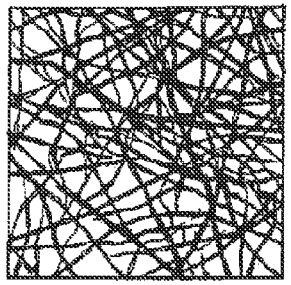
FIG. 37 is an SEM of a non-oriented fiber membrane made in accordance with an embodiment of the invention.
Figure 39:
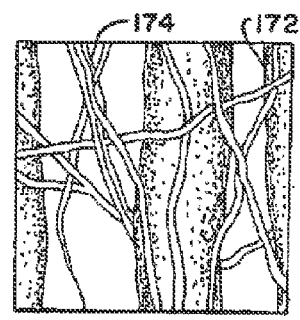
FIG. 39 is an SEM of non-oriented fiber mat in accordance with an embodiment of the invention.

In FIG. 37 there is shown an SEM of non-oriented chitosan fibers drawn with a potential gradient above 100 volts per centimeter to a stationary collector to form a thin film or paper. With slow rotation, a mat is formed such as the mat shown in FIG. 39. In FIG. 39, there is shown an SEM of a mat including chitosan fibers 172 in the micrometer diameter range (between 0.5 and 1.5) and chitosan fibers 174 in the nanometer range with micrometer fibers 172 cross-linked with the nanometer range fibers 174. The flow rates were generally between 0.25 microliters and 10 microliters per hour with the distance between electrodes being approximately between two centimeters and 60 centimeters and preferably between 8 to 30 centimeters. The fibers contain no salt since it was unnecessary to neutralize acid in the formation of the material.

Figure 38:
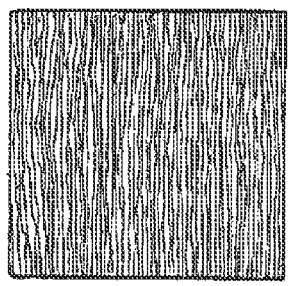
FIG. 38 is an SEM of an oriented fiber membrane in accordance with an embodiment of the invention.

In FIG. 38, there are shown oriented fibers (longitudinal axis parallel to each other) that are obtained by more rapid rotation and a higher potential gradient. The limit on the potential gradient is related to arcing between the fibers and can be increased with spatial increases between fibers at the price of having fewer fibers per square inch in a final matted product. The chitosan mats and fibers are obtained without salt impurities in the feedstock material. The solution should be between a viscosity of between 30 centipoise (cP) and 2000 centipoise. With 65.4 centipoise at 21.8 percent torque, there is a surface tension of 32.1 dynes and at 537 centipoise at 17.9 percent torque, the surface tension is 31.5 dynes. The needle orifices 50A-50E are generally 20 gauge.

Figure 40:
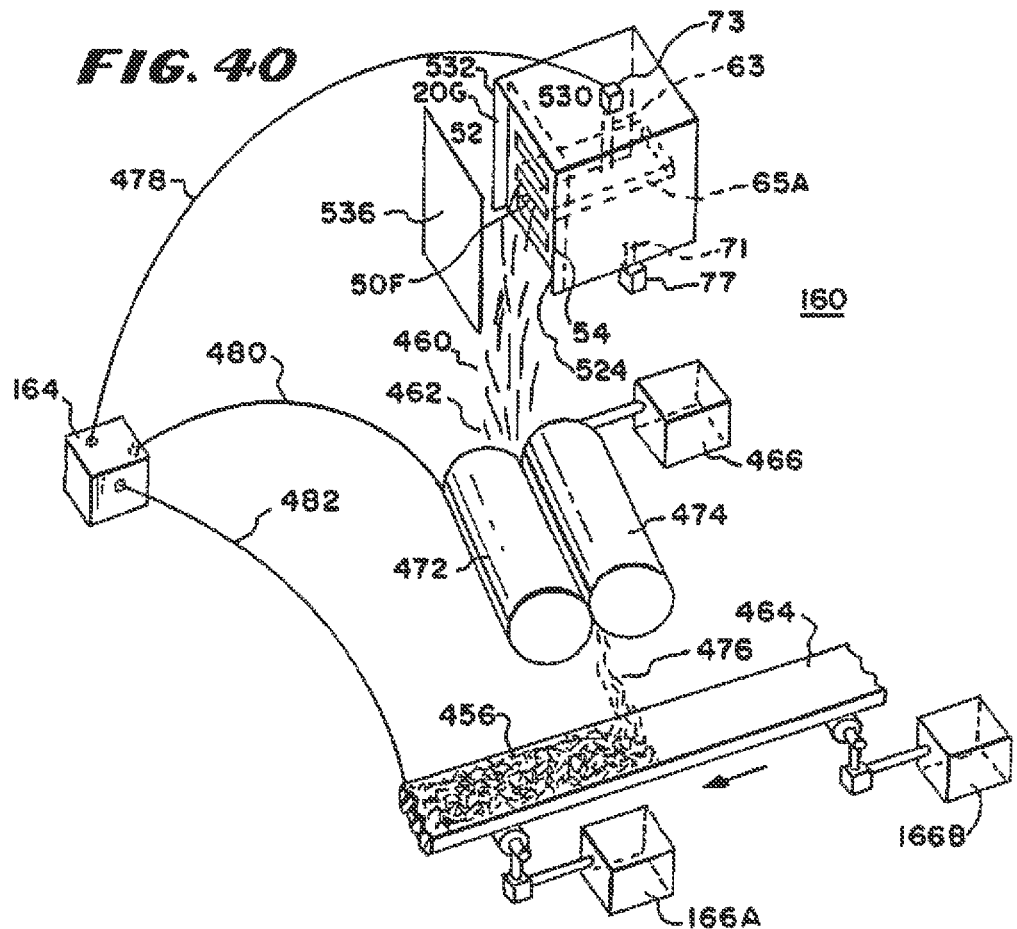
FIG. 40 is a simplified, schematic, perspective view of a system for making objects containing nanofibers and nanoparticles.
Figure 41:
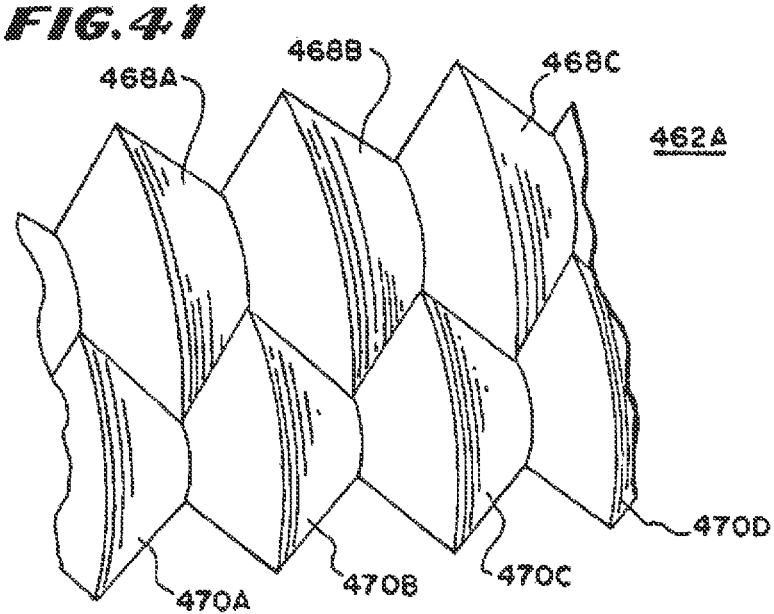
FIG. 41 is a simplified perspective view of an embodiment of drum accelerator usable in the embodiment of FIG. 40.

The flow rates used to obtain the fibers of FIGS. 37-39, from the apparatus of FIG. 40, are in the micro liter per hour range, and an electrical potential difference is applied between the needle and a collector electrode surface, preferably located several inches away from the liquid delivery point. Depending on key physical properties of the solution being subjected to EHD (e.g., viscosity, surface tension, and conductivity), on partial or total solvent evaporation dissolved matter can lead to either particles (electrospray) or fibers (electrospinning).

In FIG. 40, there is shown a simplified, schematic, perspective view of a system 160 for making objects, such as bandages, containing nanofibers and/or nanoparticles. In the embodiment 160, the nanofibers and particles are of chitosan and used to form a mat 456 on a base 464 which may be cut up into sections and serve as bandages. However, the system may be used for many other types of nanofibers or nanoparticles.

The system 160 includes as its principal parts a liquid forming fixture 20G, a pair of accelerating drums 462, a collector 464 and a source of potential 164. The liquid forming fixture 20G is similar to the fixture 20A in that it supplies air through openings 52 and 54 to stretch a feedstock material exiting the opening 50F. In the preferred embodiment, the feedstock material is chitosan which is caused to exit as a plurality of thin strands. The feedstock compartment is electrically connected at 73 through a column 53 to a replenishment source of feedstock and air is supplied to the inner chamber of the fixture 20G through an inlet 77. A kinetic energy fluid diverting slide 536 is mounted in side barriers 532 and 534 to move over a top barrier 530 to divert controlled amounts of the kinetic energy fluid into the feedstock material at an angle to it.

To further guide the feedstock material and accelerate it, the feedstock inlet 73 is electrically connected through a conductor 478 to a source of potential so that the feedstock is charged as it leaves the fixture 20G. While the charge is imparted by a direct electrical connection, in some embodiments the feedstock is charged as it leaves the fixture by passing it through an electrical field so as to induce charge into the exiting strands or particles. The source of potential 164 is also connected to the accelerator drums 462 with a potential sufficient to attract the charged strands or particles from the fixture 20G. In the preferred embodiment, the accelerator drums 462 are at ground level and the feedstock material within the fixture 20G is positively charged. However, the feedstock material could be negatively charged and the accelerator only slightly more positively charged. The potential, aids in causing the strands to be drawn to the accelerator drums 462 and to be accelerated by the potential field as they move.

The accelerator drums 462 includes cylindrical rotatable drums 472 and 474 rotated together as indicated by the arrows by a drive 466 so that the feedstock material is pulled into the bite of the rotating drums as they rotate together in opposite directions and accelerate the strands still further. The acceleration of the strands is sufficient at this location to break strands into fine particles. While a rotating drum accelerator is utilized in the embodiment 160, any other appropriate accelerator could be utilized. For example, a strong enough electric field would also accelerate the strands. The acceleration, because it stretches the strands breaks it into uniform nano-sized particles. To accomplish this, the acceleration must be sufficient and this must be determined empirically for each material used as the feedstock. The acceleration drums or other acceleration means may receive streams from any source and form micro fibers or micro particles. If a voltage difference is applied between the accelerators and the collector, the micro particles and micro fibers may be converted to nanofibers and nanoparticles.

The base 464 is also electrically connected to the source of potential 164 to receive a negative potential and draw the particles of feedstock material 476 onto its surface. In the preferred embodiment, the base 464 is a bandage based material driven as a conveyor by motors 166A and 166B while the particles accumulate on its surface to form a mat 456. In the preferred embodiment, this mat is chitosan which may be medicated to provide a superior bandage because of its large surface area. In the preferred embodiment, the feedstock material includes sufficient solvent so that it is fluidic and can be emitted from the fixture 20G. However, the solvent evaporates after it leaves the fixture and the ligaments solidify into strands and/or particles.

In FIG. 41, there is shown a simplified perspective view of an embodiment of drum accelerator 462A usable in the embodiment of FIG. 37, having a first plurality of rollers 468A-468C and a second plurality of rollers 470A-470D. Each of the rollers 468A-468C, 470B and 470C is shaped as two cones with their flat bases together to form a symmetrical unit with two curved sides. The two rollers 470A and 470D are half cones. The cones 468A-468C have their rounded ends adjacent to each other as do the rollers 470A-470D and the two pluralities of rollers are meshed together so that the curved sides of the roller 468A engages the curved sides of the adjacent rollers 470A and 470B fitting there between. Similarly, the roller 468B fits between the two sides of the rollers 470B and 470C. The roller 468C fits between the sides of the rollers 470C and 470D so that the particles have increased surface area over continuous cylindrical rollers.

In the preferred embodiment, the flow rates used to obtain the fibers from the apparatus of FIG. 37, are in the micro liter per hour range, and an electrical potential difference is applied between the needle and a collector electrode surface, preferably located several inches away from the liquid delivery point. Depending on key physical properties of the solution being subjected to EHD (e.g., viscosity, surface tension, and conductivity), on partial or total solvent evaporation dissolved matter can lead to either particles (electrospray) or fibers (electrospinning).

A very small amount of polyethylene oxide (PEO) is added as a plasticizer to facilitate fiber formation on electrospinning. Dissolved carbon dioxide keeps the pH of the solution low enough to avoid chitosan precipitation. By doping the solution with small amounts of PEG, fiber diameter can be bimodal, with the aligned large-diameter (dominant) fibers having an average diameter of 5 μm, and the cross-linking filaments having an average diameter of about 100 nm, as shown in FIG. 41. On deposition of an electrically charged fiber, a simple and rapid discharge mechanism consists of establishing such peculiar multiple points of contact with adjacent, or sub-layer fibers. The generation of such extremely thin inter-fiber filaments cannot occur between two discharged, gelatinous fiber strands in light of surface tension arguments.

The oriented fiber structure looks like a membrane with average pore diameter around 10 μm. Oriented fiber mats constitute an advance over conventional membranes or fibers since anisotropic mechanical properties are key for certain applications such as cartilage engineering. The fibers emanate in a solvent-swollen state since drying of the mats with a heat gun led to a ten-fold diameter decrease (not shown). The diameter of the fibers, besides being a function of the physical properties of the solutions, depends strongly on the concentration of PEO.

EXAMPLES

While many other values of the variables in the following examples can be selected from this description with predictable results, the following non-limiting examples illustrate the inventions:

General Procedure

Solutions of chitosan in acetic acid/water/alcohol were bubbled with pure carbon dioxide gas at atmospheric pressure, and ethanol, methanol or acetone-depending on the co-solvent originally chosen-was added.

Example 1

Formation of $CO_2$-EtOH-Chitosan Solution

Procedure:

Suspend 1 g of chitosan powder (Aldrich DA=80.6%) in 99 ml of water. Then add 1 ml of glacial acetic acid (EM Science, 99.9%).

Result:

A few drops of the 1% chitosan/acetic acid solution in ethanol are enough to yield precipitates.

Example 2

Formation of $CO_2$-EtOH-Chitosan Solution

Procedure:

Dissolve chitosan in a 1% acetic acid, 40% ethanol, and 59% distilled water solution.

Result:

Could not dissolve chitosan.

Example 3

Formation of $CO_2$-EtOH-Chitosan Solution

Procedure:

A suspension of chitosan powder in 300 ml of distilled water was magnetically stirred. Glacial acetic acid (9.53 mL) was then added to dissolve the suspended chitosan. The resulting solution was bubbled with carbon dioxide (Linweld, industrial grade) for 30 min. After that, ethanol (Pharmco, 200 proof) was added slowly to the solution while stirring and bubbling $CO_2$ until total solution reached a volume of one liter.

Result:

A clear chitosan solution was produced with no precipitates.

Example 4

Formation of $CO_2$-MeOH-Chitosan Solution

Procedure:

Suspend 1 g of chitosan powder (Aldrich DA=80.6%) in 99 ml of water. Then add 1 ml of glacial acetic acid (EM Science, 99.9%).

Result:

A few drops of the 1% chitosan/acetic acid solution in methanol are enough to yield precipitates.

Example 5

Formation of $CO_2$-MeOH-Chitosan Solution

Procedure:

Dissolve chitosan in a 1% acetic acid, 40% methanol, and 59% distilled water solution.

Result:

Could not dissolve chitosan.

Example 6

Formation of $CO_2$-MeOH-Chitosan Solution

Procedure:

A suspension of chitosan powder (Vanson, DA=83.3%), in 300 ml of distilled water was magnetically stirred. Glacial acetic acid (9.53 mL, EM Science, 99.9%) was then added to dissolve the suspended chitosan. The resulting solution was bubbled with carbon dioxide (Linweld, industrial grade) for 30 min. After that, methanol was added slowly to the solution while stirring and bubbling $CO_2$ until total solution reached a volume of 1 L.

Result:

A clear chitosan solution was produced with no precipitates.

Example 7

Formation of $CO_2$-Ac-Chitosan Solution

Procedure:

Suspend 1 g of chitosan powder (Aldrich DA=80.6%) in 99 ml of water. Then add 1 mil of glacial acetic acid (EM Science, 99.9%).

Result:

A few drops of the 1% chitosan/acetic acid solution in acetone are enough to yield precipitates.

Example 8

Formation of $CO_2$-Ac-Chitosan Solution

Procedure:

Dissolve chitosan in a 1% acetic acid-30% acetone-69% distilled water solution.

Result:

Could not dissolve chitosan.

Example 9

Formation of $CO_2$-Ac-Chitosan Solution

Procedure:

Seven g chitosan (Vanson, 83.3%) was stirred in the solution of 315 ml distilled water and 65 ml acetone (EM Science, 99.5%). Adding 6.67 ml glacial acetic acid allowed dissolution of chitosan with stirring. The resulting solution was bubbled with $CO_2$ for 30 min. After that, acetone was added at a rate of 200 ml/h until the total volume of the solution reached 70 ml. This solution was called $CO_2$-Ac-chitosan.

Result:

A clear chitosan solution was produced with no precipitates.

Tables 1 and 2 below summarize the results of the examples. Table 1 shows the conductivity and surface tension of the solvent use to prepare chitosan solution and table 2 shows the conductivity, surface tension viscosity and pH of chitosan solution prepared as in examples 3, 6 and 9. It appears from these tables that $CO_2$ bubbling significantly improves the characteristics of chitosan solution that aid in electrospinning.

TABLE 1

Conductivity and pH of solution containing 1% acetic acid in different solvents.

| Solvent | Conductivity (S/cm) | pH |
|---|---|---|
| Water | 645 | 2.84 |
| 70% EtOH, 29% water | 22.3 | 3.87 |
| 70% EtOH, 29% water after bubbling $CO_2$ | 22.1 | 3.93 |
| 70% EtOH, 29% water with bubbling $CO_2$ | 21.0 | 3.95 |

TABLE 2

Conductivity and surface tension of 1%
chitosan in 1% acetic acid in different aqueous
organic solvents after carbon dioxide bubbling.

| solvent | Conductivity (S/cm) | Surface tension (dymes/cm) | Viscosity (cP) | pH |
|---|---|---|---|---|
| Water (pure) | 2180 | 63 | 93.9 @ 31.3% | 4.14 |
| 70% EtOH | 216 | 31.8 | 53.7 @ 17.9% | 5.26 |
| 70% MeOH | 695 | 32.1 | 65.4 @ 21.8% | 5.44 |
| 55% Acetone | 715 | 35 | 53.7 @ 17.9% | 5.33 |

Figure 42:
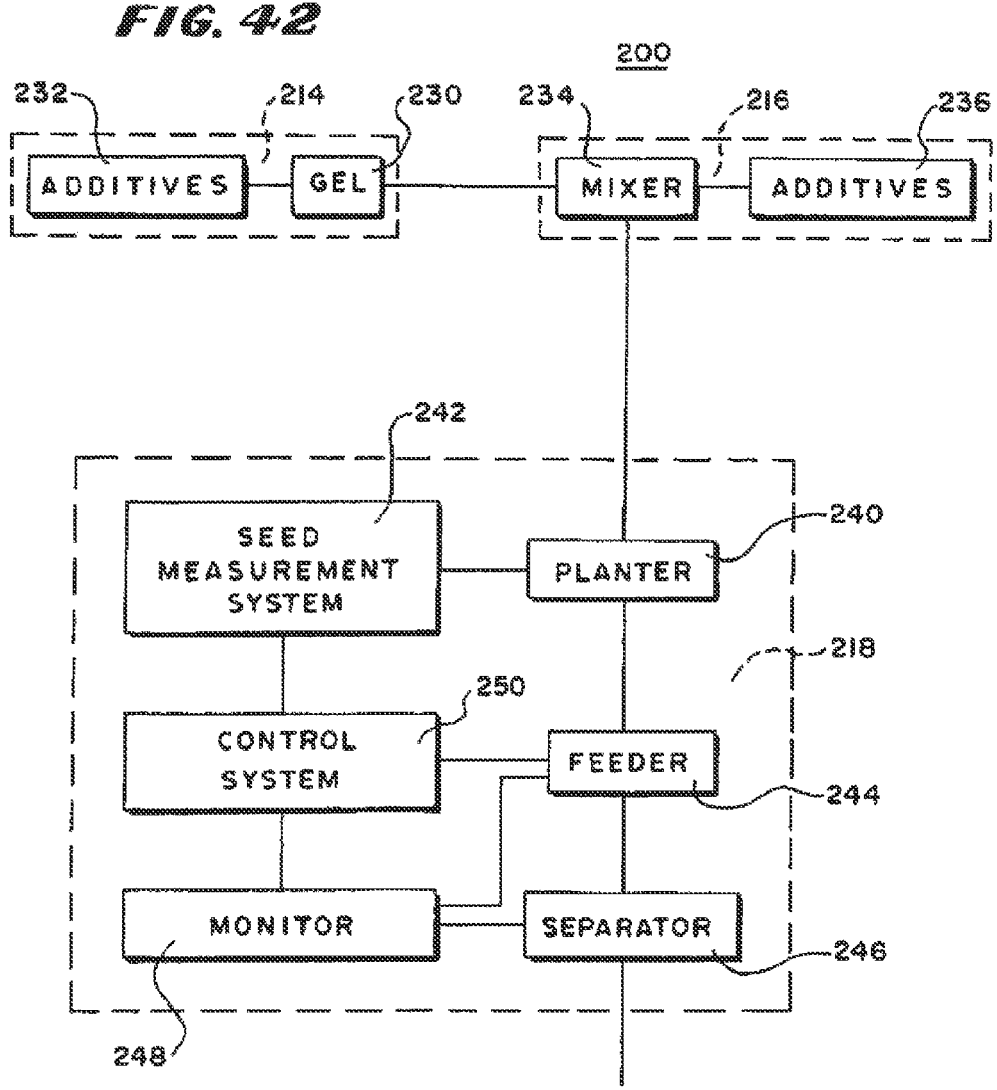
FIG. 42 is a block diagram of a planting system in accordance with an embodiment of the invention.

In FIG. 42, there is shown a block diagram of a planting system 200 having a seed carrier system 214, a seed and a carrier mixing system 216 and a controlled fluid drilling system 218. After the appropriate seeds are prepared by initiating germination or priming or otherwise treating the seeds as described in U.S. Pat. No. 5,628,144 granted to John A. Eastin on May 13, 1997, or U.S. Pat. No. 6,646,181 granted to John Eastin on Nov. 11, 2003, or U.S. Pat. No. 6,076,301 granted to John Eastin on Jun. 20, 2000, or U.S. Pat. No. 5,910,050 granted to John Eastin on Jun. 8, 1999, or U.S. Pat. No. 5,974,734 granted to John Eastin on Nov. 2, 1999, or U.S. Pat. No. 5,628,144 granted to John Eastin on May 13, 1997, they are applied to the seed and carrier mixing system 216 where they are mixed with the seed carrier from the seed carrier system 214 to form a matrix of seeds suspended in carrier. This matrix is applied to the controlled fluid drilling system 218 for planting in the field.

In one embodiment of the planting system 200, imbibition is done prior to mixing the seed into the gel or other prepared fluid drilling material but only until activation of the seed and prior to the stage of growth. It may then be: (1) returned to the water content it had before priming; (2) stored; and later (3) added to the carrier, which may be a conventional gel or other prepared fluid drilling material for fluid drilling. The germination process continues through the activation and growth stages in the gel or other prepared fluid drilling material and/or in the soil after planting. The time it remains in the gel or other prepared fluid drilling material must be relatively short in terms of days such as less than four days although it differs from seed to seed. Preferably, the seeds are planted within six hours of mixing them into the gel or other prepared fluid drilling material. The process is desirable if no more than 20 percent of the seeds are more than 30 percent into the activation stage prior to the removal of water. The activation stage is considered to be from the start of metabolic action in the seed before growth until the start of growth and the above percentages are percentages of time of the activation stage.

In addition to priming, several other treatments can be performed on the seeds prior to mixing them with the gel or other prepared fluid drilling material, such as: (1) germination may be started; (2) beneficial microorganisms may be added to inoculate the seeds during priming or the microorganisms may be added to the gel or other prepared fluid drilling material; (3) damaged seeds can be removed by sorting out larger seeds after soaking the seeds to cause the damaged seeds to swell or permitting matrix material to adhere to the seed during priming to make a larger cluster; and/or (5) systemic resistance to disease can be induced by introducing desired agents during priming or in the fluid.

The planter separates the seeds with a small amount of gel or other prepared fluid drilling material around each of them and plants them in furrows or broadcast spaces them on the ground as needed. The amount of gel or other prepared fluid drilling material is considerably less than in prior art fluid drilling systems. The pre-emergence time of seeds planted by this method is relatively close for example, 80 percent of some plants emerge within one week of each other in contrast to 20 percent by some prior art fluid drilling processes. The seed carrier system 214 includes a suitable gel or other prepared fluid drilling material 30 and, under some circumstances, additives 32 which are mixed into the gel or other prepared fluid drilling material. The additives 232 may be microorganisms or pesticides or growth hormones, or fertilizers useful in planting which are intended to inoculate, enter and stimulate or protect the seed and seedling.

The gel or other prepared fluid drilling material 230 may be conventional and has a volume: (1) for large seeds such as those of corn, preferable approximately equal to the volume of the seeds but always between half the volume of the seeds and four times the volume of the seeds; and (2) for small vegetable seeds such as cabbage, preferably twice the volume of the seeds and always between the same volume as the seeds and less than ten times the volume of the seeds.

The gel or other prepared fluid drilling material 230 must have a viscosity and mobility: (1) sufficiently low to fill each groove at least halfway as the screw turns; (2) sufficiently low to be released at the end of the nozzle with a difference in air pressure as low as one-sixteenth pound per square inch across the nozzle tip; and (3) with sufficient high density particles and semi-solid materials to enable mixing of the seeds by forces applied to the mixture of seed, particles and gel or other prepared fluid drilling material.

Generally, many suitable gels or other prepared fluid drilling materials are known and may be used in the densities prescribed. For example, hydroxyethylcellulose sold by Hercules, Inc., 910 Market Street, Wilmington, Del. 19899, under the trademark "NATROSOL" has been used mixed in the recommended proportions. This gel or other prepared fluid drilling material has been shown to be capable of supporting microorganisms in fluid planting. This particular gel or other prepared fluid drilling material, although not the only one available, is described in Bulletin 250-11 revision10-80, 10M07640 entitled NATROSOL printed by Hercules, Inc. at the aforementioned address, and its use in mixing is similarly described in other fliers produced by that company. However, glycerol is preferred.

The viscosity may be measured using a viscometer such as the Brookfield viscometer and should be in the range of 1,800 to 4,000 centipoises, and generally: (1) for small seeds such as cabbage seeds, it is in the range of 1,800 to 2,000 centipoises; (2) for medium sized seeds, it is in the range of 2,500 to 3,000 centipoises; and (3) for large seeds such as corn, it is in the range of 3,000 to 4,000 centipoises. However, the exact viscosity can be determined easily by trial and error in the operation of the seed or particle feeder.

The seed and carrier mixing system 216 includes a mixer 234 and additives 236. The mixing may be done by hand or by an automatic mixer which receives the seeds and the gel or other prepared fluid drilling material and mixes them together thoroughly. Additives such as microorganisms, pesticides, fertilizers or growth hormones may be added at this stage if they have not been added at a prior stage. The seeds and gel or other prepared fluid drilling material should be sufficiently mixed to leave the seeds in suspension and may be done in large quantities and then suitably poured into the holder, tank or hopper for the seed or particle feeder or may be mixed in the hopper for the seed or particle feeder. If they are added to the hopper from a larger mixer, care must be taken so that laminar flow does not remove the seeds from suspension or the mixing must be repeated in the hopper. Preferably, an auger is used to move the feedstock material and the feedstock material has sufficient semisolid and solid material in it so that the shear force supplied by the auger surfaces imparts force to the entire feedstock material rather than selective to its components. Generally, if poured into the hoppers in large quantities, the suspension is not to be disturbed.

The controlled fluid drilling system 218 includes a planter 240, a seed measurement system for the planter 242, a seed or particle feeder 244 for feeding the combination of gel or other prepared fluid drilling material and seeds and a separator 246 for separating the seeds, a monitor 249 for the seeds and a control system 250. The planter 240 may be a conventional planter pulled by a primary vehicle such as a tractor and for opening furrows in the ground and to permit seeds to be inserted into them and for closing the furrows or may be used with conventional broadcast equipment. The seed or particle feeder 244 and the separator 246 are mounted on the planter 240 to feed gel or other prepared fluid drilling material and seed to the furrow and separate seeds. The seed or particle feeder 244 is monitored by the monitor 248. A control system 250 may be used to compare the speed of the tractor with the feeding of seeds and adjust the seed or particle feeder 244 to maintain the proper orientation. In one embodiment, the speed of operation of the seed or particle feeder 244 is measured rather than the actual seeds being dispersed and this is correlated with the number of seeds in accordance with the seed density in the gel or other prepared fluid drilling material. This is done automatically by conventional planter equipment which drive the gel or other prepared fluid drilling material, seed or particle feeder in this invention but are known for driving seed drilling equipment. Also, the monitor 248 is visible to the operator who can adjust either the speed of the primary mover pulling the planter 240 or the speed of the seed or particle feeder 244 in other embodiments.

Figure 43:
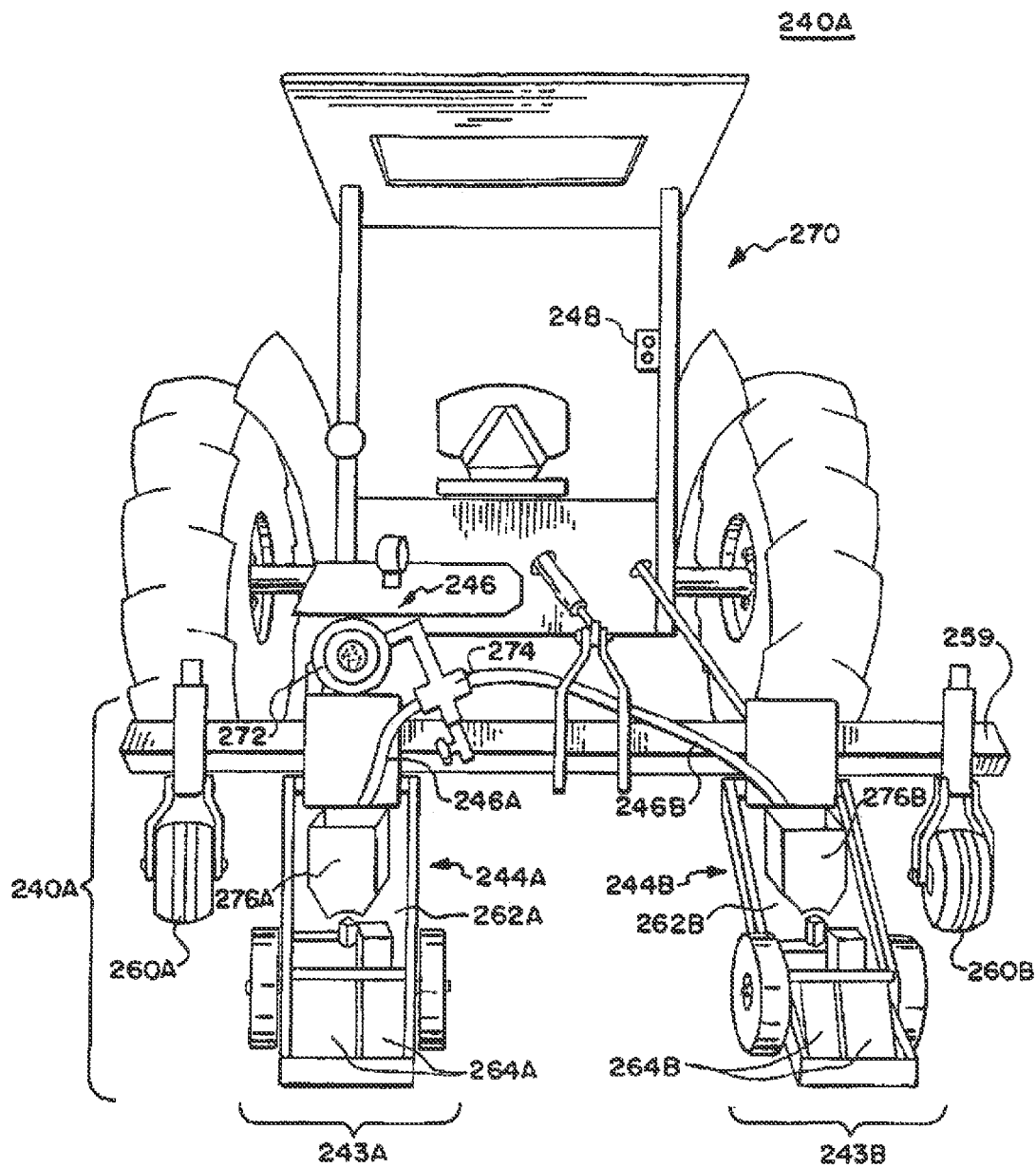
FIG. 43 is a perspective view of a tractor and planter usable in accordance with the invention.

In FIG. 43, there is shown a perspective view of an embodiment of planter 240A intended for planting relatively small seeds such as cabbage, cucumbers or similar vegetable seeds. Planter 240A as shown in FIG. 43, includes within it parts for planting in two rows, with each being indicated as one of two row sections 243A and 243B having corresponding numbers with corresponding prefixes "A" or "B". The rows are adjustable with respect to each other on the planter.

The planter 240A is similar in many respects to prior art planters and, in the preferred embodiment, is a modification of an existing drawn planter of a type manufactured and sold by Stanhay Company with the modifications being directed principally to the operation and mounting of the seed or particle feeders indicated at 244A and 244B and a common separator section 246 supplying air to separator sections 246A and 246B. The planter includes a depth control gage having first and second depth control gage wheels (not shown in FIG. 43), first and second tool bar support wheels 260A and 260B, first and second furrow preparing sections 262A and 262B, first and second furrow closing and pressing sections 264A and 264B, and a tool bar 259. The seed or particle feeders 244A and 244B and the separator 246 are adapted to be mounted on the planter to dispense a matrix, to separate the seeds, and to cause them to drop into a furrow before it is closed and pressed.

The planter is adapted to be pulled by a tractor 270 in a conventional manner and the tractor 270, in some embodiments, has mounted on it a suitable monitor 248 and indicating displays to show the speed of movement of the tractor 270 and the rate of dispensing of the seeds by the seed or particle feeders 244A and 244B or, in other embodiments, a count of the seeds to permit ready correlation of the speed of the tractor 270 with the rate of dispensing seeds to control the spacing of seeds. The common separator section 246 has a blower or other source of low pressure air 272 connected through a pressure gauge 274 with two hoses 246A and 246B for separating seeds in each of the two seed or particle feeders 244A and 244B. The seed or particle feeders 244A and 244B have corresponding feed hoppers 276A and 276B for receiving the mixture of gel or other prepared fluid drilling material and seed and feeding it to a fixture for separation by the separators 246A and 246B to be more fully explained hereinafter.

Figure 44:
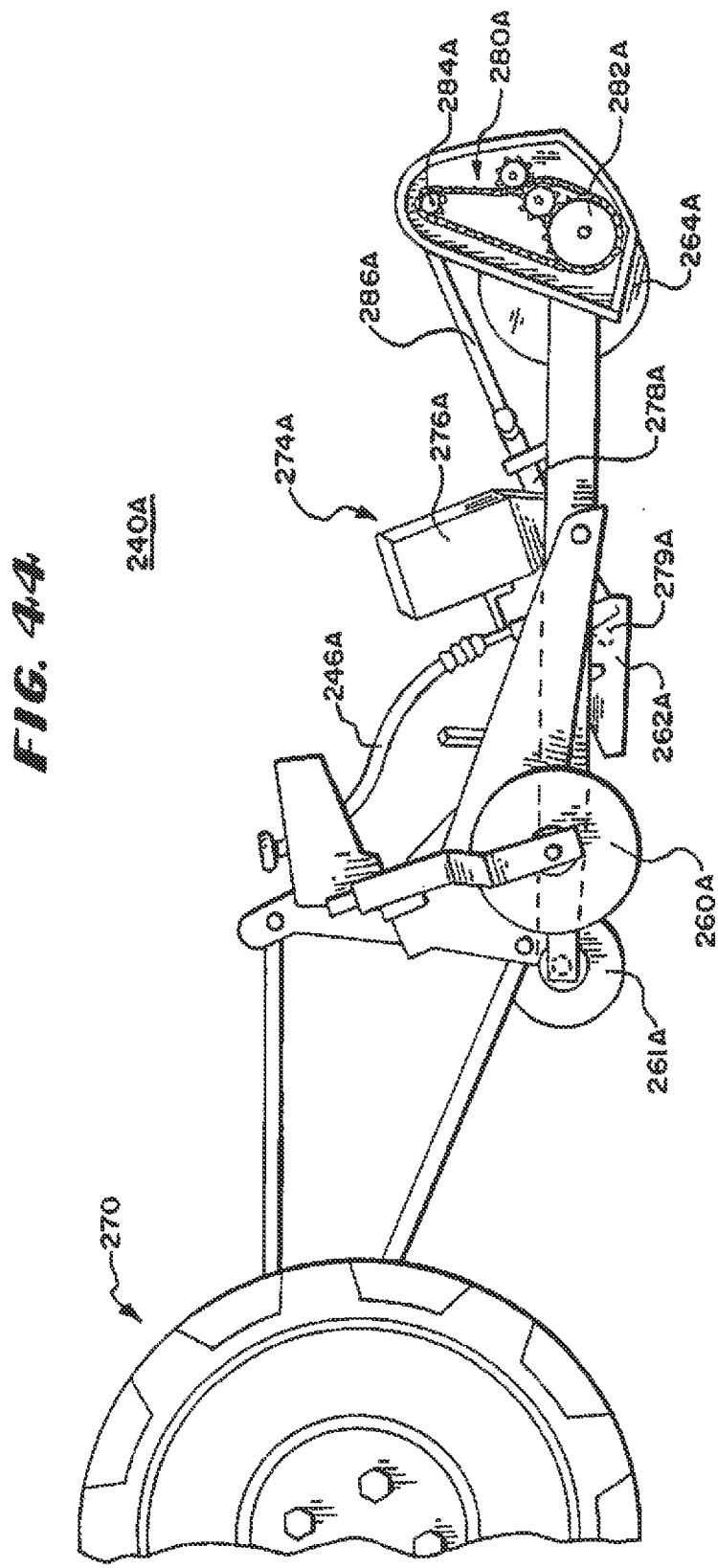
FIG. 44 is a fragmentary, elevational side view of a vegetable seed planter in accordance with an embodiment of the invention.

In FIG. 44, there is shown a side elevational view of the planter 240A from side A of FIG. 43, showing one tool bar wheel 260A, one depth control gage wheel 261A, the furrow preparing section 262A and the furrow closing and pressing section 264A. As shown in this view, the common separator section 246 (FIG. 43) blows air through the separator hose 246A adjacent to the feed hopper 276A. The feed hopper 276A includes a bottom feed section 278A ending at a tip 279A of the bottom feed section 278A and the separator hose 246A is located adjacent to the furrow preparing section 262A and before the furrow closing and pressing section 264A to feed seeds and gel or other prepared fluid drilling material into the furrow after it is opened and before it is closed.

To drive the bottom feed section 278A at a speed related to the movement of the planter 240A, the furrow closing and pressing section 264A includes a chain and sprocket section 280A with a bottom sprocket wheel 282A rotating with the pressing wheels and driving a top sprocket wheel 284A through a chain drive. The top sprocket wheel 284A rotates a shaft 286A through gearing, which shaft powers the bottom feed section 278A. A similar transmission for driving the seed or particle feeder 244B (not shown in FIG. 44) is connected in a similar manner on the other side of the planter 240A. Other conventional drive mechanisms can be adapted in a similar manner such as generating a signal indicating ground speed from a power shaft.

Figure 45:
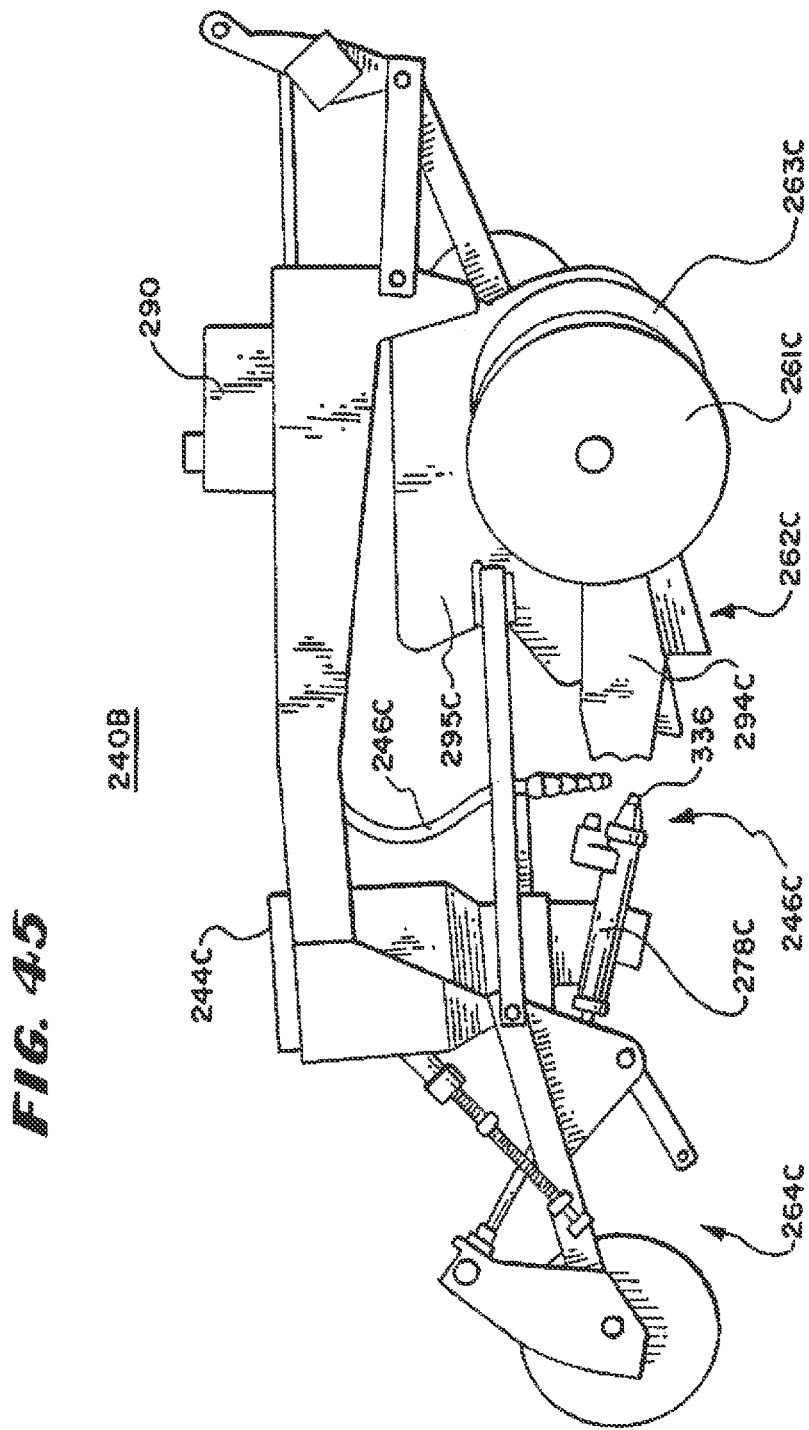
FIG. 45 is a fragmentary, side elevational view of another embodiment of planter.

In FIG. 45, there is shown a side elevational view of an embodiment 240B of a planter intended for larger seeds, such as corn seeds, having as some of its parts: (1) depth control gage wheels, one of which is shown at 261C; (2) a plurality of disc openers, one of which is shown at 263C; (3) a plurality of furrow preparing sections, one of which is shown at 262C; (4) a plurality of separators, one of which is shown at 246C; (5) a plurality of seed or particle feeders, one of which is shown at 244C; and (6) a plurality of sets of furrow closing and pressing sections, one of which is shown at 264C.

As in the embodiments of FIGS. 43 and 44, the embodiment of FIG. 45, contains a plurality of parallel row preparing sections for simultaneously planting a plurality of rows of seeds parallel to each other side-by-side and the embodiment of 240B is similar in many respects to the embodiment of planter 240A. However, the embodiment of 240B includes a water reservoir and pump shown generally at 290, and a different furrow digging shoe to be described hereinafter. The water reservoir and pump 290 is used only to clean equipment and does not enter into the planting of seeds. The seed or particle feeder 244C is shown with a bottom feed section 278C which feeds the seeds and matrix to its nozzle 336 where the seeds are separated one-by-one by the separator 246C. As shown in this embodiment, the nozzle 336 for the bottom feed section 278C and the nozzle for the separator 246C are placed in close juxtaposition with each other, and with the furrow being prepared so that the separator 246C blows air downwardly and perpendicularly to the ground or in a slight angle to the ground across the tip of the nozzle 336 of the bottom feed section 278C, thus causing seeds as they are moved to the nozzle outlet to be forced away from the nozzle 336 one by one to the ground.

To prepare the ground for receiving the seed and matrix, each furrow preparing section, such as 262C, includes a corresponding planting shoe, such as 294C, adapted to cooperate with and be aligned with a corresponding disk opener 263C. The shoe 294C is mounted for adjustment in depth to a mounting plate 295C which maintains it in position at a constant depth with respect to the ground. The bottom feed section 278C and the separator 246C are mounted adjacent to the shoe 294C to place the seed and matrix in the ground behind it.

Because the seeds are able to emerge sooner in this planter using gel or other prepared fluid drilling material, the shoe 294C (shown broken away in FIG. 45) during planting is less deep than in many applications. It is adjustable in position and in FIG. 45, is shown raised slightly above ground and would be adjusted to soil moisture depth when planting. The seed or particle feeder 278C is driven in the same manner as the embodiments of FIGS. 43 and 44, but may be driven by separate motors if desired. The nozzle 336 of the seed or particle feeder is positioned within wings of the shoe 294C at a distance from the ground and within the furrow forming element so as to cause the seed and matrix to be properly deposited.

Figure 46:
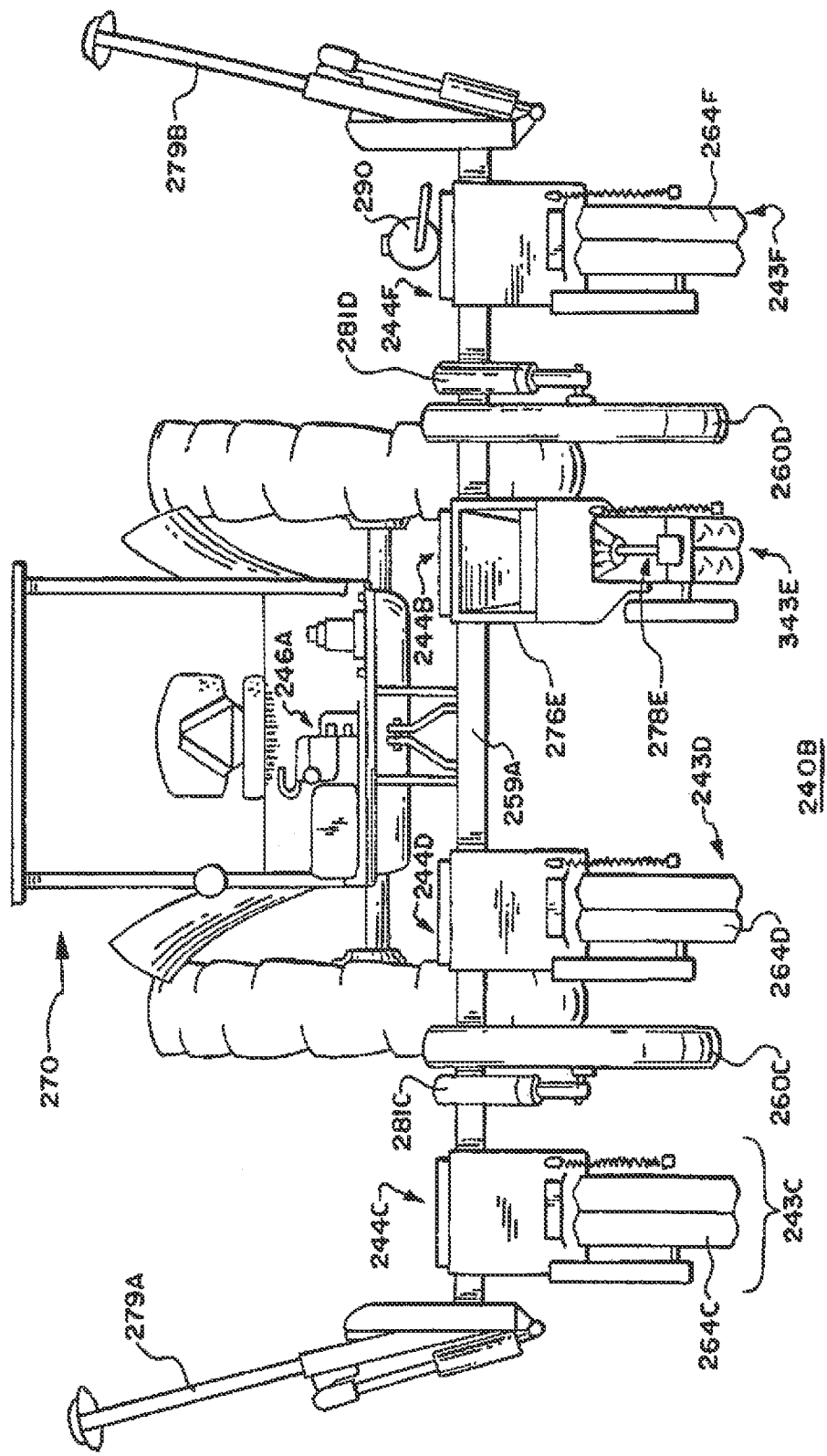
FIG. 46 is a simplified, perspective view of the embodiment of planter of FIG. 45.

In FIG. 46, there is shown a fragmentary, rear perspective view of the planter 240B four row sections 243C, 243D, 243E and 243F for forcing gel or other prepared fluid drilling material and seeds from their four corresponding seed or particle feeders 244C-244F to the corresponding fixtures (not shown in FIG. 46). In the preferred embodiment, the bottom feed sections, one of which is shown at 278E, are controlled by the speed of the vehicle. However, they may be independent of the speed of the vehicle and controlled automatically or by an operator in conjunction with a separate speedometer for the tractor. This arrangement is especially advantageous when seed counters of the optical type are used since an adjustment can be made from the cab based on the seed count to maintain regular spacing. In such a case, they may be driven by a separate hydraulic or electric motor.

As best shown in FIG. 46, the tool bar support wheels 260C and 260D are mounted by hydraulic cylinders 281C and 281D to the tool bar 259A in a conventional manner to adjust the depth or height of the planting shoes. The seed or particle feeder, one of which is shown at 276E feeds into the furrow. Conventional row markers 279A and 79B mark the rows. To supply air under pressure to the seed or particle feeders such as 276E, the separator 246A includes a source of air under pressure and a pressure gauge mounted to the tractor and connected by conduits to supply air to a location near the seed or particle feeder. In the preferred embodiment, the source of air under pressure includes a blower as described above.

Figure 47:
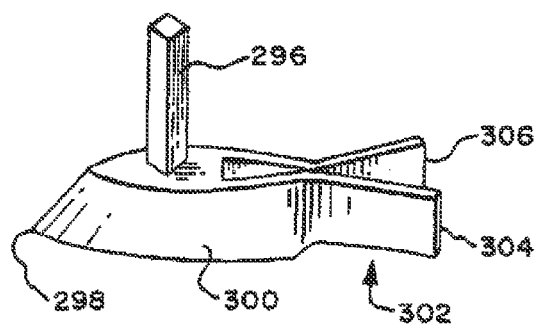
FIG. 47 is a perspective view of a planting shoe in accordance with an embodiment of the invention.

In FIG. 47, there is shown a perspective view of a planting shoe 294 having a mounting shaft 296, a cutting edge 298, a furrow forming portion 300, and a trailing portion 302. The mounting shaft 296 is generally square and attached to the top of the planting shoe 294. The planting shoe 294 is mounted horizontally behind the disk openers of the planter to prepare a furrow as it is moved through the ground. The cutting edge 298 is mounted so that it is substantially within the ground with its top flat surface above the ground. The cutting edge 298 is able to dig or deepen a furrow. Its furrow forming portion 300 widens the furrow, and its trailing portion 302 causes loose soil to be moved out of the way.

Figure 48:
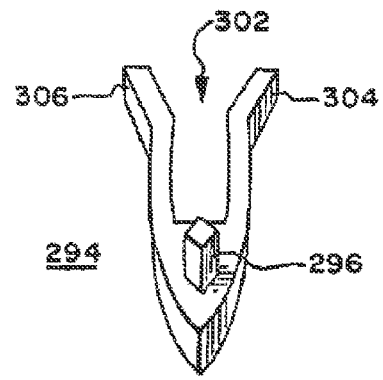
FIG. 48 is second perspective view of the planting shoe of FIG. 47.

As shown in FIG. 48, the trailing portion 302 of the planting shoe 294 contains outwardly extending portions 304 and 306 and a cut away portion which permits some flexing as it passes through the furrow and forces the soil to the side. The seeds are fed between the outwardly extending portions 304 and 306 from a height sufficient to avoid clogging of the nozzle with dirt and close enough to the furrow to prevent the matrix and seeds from being moved outside the furrow while falling by various forces such as wind or vibrations.

Figure 49:
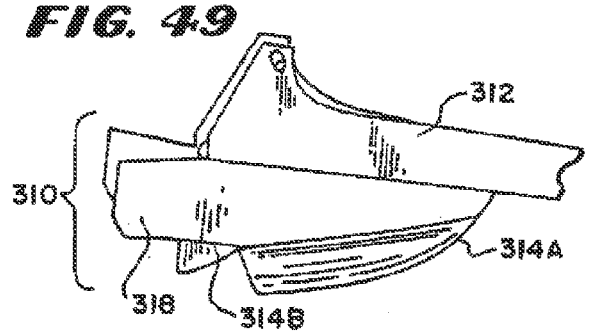
FIG. 49 is a perspective view of another embodiment of the planting shoe in accordance with an embodiment of the invention, usable primarily with the embodiments of the planters of FIG. 44.

In FIG. 49, there is shown a perspective view of an embodiment of shoe 310 for planting larger seeds, such as corn, having a mounting bracket 312, two aligned cutting edges 314A and 314B, and a trailing portion 318. The cutting edges 314A and 314B and trailing portion 318 are substantially identical to the cutting edge 298 (FIG. 47), furrow forming portion 300 (FIG. 47) and trailing portion 302 (FIG. 47). However, since the furrow should be deeper for these seeds, the cutting edge 314A is lower than the cutting edge 298 (FIG. 47) and the cutting edge 314B is wide to make a deeper, wider furrow. These designs of shoes enable the gel or other prepared fluid drilling material to fall within the groove and be relatively regular in location notwithstanding a slightly angled path of the gel or other prepared fluid drilling material from the nozzle caused by wind or vibration. To form a protective area for the matrix, gel or other prepared fluid drilling material and seeds to fall, the spaced apart portions 304 and 306 of FIGS. 47 and 48, are spaced from each other where the seeds drop. The planting shoes 294 (FIGS. 47 and 48) and 310 are mounted to float at the level adjusted for the openers to which they are mounted under the control of the level gauge wheels in a manner known in the art, for this purpose the mounting bracket 312 is mounted to the shoe 310 and the mounting bracket 312 is movably mounted to an opener mounting bracket in a manner to be described hereinafter.

Figure 50:
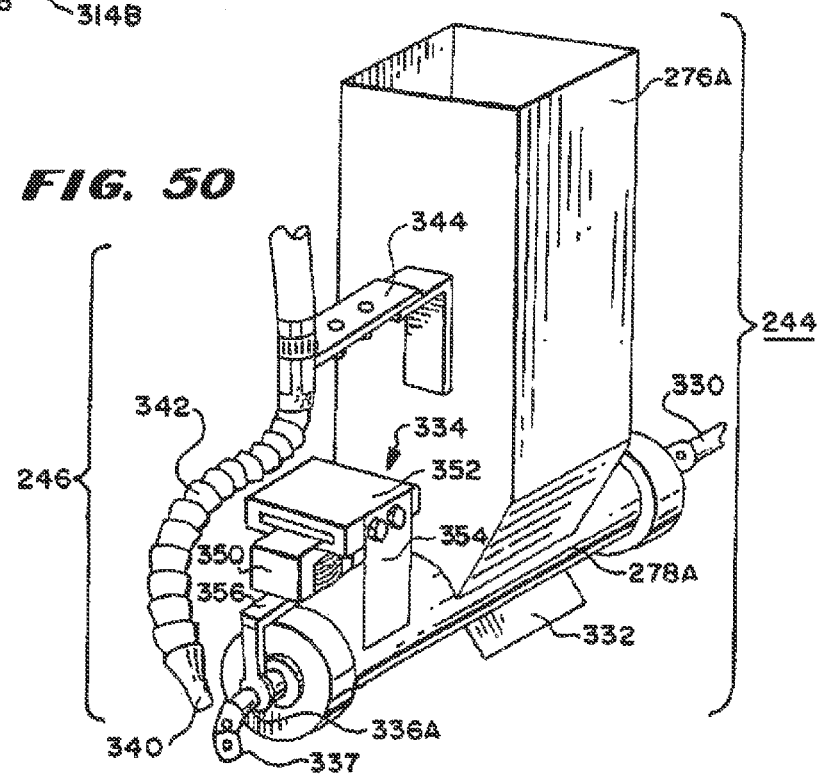
FIG. 50 is a perspective view of an embodiment of a small seed or particle feeder usable with the planters of FIGS. 43 and 44.
Figure 51:
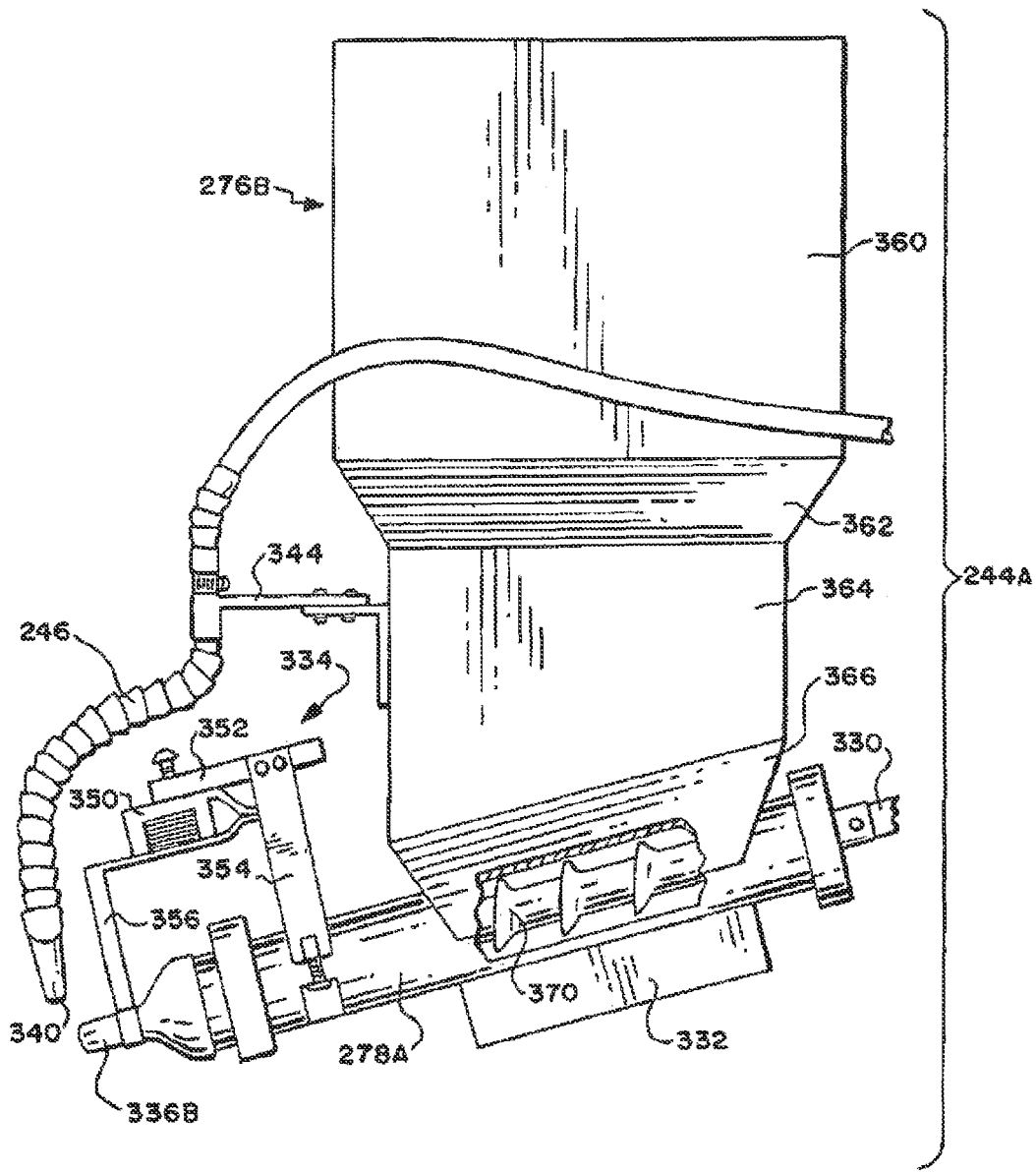
FIG. 51 is an elevational view, partly broken away of another embodiment of seed or particle feeder usable with the planters of FIGS. 43 and 44.

In FIG. 50, there is shown a perspective view of a seed or particle feeder 244 and a separator 246 of a type which is most useful for small seeds, such as carrot or cabbage seeds. The seed or particle feeder 244 includes a feed hopper 276A, a bottom feed section 278A, a motor output shaft 330, a mounting bracket 332, a vibrator 334 and a nozzle 336A. To expel seeds and matrix, the bottom feed section 278A is: (1) connected to and driven by the shaft 330; (2) mounted by the mounting bracket 332 to the frame of the planter; and (3) mounted to the feed hopper 276A from which it receives gel or other prepared fluid drilling material and seeds. It drives the seeds and gel or other prepared fluid drilling material under the driving force of the shaft 330 through the seed or particle feeder nozzle 336A while the seed or particle feeder nozzle 336A is vibrated by the vibrator 334. The shaft 330 is rotated by a chain and sprocket section (not shown in FIG. 50) in synchronism with the speed of the planter across a field or by a motor. The separator 246 includes a nozzle 340, a hose 342 and a mounting bracket 344. The hose 342 is in communication with the source of air 272 (FIG. 43) which may be as low as one-sixteenth pound per square inch pressure above atmospheric pressure and as high as 10 psi for broadcast applications but is preferably between one-quarter psi to four psi. The air is transferred under pressure through the hose 342 to the nozzle 340. The hose 342 is mounted to the feed hopper 276A by the mounting bracket 344 so that its nozzle 340 is above and pointing substantially perpendicularly downwardly toward the ground at a location just beyond the seed or particle feeder nozzle 336A to blow air across that nozzle 336A downwardly to the ground or in a pattern to broadcast distribute seeds in the pattern desired. The hose 342 is relatively stiff so that it may be mounted in position without moving under wind pressure or the like.

The feed hopper 276A is generally open topped and rectangular, being capable of holding several gallons of gel or other prepared fluid drilling material and seed with sides extending downwardly to a location close to the bottom feed section 278A where it is angled to communicate therewith. Other sizes and shapes of feed hoppers may be used, with the wall construction being adapted to cause the seeds and the gel or other prepared fluid drilling material to move into the bottom of the hopper 276A and into the bottom feed section 278A without the seeds being separated by laminar flow against the walls of the hopper, or settling into groups of sizes within the gel or other prepared fluid drilling material because of the period of time required for the large quantity of gel or other prepared fluid drilling material to be planted. Thus, the size of the feed hopper is related to the stability of the suspension of seeds and gel or other prepared fluid drilling material and is designed to retain uniformity in the dispersion of seeds within the feed hopper 276A until the seeds are driven through the seed or particle feeder nozzle 336A. The bottom feed section 278A of the seed or particle feeder 244 includes a cylindrical casing having an axis generally perpendicular to the central axis of the feed hopper 276A or inclined at an angle thereto. The angle of the bottom feed section 278A is such as to cause gravity to aid in the feeding of gel or other prepared fluid drilling material from the feed hopper 276A through the seed or particle feeder nozzle 336A. The longitudinal axis of the feed means makes an angle with the longitudinal axis of the feed hopper 276A such that the feed nozzle 336A is lower and further away from the top of the feed hopper 276A than the end receiving the motor output shaft 330.

To move the gel or other prepared fluid drilling material and seeds with a positive force, the feed means has a generally cylindrical casing which may be mounted at its bottom end by a mounting bracket 332 to the housing or by any other means. It receives at one end the motor output shaft 330, which is rotated by a hydraulic motor or by gearing connected to the press wheels or any other mechanism to force the seed/gel or other prepared fluid drilling material mixture toward the seed or particle feeder nozzle 336A. The seed or particle feeder nozzle 336A extends from a cap or closure mounted about the bottom feed section 278A to emit gel or other prepared fluid drilling material downwardly such as that shown at 337.

To maintain seeds in the seed or particle feeder nozzle 336A in a uniform suspension for dispersion in spite of possible laminar flow through the seed or particle feeder nozzle 336A, the vibrator 334 includes an electromagnet 350, a mounting base 352, a mounting bracket 354 and a yoke 356. The mounting base 352 is mounted to the cylindrical casing of the bottom feed section 278A by the bracket 354 and supports the electromagnet 350. The electromagnet 350 includes a U-shaped ferromagnetic outer member and a centrally located conductive winding connected to a source of alternating voltage that creates a flux path within the U-shaped ferromagnetic material first in one direction and then in the opposite direction to attract and repel the yoke 356.

To vibrate the nozzle 336A, the yoke 356 includes a ferromagnetic spring and downwardly extending member which fits around and grasps the seed or particle feeder nozzle 336A. The ferromagnetic spring extends between the legs of the U-shaped ferromagnetic material, being firmly fastened at one end and spring-biased from the other end, so that the flux path through the U-shaped member pulls the free end of the spring toward it to complete a flux path in one direction, and releases it as the flux path changes directions, pulling it back again to complete the path in the other direction. This action vibrates the yoke 356 and the seed or particle feeder nozzle 336A at a frequency and amplitude sufficient to maintain a smooth flow of seeds. While a typical ferromagnetic vibrator 334 has been disclosed, there are many such vibrators of different types available commercially and other vibrators may be utilized if it vibrates the yoke 356 at a frequency and displacement amplitude: (1) sufficient to prevent the separation of seeds from the matrix while the seeds are still within the seed or particle feeder nozzle 336A as the gel or other prepared fluid drilling material and seeds flow from the seed or particle feeder nozzle 336A, such as by friction against the walls; and (2) also sufficient to aid the separation of gel or other prepared fluid drilling material and seeds outside of but in contact with the seed or particle feeder nozzle 336A in a controlled manner with the aid of air flow from the separator nozzle 340. The principal purpose of the vibrations is to maintain an even dispersion of seeds and gel or other prepared fluid drilling material as the gel or other prepared fluid drilling material and seed matrix flows through the nozzle after it has left direct contact with the auger's shear force members.

The vibrations should be at a frequency suitable for the purpose intended, and generally having a longer wave length than the diameter of the seeds. It should generally be between 20 cycles per second and 10,000 cycles per seconds with an amplitude of between one millimeter and three millimeters to prevent the seeds as they push through the nozzle 336A from being lodged in the exit and plugging the nozzle. The amplitude of the vibrations should be sufficient to create an inertia effect between the seed and the gel or other prepared fluid drilling material and thus, is related to the viscosity of the gel or other prepared fluid drilling material and the density of the seeds.

The separator 246 is intended at regular intervals to force seeds and matrix arriving at the tip of the seed or particle feeder nozzle 336A to be separated and drop to the ground. It may be a mechanical vibrator which passes across the opening or a rotating fan-like mechanism but in the preferred embodiment, is 0.025 psi above atmospheric pressure. To properly separate the seeds, the air stream should be between 1/20th of a pound per square inch and four pounds per square inch above atmospheric pressure or below atmospheric pressure if it is a vacuum pump positioned to remove gel or other prepared fluid drilling material and seeds and permit them to drop by gravity. Preferably, the air stream passes directly across the tip of the seed or particle feeder nozzle 336A in a vertical direction in a plane perpendicular to the direction of motion of the planter or in the direction of the groove into which the seeds are to be dropped and perpendicular or at a slight angle in a plane aligned with the direction of motion of the planter or in the direction of the groove into which the seeds are to be dropped, the angle aligned with the direction of the motion of the planter or the groove being no more than 75 degrees on either side of a normal to the ground and being no more than 30 degrees from a normal to the ground in a plane perpendicular to the direction of motion of the planter or the groove.

In FIG. 51, there is shown another embodiment of seed or particle feeder 244A connected to the separator 246 and having an identical vibrator 334 (shown in detail in FIG. 57), mounting bracket 352, bottom feed section 278A and shaft 330. However, the feed hopper 276B differs from the feed hopper 276A of FIG. 50. The differences are generally intended to accommodate larger seeds and larger volumes of seeds than that of the feed hopper 276A of FIG. 50, by making the movement of the seeds into the bottom feed section 278A easy while accommodating larger volumes of feedstock in the box.

The feed hopper 276B includes an enlarged top portion 360, an inwardly angled portion 362, a narrow portion 364 and an auger portion 366 which is attached to the bottom feed section 278A. The bottom feed section 278A has an auger 370 within it which is rotated by shaft 330 from a chain and sprocket section or from a motor to move the gel or other prepared fluid drilling material toward the seed or particle feeder nozzle 336B. The narrow portion 364 narrows down to force the gel or other prepared fluid drilling material onto the auger 370 where it can be moved within the cylindrical bottom feed section 278A which encases it so that the shear surfaces of the auger 370 successively move the mixture to the seed or particle feeder nozzle 336B.

To facilitate flow of the mixture, the narrow portion 364 is at an angle so that the bottom feed section 278A tilts downwardly with the seed or particle feeder nozzle 336B being below the shaft 330. The narrow portion 364 connects the auger portion 366 with the inwardly angled portion 362 which causes the mixture to slide inwardly. The enlarged top portion 360 is above the inwardly angled portion 362 to contain more material and yet by gravity force the mixture downwardly onto the auger 370.

Figure 52:
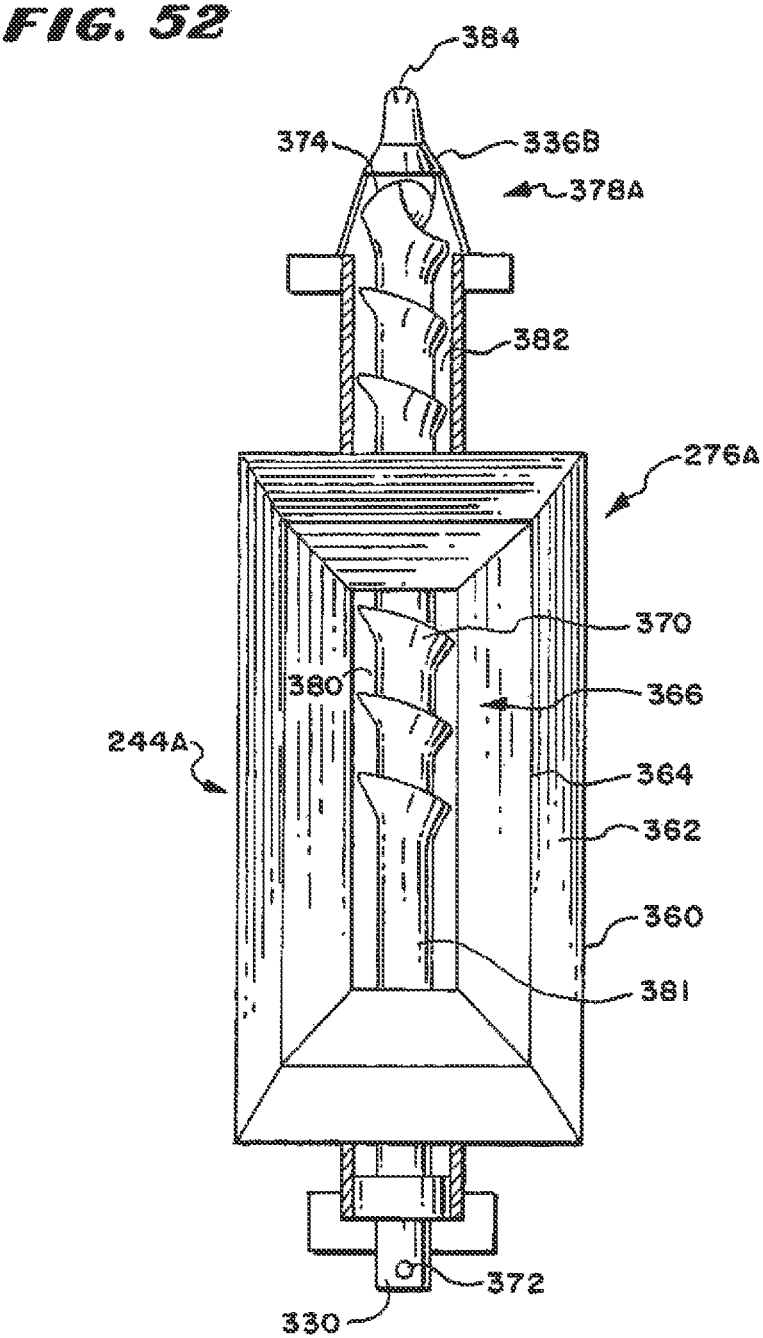
FIG. 52 is a top view of the seed or particle feeder of FIG. 53.

In FIG. 52, there is shown a plan view of the seed or particle feeder 244A having a feed hopper 276A, an auger 370, and the nozzle 336B. The feed hopper 276A has: (1) an open top end to receive gel or other prepared fluid drilling material and seed; and (2) a bottom end communicating with the auger 370 to supply a mixture of seed and gel or other prepared fluid drilling material thereto. To receive gel or other prepared fluid drilling material and seeds, the feed hopper 276A has: (1) an enlarged top portion 360 having a rectangular cross section with straight vertical sides; (2) a smaller center or connecting portion 362 having inwardly tapered walls connecting the top end portion and lower portions; (3) a lower narrow portion 364 having a rectangular insertion; and (4) an inwardly tapered section or auger portion 366 ending with the auger 370 at the bottom. The auger 370 has at one end a pin connection 372 for connecting to the shaft 330 to rotate the auger 370 and at its other end a termination land 374 intended to eject seeds. The auger 370 contains threads within a compartment 380 located at the bottom of the feed hopper 276A and opening upwardly into the feed hopper 276A. The threads of the auger extend within the nozzle 336B shown at 382, the bottom feed section 378A being a closed cylinder surrounding the end of the auger 370 and ending in an opening 384 which opening has tapered walls and an orifice through which the feedstock material such as seeds, particles, additives, and gel or other prepared fluid drilling material mixture is moved. The bottom compartment 380 is not as long as the threaded portion of the shank of the auger. An unthreaded portion 381 of the auger, at least one inch long, fits within the compartment 380 for receiving gel or other prepared fluid drilling material to be moved by the auger 370 to the nozzle 336B.

The feed hopper 276A, auger 370 and bottom feed section 378A are designed with dimensions selected to prevent: (1) cracking of seeds between edges of the auger 370 and the nozzle 336A or feed hopper 276A; (2) the separation of seeds by laminar flow against surfaces, resulting in eventual blocking of the nozzle 336B; (3) pulsating output of seeds and gel or other prepared fluid drilling material caused by irregular delivery from the auger 370 through the opening 384; and (4) improper spacing of seeds by disruption of the even dispersion of seeds within the gel or other prepared fluid drilling material. To reduce cracking or slicing of the seeds, the angle of the threads of the auger 370 at their upper edge and the angle of the bottom feed section 378A or the feed hopper 276A at the location where the mixture is first pushed from the feed hopper 276A into the bottom feed section 378A are selected to avoid a scissor effect which may crush or slice seeds. For this purpose, the angle of the flight where it passes into the tube and the angle of the wall within the feed hopper 276A that it contacts are selected to be equal so that flight and wall operate as an edge moving parallel toward an edge. This structure permits maximum gel or other prepared fluid drilling material to be drawn into the bottom feed section 378A and avoids a scissor effect which may catch the seeds and crack or slice them.

To reduce the separation of seeds by laminar flow as the gel or other prepared fluid drilling material moves down the feed hopper 276A, the feed hopper 276A is of a sufficient size to create downward pressure into the auger compartment 380 and has angled walls which are related to the viscosity of the gel or other prepared fluid drilling material and the size and density of the seeds. The bottom angled surface is intended to channel the gel or other prepared fluid drilling material directly into the auger 370 rather than permitting it to lie against a flat surface where seeds may eventually separate out by slow motion of the gel or other prepared fluid drilling material or motion of the gel or other prepared fluid drilling material in a horizontal plane against the bottom of the feed hopper 276A. The straight surfaces are intended to create a head of weight which tends to force the gel or other prepared fluid drilling material downwardly with pressure against the slanted surfaces.

To prevent blocking near the end of the bottom feed section 378A where the matrix of seeds and gel or other prepared fluid drilling material enter it from the feed hopper 276A, the depth of the grooves in the auger is sufficiently deep and the angle of the threads sufficiently large to cause the a large bulk of the gel or other prepared fluid drilling material mixture to be moved with only a small surface area of gel or other prepared fluid drilling material in contact with a stationary surface at a rate which is not conducive to laminar flow. The threads are shaped in this manner because laminar flow may otherwise cause separation of seeds against the surface of the grooves and eventually result in clogging. The actual flow is turbulent and conducive to some mixing that maintains the seeds in suspension.

The depth of the grooves in the auger varies with the size of the seed and the amount of gel or other prepared fluid drilling material. The angle of the threads is correlated with a number of factors to control the speed of movement of the surface of the gel or other prepared fluid drilling material against the walls of the bottom feed section 378A, the other factors being: (1) the spacing between seeds; (2) the speed of the planter across the ground; (3) the density of the seeds within the gel or other prepared fluid drilling material; (4) the angle of the threads of the auger 370; and (5) the number of revolutions per minute of the auger 370. To reduce separation at the exit end of the bottom feed section 378A, the angle of the termination land 374 is sharpened to push gel or other prepared fluid drilling material and seeds out at a greater velocity. Thus, the angle of the inlet end of the bottom feed section 378A matches the threads and the threads have an angle at that location which is different than the angle at the exit end.

To reduce plugging of the nozzles: (1) the angle of the termination land 374 and the angle of narrowing of the bottom feed section 378A are selected for maximum ejection separation and precision; (2) an air separator is used as described above; (3) a vibrator is used as described above; and (4) the gel or other prepared fluid drilling material mixture has sufficient solid and semisolid material in it to impart a force directly through the feedstock material rather than separating solids from gel or other prepared fluid drilling materials. This permits movement through openings as little as one millimeter or less longer than the seeds rather than plugging as has happened with prior art efforts to pump a mixture of seed and gel through a hose. The end thread of the auger extends into the tapered portion of the nozzle 336B to create a force as the taper occurs to reduce clogging. The vibration appears to create turbulence and avoids the lodging of the seeds at this location.

Since the viscosity of the gel or other prepared fluid drilling material affects both the settling rate and the ability to separate at the nozzle, it is chosen with both factors in mind. Some gel or other prepared fluid drilling materials change in viscosity with time and so seeds which have been preconditioned are mixed with the gel or other prepared fluid drilling material and the gel or other prepared fluid drilling material immediately used since its viscosity can be controlled at the starting point. This also reduces the possibility of the gel or other prepared fluid drilling material drowning the seeds for lack of oxygen because of the short time that they are actually in the gel or other prepared fluid drilling material and yet permits rapid and synchronous emergence of plants that are planted from the fully hydrated seeds with the invention.

The threads 382 between grooves are shaped with a flat top edge which can closely engage the walls of the bottom feed section 378A and a thickness which is low compared to the size across of the groove to permit the gel or other prepared fluid drilling material and seed matrix to be carried in pockets sufficiently large as compared to the surfaces against which the open end of the grooves move so that with the auger 370 rotating at a speed sufficiently low, separation by laminar flow is low and a relatively non-slip friction surface to move the seeds is provided. Generally, the edges of the threads should be less than 1/10th of the open surface between threads in the grooves and the grooves should be at least as deep as the linear length of the open space except for small seeds. The diameter of the screw should be such with the above constraints as to prevent motion between the walls of the bottom feed section 378A and the gel or other prepared fluid drilling material greater than 36 linear inches per minute for average viscosity gel or other prepared fluid drilling materials.

To prevent the output from pulsing, either: (1) the angle of the threads 382 is uniform; or (2) the ratio of depth to width of the grooves of the auger 370 are selected so that there is not a great difference in the delivery rate during different portions of a revolution of the auger 370. Similarly, the width of the edge and slope of the threads are selected to avoid a dead space into the nozzle 336B. A shallow, wide groove causes more of the gel or other prepared fluid drilling material and seed to be exposed to frictional and centrifugal forces while being moved toward the nozzle 336B in the bottom feed section 378A and thus creates better mixing for a uniform distribution of seeds but increases the possibility of the seeds being moved by frictional forces against the surface.

The angle of the threads, except for the front end, should be at least 15 degrees and is preferably 22 degrees with a pitch of 1.5 per inch single groove. The angle at the termination land 374 at the tip of the auger 370 is much sharper and should form an acute angle no greater than 15 degrees to cause a rapid acceleration of the matrix and seeds and gel or other prepared fluid drilling material at the tip. While in the preferred embodiment, the pitch and angle of the auger 370 is sharply increased only adjacent to the nozzle 336A (FIG. 50) or 336B, it may have a different pitch within the bottom feed section 378A than within the feed hopper 276A itself since the tendency to separate out is greater in the bottom feed section 378A where it is surrounded by tube wall with no open side. Throughout the auger 370, it is desirable to form the trailing edge of each thread to aerodynamically pull the gel or other prepared fluid drilling material forward and the forward edge to push the gel or other prepared fluid drilling material forward.

Figure 53:
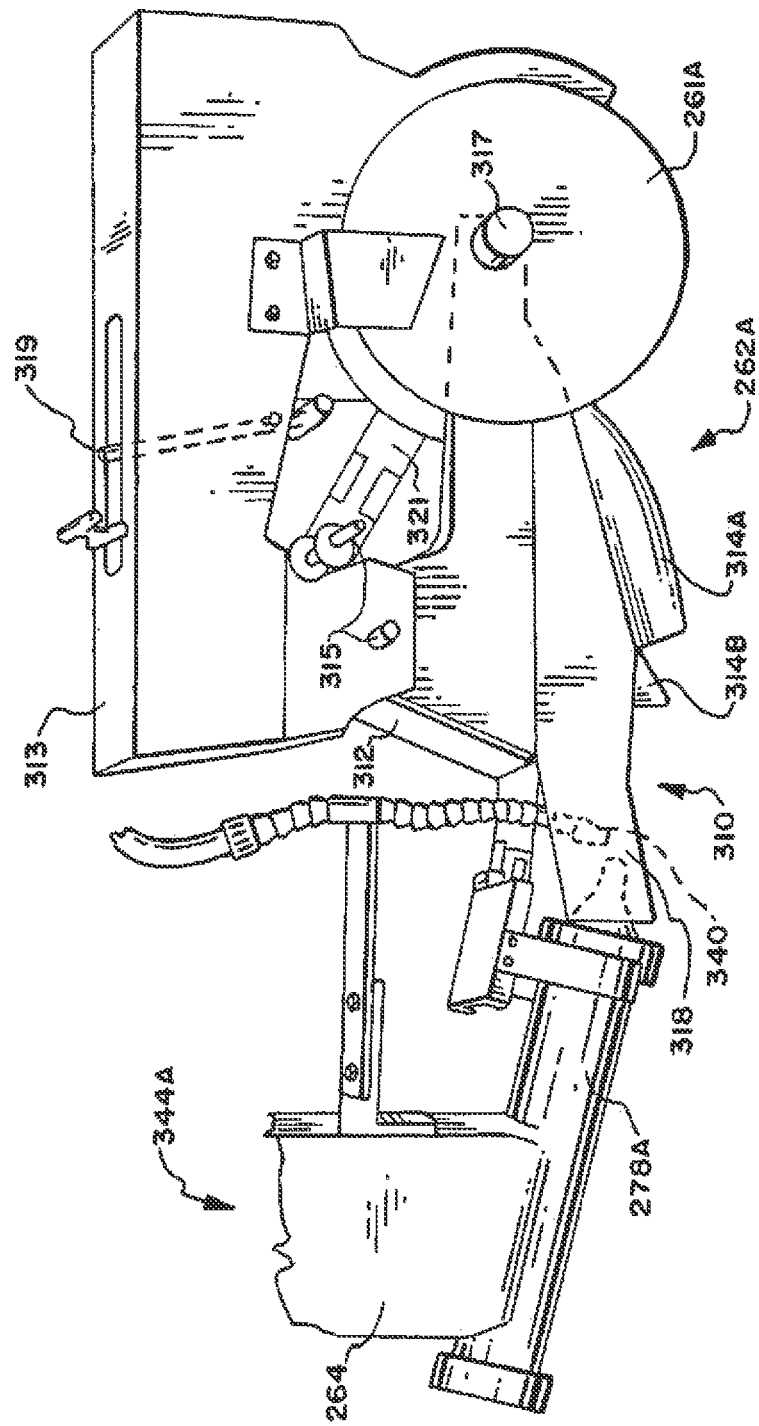
FIG. 53 is a fragmentary perspective view of the planter of FIG. 45, the shoe of FIG. 49 and the seed or particle feeder of FIGS. 50-52.

In FIG. 53, there is shown a fragmentary perspective view of a modified John Deere Max Emerge planter illustrating the positioning of the seed or particle feeder 344A, the planting shoe 310, the separator nozzle 340 and the gauge wheel 261A in a furrow preparing section 262A. As shown in this view, the planter is mounted to the gauge control wheels 261A behind the disk openers and to the access of the gauge control wheels where it floats as attached by the lever 312 to a floating adjustable support 313.

To permit floating at an adjustable height, the lever 312 is pinned at 315 to the level adjustment support 313 which is also mounted to the gauge wheel shaft at 317 but is adjustable in height thereabout by means of a lever 319, so that: (1) the tip of the shoe 310 is mounted at the same level as the disk opener adjacent to the depth gauge wheel 261A; (2) the rear portion of the lever 312 is pinned at 315 at a height adjustable by the lever 319 with its bottom connected to the top of the shoe 310; and (3) the shoe rear, the lever 312 and the level adjustment are all free to move upwardly or downwardly a short distance under the control of a spring bias lever 321 by pivoting about the pin 315 and shaft 317. Between the wings of the trailing section 318 of the shoe 310, the separator nozzle 340 and the nozzle of the bottom feed section 278A are positioned adjacent to each other to be shielded by the trailing edge 318. The amount of movement of the shoe 310 is insufficient to remove the separation tip and nozzle tip from the wings of the shoe at 318 where they are protected from dirt or wind which might otherwise disrupt their operation.

With this arrangement, room is provided within the furrow digging mechanism for the separator nozzle and seed or particle feeder nozzle within a protected location that shields the nozzles from being clogged by dirt or having the seed moved aside by excessive wind and yet permits them to be close to their final location with respect to the ground for planting. The amount of spring bias and dimensions of the shoe mounting are related so that the floating action of the shoe does not influence the fixture operation in a detrimental manner.

Figure 54:
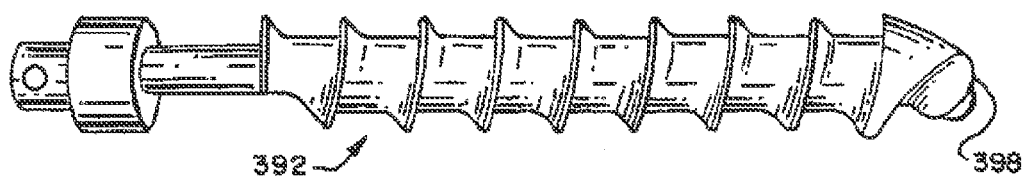
FIGS. 54-56 are elevational views of embodiments of auger usable in a seed or particle feeder such as that shown in FIGS. 50-52.
Figure 55:
Figure 56:
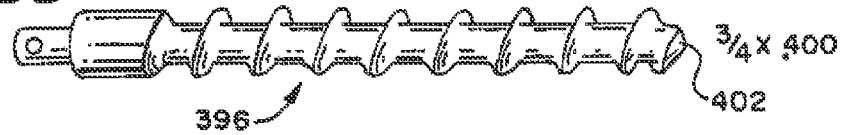

In FIGS. 54, 55 and 56, there are shown three different augers 392, 394 and 396, respectively, with the three augers being for different size seeds. The auger 392 has a shank with a larger diameter and a larger pitch or angle to the threads at the tip 398. The grooves between the threads are also larger and the threads have a smaller angle. It is adapted for seeds the size of corn. The auger 394 is for small seeds such as carrot or lettuce and has a tip 400 with a smaller pitch. Generally, it has a ½ inch outer diameter, with a one inch lead between the threads and a depth of ⅛ inch between the grooves bottom and the top edges of the threads. FIG. 56, shows an auger for medium size seeds such as onion seeds having a ¾ inch lead between the threads and a 0.40 depth of the groove. Its tip 400 is a still lower angle tip. In general, the augers have a pitch of between one-half inch and three inches and a groove depth of between 1/16 of an inch and three inches.

Figure 57:
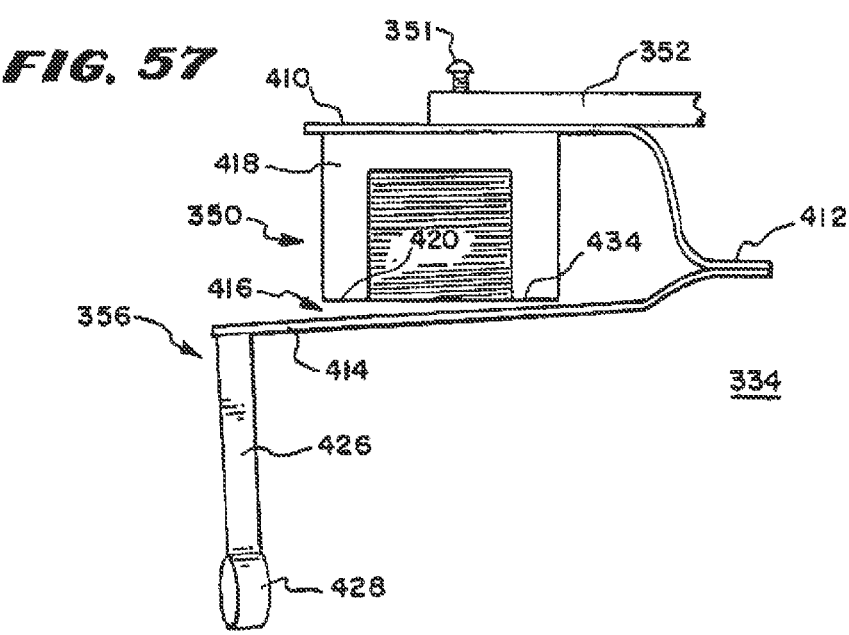
FIG. 57 is a perspective view of an embodiment of vibrator usable in the seed or particle feeders of FIGS. 50-52.

In FIG. 57, there is shown an elevational view of the vibrator 334 and a mounting bracket base 352, with the vibrator including an electromagnet 350 and a yoke 356. The mounting base 352 is connected to the mounting bracket 264 (FIG. 53) as described above, and the base 352 is connected to the vibrator by a top screw 351 for firm mounting. To permit vibration of the yoke 356 by the electromagnet 350, the electromagnet 350 includes a leaf spring 414, a ferromagnetic outer base 418, and a coil. A metal extension 410 is connected at 412 to the ferromagnetic leaf spring 414 which is biased a slight distance shown at 416 from the electromagnet 350. The outer base 418 is an inverted U-shaped ferromagnetic member having two end portions 420 and 434 and surrounding the electromagnetic coil which is electrically connected to a source of AC potential as described above. To vibrate the nozzle, the yoke 356 includes a downwardly extending arm 426 and a collar 428, with the arm 426 being connected to the ferromagnetic leaf spring 414, which is separated from the ends 420 and 434 by the gap 416 and attached at its other end to the collar 428 for vibrating the nozzle (FIG. 52) of the drive means for the seed or particle feeder 244A. Of course many other types of vibrators are known and can be used.

Figure 58:
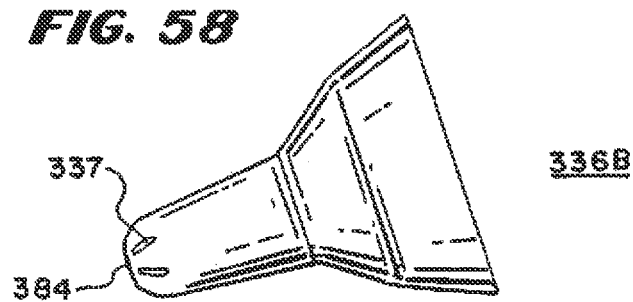
FIG. 58 is a perspective view of a nozzle usable in the seed or particle feeder of FIGS. 50-52.

In FIG. 58, there is shown a nozzle 336B having a land 384 and one or more slits 337. The nozzle is made of an elastomeric material such as rubber and capable of expanding. The slits 337 and the rubber construction are adapted to seeds which have a small amount of gel or other prepared fluid drilling material with them and thus provide a solid mass to squeeze through the tip one by one in the singulation process, but not generally being able to escape by gravity. At the tip, they are vibrated by the vibrator as described above and singulated by air. In the alternative, the fixture 20C as described in connection with FIG. 30 may be used to separate the seeds one from the other and expel them.

Figure 59:
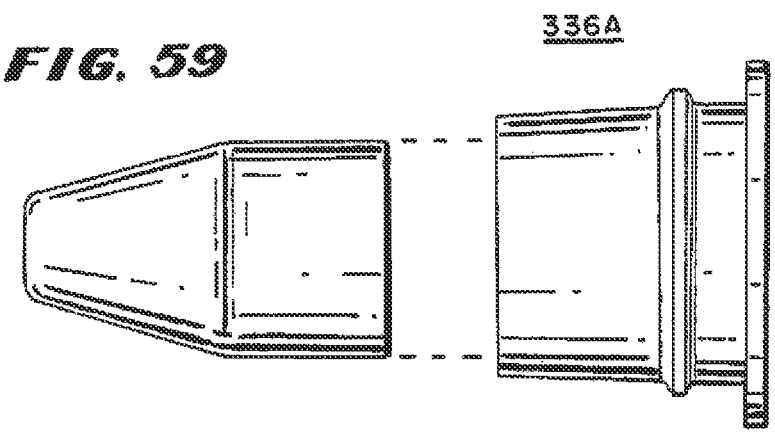
FIG. 59 is an elevational view of a nozzle usable in the embodiment of FIG. 53.

In FIG. 59, there is shown a nozzle 336A which is formed of relatively rigid plastic and adapted to receive small seeds containing a large amount of gel or other prepared fluid drilling material. This nozzle does not expand but vibrates and has sections of gel or other prepared fluid drilling material removed by the separator containing seeds for singulation. The gel or other prepared fluid drilling material has sufficient self-adhesion to prevent the seeds from escaping the tip of the nozzle prematurely by gravity.

Figure 60:
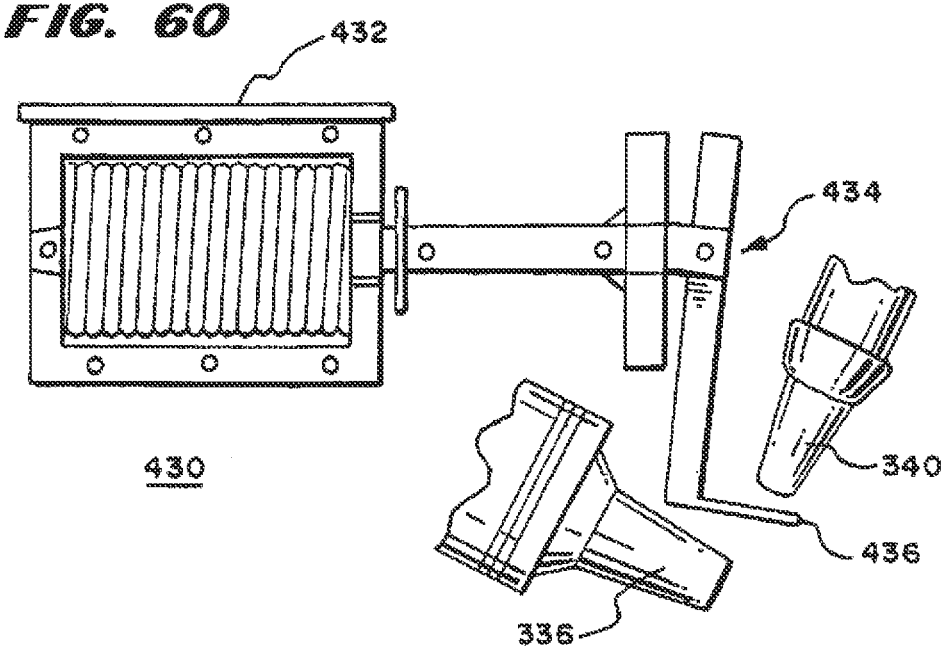
FIG. 60 is an elevational view of another embodiment of seed or particle feeder.

In FIG. 60, there is shown another embodiment of seed or particle feeder 430 specially designed for careful placement of seeds by causing the seeds to fall within a group of preselected target areas. For this purpose, it includes a spacer 434 comprising a solenoid 432 and a solenoid operated lever 436 positioned in juxtaposition with the separator nozzle 340 and the seed or particle feeder nozzle 336. The solenoid 432 may be any type of solenoid capable of moving the solenoid operated lever 434 so that the lever moves a blocking mechanism 236 over the orifice in the separator nozzle 340 to interrupt the air therefrom. With this embodiment, the solenoid 432, when actuated, moves the solenoid operated lever 434 into the path of the separator nozzle 340 so that seeds and matrix are not forced from the seed or particle feeder nozzle 336 by a stream of air under pressure from the separator nozzle 340. When the seed or particle feeder nozzle 336 is directly over the target area, the solenoid 432 is deenergized to release the solenoid operated lever 434 and open a path for the air from the separator nozzle 340 to blow across the seed or particle feeder nozzle 336, thus removing the gel or other prepared fluid drilling material and seed which accumulated while the air was blocked from the seed or particle feeder nozzle 336. This can also be accomplished by other means such as by opening and closing a solenoid valve in the air supply 340.

In FIG. 61, there is shown a perspective view looking from the top of still another embodiment 440 of seed or particle feeder having a hopper 452 and first, second and third augers 446, 448 and 453. The hopper includes a rectangular outer wall portion 242, an inwardly tapered wall portion 444 ending in a flatbed which receives within recesses the augers 446, 448 and 453. This embodiment 440 is similar to prior embodiments except that there are three augers forming three drive means for three different rows of seeds within a single hopper 452.

In FIG. 62, there is shown another perspective view of the embodiment 440 of a three-row seed or particle feeder and separator showing the single hopper 452 mounted vertically with three nozzles 454, 456 and 458 extending therefrom to be vibrated by a single vibrator 470 having yokes about each of the nozzles for vibrating them as described above in connection with single row seed or particle feeders and separators. Adjacent and above each of the nozzles 454, 456 and 458 are corresponding separator nozzles 460, 462, and 464 adapted to be connected to a manifold 480 which receives a source of air under pressure at the connection 480 under the control of a valve 468 so as to control the pressure of the air flowing across the nozzles. This embodiment of seed or particle feeder and separator operates in the same manner as the prior embodiments and is adapted to be mounted to a planter to plant adjacent rows in close juxtaposition from a single hopper. It has the advantage of economy and the ability to plant closely spaced rows of seeds.

In FIG. 63, there is shown an embodiment of a gel or other prepared fluid drilling material-chemical dispenser 498 having a fixture 532A with an air source 340 and separation surface 540, and an additive line 538A connected to an additive source. The dispenser 498 for chemicals and gel or other prepared fluid drilling material may be used alone or mounted in tandem with a seed or particle feeder (FIG. 53) to have gel or other prepared fluid drilling material with additives separated by air from the nozzle 340 and deposited with seed from a seed or particle feeder such as that shown in FIG. 56, or alone.

The separator may be substantially the same as the separators used in the embodiment of FIG. 64, cooperates with the feeder 532A in FIG. 63, but may be arranged in any of the other arrangements described herein. A nozzle for the chemical additives similar to the nozzle 336A (FIG. 59) may also be used, and in this case the separator may be positioned in a manner similar to the position it is used in the seed or particle feeder 344A (FIG. 53) to deposit additives and gel or other prepared fluid drilling material or a separator may not be used at all to deposit a tubular column of gel or other prepared fluid drilling material and additives.

A pump 534 (FIG. 64) may be any suitable peristaltic pump such as for example peristaltic pumps sold under the trademark Masterflex by Cole-Parmer Instrument Company, Chicago, Ill., or gear pump or other precision low pressure pump which may be driven by an axle or wheel so as to synchronize pumping rate with travel speed or pumps sold by Cole-Parma under the trademark ISMATIC if driven by a separate motor controlled by the operator to maintain delivery speed in accordance with speed of the dispenser with respect to the field. Moreover, pumps that are capable of positive displacement at low pressure other than peristaltic pumps may be used.

The fixture 532A may be vibrated in a manner similar to the embodiment of FIG. 53, or may rely only on the force of the vibrator 334 to cause a continuous substantially uniform mixture of chemical additives and gel or other prepared fluid drilling material to be applied. In one embodiment, the fixture 532A is cut away at 540A to provide an open top channel to receive gel or other prepared fluid drilling material and the nozzle 540 of the separator is positioned to direct air under pressure directly at the open top of the channel and thus form a mist of gel or other prepared fluid drilling material-additive spray that is uniformly spread over any area. The opening is adjusted so that chemical additives are economically used and may be contained by the gel or other prepared fluid drilling material at a concentration such that uniform and adequate distribution with the gel or other prepared fluid drilling material is obtained at the appropriate rate by controlling the pump speed, size of fixture 532A and speed of movement across a field with respect to the concentration of the material being applied.

In FIG. 64, there is shown an agricultural input dispensing system 499 adapted to be pulled across a field to provide additives having a pump 334, a chemical tank 330, an air manifold 350, a ground wheel drive 352, air lines 446A-446H, chemical lines 538A-538H and nozzles 532A-532H. The pump 334 is driven by the ground wheel 352 to pump a gel or other prepared fluid drilling material—additive matrix or concentrated chemical additive through the chemical lines 538A-538H. Air from two blowers 354 and 356 pressurize the manifold 350 to a pressure controlled by air pressure adjustment valve 358 as measured by an air pressure gauge 360. Air under pressure is applied through the air lines 446A-446H to the nozzles 532A-532H to spray droplets of the material being applied. The material being applied should resist dripping from the nozzle or fixture in most cases of applying material. Viscosity in relation to conduit or nozzle size is a principal means for preventing such excessive free movement.

Figure 31:
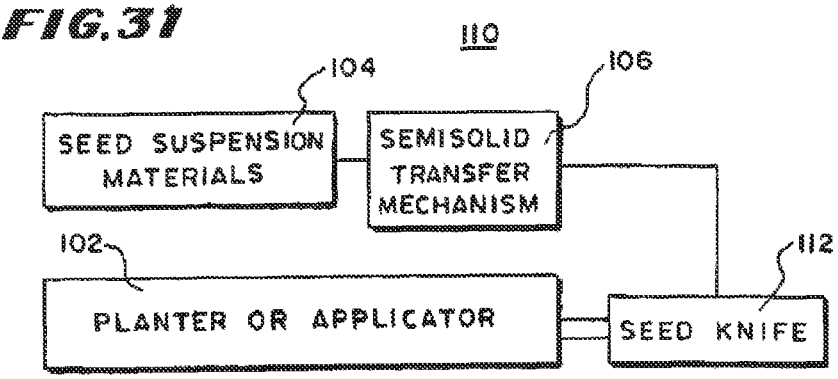
FIG. 31 is a schematic block diagram of another embodiment of planter in accordance with the invention.

This system has the advantage of: (1) reducing the amount of chemical additive and carrier because it is viscous and may be slowly but evenly distributed; and (2) is not susceptible to clogging because reasonable size nozzle openings may be used and the gel or other prepared fluid drilling material may be expelled through them with substantial force to keep them clear without using excessive amounts of gel or other prepared fluid drilling material or additive. Before operating the planter or applicator of FIGS. 29-31, of this invention, seeds having characteristics suitable for fluid drilling are selected. The seeds may be activated initially through priming, dried to terminate activation, stored until planting time, mixed with a gel or other prepared fluid drilling material and then fed from a planter as the planter traverses the field in properly spaced orientation for rapid germination and emergence.

To precondition the seeds, the seeds are permitted to absorb water at proper germination temperatures as described by Bredford, Kent J. "Seed Priming: Techniques to Speed Seed Germination", Proceedings of the Ore on Horticultural Society, 1984, v. 25, pp. 227-233. After reaching activation but prior to growth, the seeds are usually removed from the priming system and dried although they can be directly planted rather than being dried and later rehydrated.

Prior to planting, a gel or other prepared fluid drilling material is prepared. For example glycerin may be used instead of a standard gel. The viscosity of the gel or other prepared fluid drilling material used in fluid drilling in accordance with this invention should be between 800 and 5000 centipoise. Preferably, for relatively small seeds such as cabbage, the mixture is prepared to yield soft gel or other prepared fluid drilling material having a viscosity of between 1,800 and 2,000 centipoise; for medium sized seeds a medium strength gel or other prepared fluid drilling material having a viscosity of between 2,500 to 3,000 centipoise and for large seeds, a heavy strength, having a viscosity of between 3,000 to 4,000 centipoise. The volume of gel or other prepared fluid drilling material to seed is in a range of ratios of between 1 to 1 and 4 to 1 and preferably a range of 3 to 1 for small seeds. The seeds and gel or other prepared fluid drilling material are preferably mixed together within three hours before planting. Additives such as microorganisms having beneficial effects on the plants may be added to infect the seeds or pesticides and fertilizers or growth hormones may be added to the gel or other prepared fluid drilling material at the same time it is mixed or after but before planting. The matrix of seeds and gel or other prepared fluid drilling material are mixed and put into the feed hoppers 276A and 276B as shown in FIGS. 43, 44, 50-52.

Beneath the gel or other prepared fluid drilling material mixture is a drive mechanism for the seed or particle feeder which includes means for moving pockets of gel or other prepared fluid drilling material and seed as groups along at least partially enclosing surfaces to reduce the amount of motion between gel or other prepared fluid drilling material surfaces and solid surfaces. The hopper into which the gel or other prepared fluid drilling material is formed generally requires surfaces arranged to reduce the removal of seeds by friction against the surfaces during flow of the material. Similarly, the drive mechanism is designed to have a reduced area of contact between solid surfaces and the moving surface of the gel or other prepared fluid drilling material and for this purpose, an auger is used. To avoid plugging of the auger by reducing the separation of seeds and gel or other prepared fluid drilling material, there should be sufficient solid material in the material being moved to apply direct force to the seeds and other particles rather than moving the fluidic material around the solid particles. Preferably, for most seeds and gel or other prepared fluid drilling material mixtures, the helical grooves in the auger should be between ¼ inch and ½ inch in depth and between ⅛ inch and 1½ inches between threads, with the threads being no more than ⅕ of the distance between threads in thickness and no less than ⅕ of the depth of the grooves. With this arrangement, a relatively pulseless flow is provided of pockets of gel or other prepared fluid drilling material with a relatively small moving surface of insufficient velocity to cause substantial separation of seeds.

As the auger carries pockets of matrix of gel or other prepared fluid drilling material and seed through a distribution tube toward a feed nozzle, the threads of the augers approach the edge of the bottom seed section or the hopper, whichever is first, but approach it in a parallel fashion with an angle corresponding to the angle of the hopper. This prevents the squeezing of seeds and cracking or slicing of the seeds as they pass into the auger delivery tube in the bottom feed section 278A (FIG. 52). The seeds are conveyed by the auger to an end thread which is at a relatively sharp angle to thrust the gel or other prepared fluid drilling material forward through the vibrating nozzle. As the seeds and gel or other prepared fluid drilling material pass through the orifice in the nozzle, there is a tendency for them to accumulate. However, air under pressure blows downwardly with a pressure of at least one-twentieth of a pound per square inch and 10 pounds per square inch across the nozzle in a direction along a plane passing through the longitudinal axis of the delivery tube and perpendicular to the ground, with the air flow being at an angle to the ground no more than 60 degrees on either side of a normal in a plane along the longitudinal axis of the auger and no more than 30 degrees from the normal to the ground in a plane perpendicular to the longitudinal axis of the auger.

The hopper and feed mechanism are pulled along a field during the delivery of seeds and include a furrow opener and a modified widening shoe for larger seeds, which spreads the earth into a wide furrow. Furrow closing and pressing wheels close the furrow and, in one embodiment, control the rate of rotation of the auger so as to adjust the dispensing of seeds to the speed of the tractor. In other embodiments, the seeds are detected or the rate of turning of the auger is detected and displayed to the tractor operator who pulls the planter at a speed corresponding to the auger speed.

For certain seeds which are relatively large and planted deeper, such as sweet corn, the furrow opener has mounted to it a blade extending downwardly an additional inch to create a deeper groove for the seed to drop further into the furrow. In embodiments of planters which are intended to drop seeds through spaced apart apertures in plastic or the like for accurate stands, a solenoid operated blocking device is timed to block air until the seed is about to be dispensed and then move the blocking plate away so that the air will blow matrix and seed into the aperture in the plastic. While an individual auger has been described through the center of a single hopper, multiple augers may be utilized positioned so that the gel or other prepared fluid drilling material flows into the auger with adequate pressure. In such a case, each auger will terminate in a separate nozzle vibrated by a vibrator and utilizing a separator. It is possible to use one vibrator to vibrate several nozzles.

Figure 65:
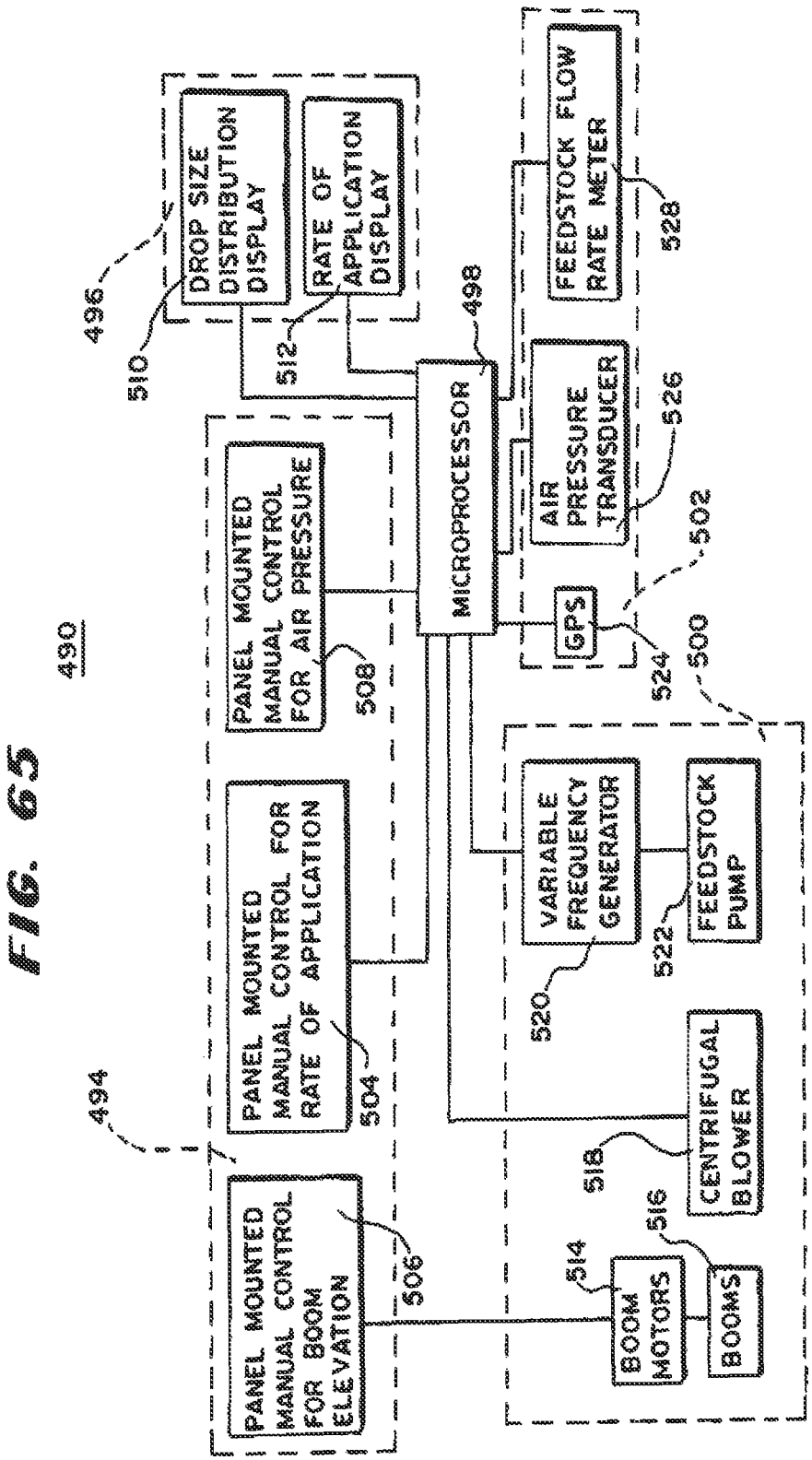
FIG. 65 is a block diagram of a control system for a planter or applicator in accordance with an embodiment of the invention.

In FIG. 65, there is shown a block diagram of a control system 490 for a planter or applicator such as the planter or applicator 100 shown in FIG. 30, having mounted within the vehicle a set of manual controls 494, a set of panel displays 496, a microprocessor 451, a set of output devices 500 that are operated by the manual controls 494 and certain measuring instruments 502 which cooperate with the manual controls 494 in microprocessor 451 to provide displays 496 and proper operation of the output devices 500.

The output devices 500 include boom motors 514, booms 516 containing fixtures on them, a centrifugal blower 518, a variable frequency drive or converter or generator 520 and a feedstock pump 522. The booms 516 are raised or lowered automatically. In the preferred embodiment, they are raised or lowered by DC motors 514 under the control of manual controls in the cab to vary their elevation in accordance with the requirements for spraying.

For certain agricultural uses, material may be sprayed at one elevation, usually a higher elevation in a crop, in relatively viscous form, or with larger drops and at a lower elevation in more mobile form or smaller drops since the more viscous droplets will be less subject to drift. The centrifugal blower 518 is controlled by the microprocessor 451 to control the air pressure applied to the fixture and thus vary the drop distribution. The microprocessor 451 may adjust for the velocity of the vehicle to apply feedstock material at the appropriate rate. Air pressure transducer 526 supplies information to the microprocessor 451 so that the panel mounted manual control for air pressure 508 in the manual controls 494 which is also connected to the microprocessor 451 may be adjusted to the preset rate by controlling the centrifugal blower 518 through the microprocessor 451. The feedstock pump 522 is controlled as to pumping rate by the signal from the variable frequency generator 520 to which it is connected. The microprocessor 451 controls the variable frequency generator 520 in response to the changes in the speed of the vehicle and signals from the panel mounted manual controls 494 relating to the rate of application to the field so that the rate of application may be continued at a constant appropriate preset rate per unit area even though the speed of the vehicle changes.

The measuring systems 502 include a global positioning system 524, an air pressure transducer 526 and a feedstock flow rate meter 528, each of which is electrically connected to the microprocessor 451. The GPS 524 may monitor the speed the vehicle is traveling and supply this information to the microprocessor 451 to adjust the rate of the flow of the feedstock material and the air pressure or other variables in a fixture mounted to the booms 516 and thus maintain the appropriate distribution of droplets. Similarly, the air pressure transducers 526 and feedstock flow rate meters 528 supply feedback signals to the microprocessor 451 to maintain the appropriate air pressure and feedstock flow rate under varying conditions.

The manual controls 494 include a panel mounted manual control for boom elevation 506, a panel mounted manual control for rate of application of feedstock 504 and a panel mounted manual control for air pressure 508. In the preferred embodiment, the panel mounted manual control for boom elevation 506 is directly controlled by the operator of the vehicle who adjusts by sight to the appropriate field conditions. The panel mounted manual control for rate of application 504 and the panel mounted manual control for air pressure 508 may be utilized by the operator viewing the sprayed material in making appropriate adjustments by sight based on experience. On the other hand, an inexperienced operator may rely upon preset values which are controlled for varying conditions by the sensors feeding signals to the microprocessor 451.

To aid in controlling the spray, the operator may rely upon the displays 496 in addition to visually observing the spray. The displays 496 include a drop size distribution display 510 and a rate of application display 512 which receive signals from the microprocessor 451 which correlates the measured values and supplies signals based on its internal calculations to its displays.

From the above description, it can be understood that the planting apparatuses and methods of this invention have several advantages such as: (1) there is less damage to seed because of the controlled water up take; (2) it is economical in the use of gel or other prepared fluid drilling material per acre; (3) there is less damage to seeds from lack of oxygen or drowning or the like; (4) the seeds may be controlled for spacing in a superior manner during drilling; (5) there is good control over uniformity in the time of emergence of the plants from the seeds; and (6) the process is economical.

From the above description, it can be understood that the spray method and apparatus of this invention has several advantages such as: (1) vehicles and aircraft used for applying agricultural inputs to fields do not need to carry as heavy a load of carrier fluid to apply agricultural inputs, for example, they can carry the same active ingredients as prior art agricultural inputs with a reduction in water of as much as 90 percent; (2) they reduce or eliminate the requirement for periodic addition of carrier fluid, thus reducing the time and expense of spraying; (3) they permit the application of some beneficial microbes with seeds because the agricultural inputs containing microbes can be applied at pressures low enough to avoid killing the microbes; (4) the high viscosity, relatively large drop size and narrow size distribution of the agricultural inputs reduce drift when sprayed; (5) it is possible to avoid diluting agricultural inputs with carriers such as water that have high surface tension and form beads on contact rather than spreading such over a leaf; (6) drops of agricultural inputs with greater shear resistance can be used to reduce the breaking up of the drops and the resulting increase in drop size distribution decreases drift, and reduction in drop size increased drift; (7) it is not necessary to add carriers used for dilution, such as water, that have unpredictable mineral content and pH variations; (8) the tendency for active ingredients to precipitate out because of the addition of carriers is reduced; (9) in some embodiments, the particle size of active ingredients can be reduced and thus provide better penetration into a host; and (10) increases constant rate per unit area.

It can be further understood from the above description that the planter in accordance with this invention has several advantages such as: (1) it can provide effective fluid drilling with adequate separation of seeds; (2) it can provide planting of seeds with superior beneficial microbe inoculation characteristics; (3) it can combine effective planting with beneficial chemical and microbial additives; (4) it provides good separation of seeds being planted without repeated mixing of the fluid and the seeds; (5) there is less damage to seed because of controlled priming in the presence of air and controlled water uptake; (6) it is economical in the use of gel or other prepared fluid drilling material per acre; (7) there is less damage to seeds in the planting operation; (7) the seeds may be controlled for spacing in a superior manner during drilling; (8) there is good control over uniformity in time of emergence of the plants from the seeds; and (9) it permits protection of the seed and addition of additives economically.

It can also be understood from the above description that the method, formulations and apparatus for forming fibers in accordance with this invention have several advantages, such as: (1) longer fibers can be formed; (2) chitosan fibers, mats and sheets can be more economically and better formed; (3) fibers can be formed without electrospinning; and (4) scale up is facilitated.

While a preferred embodiment of the invention has been described with some particularity, many modifications and variations in the preferred embodiment are possible without deviating from the invention. Therefore, it is to be understood that, within the scope of the appended claims, the invention may be practiced other than as specifically described.

What is claimed is:

1. Apparatus for planting, comprising:
- a mixer for mixing seeds with a gel in proportions in which the gel has a ratio of less than three parts of gel and volume to one part of seed and volume to form a seed gel mixture; and
- a seed feeder comprising:
  - a feed hopper for holding the seed gel mixture from the mixer;
  - a feed section for receiving the seed gel mixture from the feed hopper;
  - an auger within the feed section for driving the seed gel mixture through a seed feeder nozzle;
  - a vibrator for vibrating the seed feeder nozzle; and
  - a separator comprising a nozzle and a hose in communication with a source of air to separate seeds from seed gel mixture.

2. Apparatus for planting according to claim 1 wherein the feed hopper is open topped and rectangular, with walls extending downwardly to a location close to the feed section where it is angled to communicate therewith, walls of hopper adapted to cause the seed gel mixture to move to a bottom of the hopper and into the feed section without the seeds being separated by laminar flow against the walls of the hopper.

3. Apparatus according to claim 2 wherein the feed hopper size is related to stability of suspension of seed gel mixture and designed to retain uniformity in dispersion of the seeds within the seed hopper until seeds are driven through the seed feeder nozzle.

4. Apparatus according to claim 1 wherein the bottom feed section includes a cylindrical casing which partially encloses the auger having an axis generally perpendicular to central axis of the feed hopper.

5. Apparatus according to claim 4 wherein angle of the bottom feed section is such as to cause gravity to aid in the feeding of the seed gel mixture from the feed hopper through the seed feeder nozzle.

6. Apparatus according to claim 4 wherein the auger moves the seed and gel mixture with a positive force to move the seed gel mixture toward the seed feeder nozzle.

7. Apparatus according to claim 1 whereby the vibrator maintains an even dispersion of seeds and gel material as the gel and seed mixture flows through the nozzle after it has left direct contact with the auger's shear force members.

8. Apparatus according to claim 7 wherein the vibrator is at a frequency between 20 cycles per second and 10,000 cycles per second with an amplitude of between one millimeter and three millimeters.

9. Apparatus according to claim 1 wherein the separator, at regular intervals, forces seeds to be separated at tip of the seed feeder nozzle and drop to ground.

10. Apparatus according to 9 wherein an air separator stream is of a force between $\frac{1}{20}^{th}$ of a pound per square inch and four pounds per square inch.

11. Apparatus for planting, comprising:
- a mixer for mixing seeds with a gel in proportions in which the gel has a ratio of less than three parts of gel and volume to one part of seed and volume to form a seed gel mixture; and
- a seed feeder comprising a feed hopper for holding the seed gel mixture from the mixer having a top feed hopper portion and a bottom feed hopper portion;
  - a feed section connected to the feed hopper for receiving the seed gel mixture from the feed hopper;
  - an auger within the feed section for driving the seed gel mixture through a seed feeder nozzle;
  - a vibrator for vibrating the seed feeder nozzle; and
  - a separator comprising a nozzle and a hose in communication with a source of air to separate seeds from seed gel mix.

12. Apparatus for planting according to claim 11 wherein the feed hopper includes an enlarged open and rectangular top feed hopper portion connected by an inwardly angled portion to the narrow bottom feed hopper portion with walls extending downwardly to a location close to the feed section where it is angled to communicate therewith.

13. Apparatus according to claim 12 wherein the bottom feed hopper portion is at an angle so that the feed section tilts downwardly to the seed feeder nozzle.

14. Apparatus according to claim 11 wherein the bottom feed section includes a cylindrical casing which partially encloses the auger.

15. Apparatus according to claim 14 wherein the auger moves the seed gel mixture with a positive force to move the seed gel mixture toward the seed feeder nozzle.

16. Apparatus according to claim 11 wherein the auger contains grooves which have a depth sufficiently deep and the angle of the threads sufficiently large to cause a large bulk of the seed gel mixture to be moved with a small surface area of gel in contact with a stationary surface at a rate which is not conducive to laminar flow.

17. Apparatus according to claim 11 whereby the vibrator maintains an even dispersion of seeds and gel material as the gel and seed mixture flows through the nozzle after it has left direct contact with the auger's shear force members.

18. Apparatus according to claim 17 wherein the vibrator is at a frequency between 20 cycles per second and 10,000 cycles per second with an amplitude of between one millimeter and three millimeters.

19. Apparatus according to claim 11 wherein the separator, at regular intervals, forces seeds to be separated at the tip of the seed feeder nozzle and drop to ground.

20. Apparatus according to 19 wherein an air separator stream is of a force between $\frac{1}{20}^{th}$ of a pound per square inch and four pounds per square inch.

* * * * *